(12) United States Patent
Sonn et al.

(10) Patent No.: US 12,146,960 B2
(45) Date of Patent: Nov. 19, 2024

(54) GATED IMAGING APPARATUS, SYSTEM AND METHOD

(71) Applicant: BRIGHTWAY VISION LTD., Haifa (IL)

(72) Inventors: Ezri Sonn, Haifa (IL); Amit Oved, Givatayim (IL); Eyal Levi, Haifa (IL); Yoav Grauer, Haifa (IL); Ofer David, Haifa (IL)

(73) Assignee: BRIGHTWAY VISION LTD., Haifa (IL)

( * ) Notice: Subject to any disclaimer, the term of this patent is extended or adjusted under 35 U.S.C. 154(b) by 836 days.

(21) Appl. No.: 16/078,920

(22) PCT Filed: Dec. 21, 2016

(86) PCT No.: PCT/IB2016/057853
§ 371 (c)(1),
(2) Date: Aug. 22, 2018

(87) PCT Pub. No.: WO2017/149370
PCT Pub. Date: Sep. 8, 2017

(65) Prior Publication Data
US 2019/0056498 A1    Feb. 21, 2019

Related U.S. Application Data

(60) Provisional application No. 62/301,658, filed on Mar. 1, 2016.

(51) Int. Cl.
*G01S 17/89* (2020.01)
*G01S 7/4865* (2020.01)
(Continued)

(52) U.S. Cl.
CPC ............ *G01S 17/89* (2013.01); *G01S 7/4865* (2013.01); *G01S 17/18* (2020.01); *G01S 17/931* (2020.01)

(58) Field of Classification Search
None
See application file for complete search history.

(56) References Cited

U.S. PATENT DOCUMENTS

| | | | | |
|---|---|---|---|---|
| 7,733,464 B2 * | 6/2010 | David | ................... | G01S 7/495 356/5.03 |
| 7,787,131 B1 * | 8/2010 | Moran | ............... | G01B 9/02098 356/520 |

(Continued)

FOREIGN PATENT DOCUMENTS

| | | | | |
|---|---|---|---|---|
| WO | WO-2005076037 A1 * | 8/2005 | ............. | G01S 17/18 |
| WO | WO-2013179280 A1 * | 12/2013 | ............. | G01S 17/08 |

OTHER PUBLICATIONS

Laurenzis M. et al. "Long-range three dimensional active imaging with superresolution depth mapping", Optics Letters, Optical Society of America, vol. 32, No. 21, Nov. 1, 2007, pp. 3146-3148.

(Continued)

*Primary Examiner* — Yuqing Xiao
*Assistant Examiner* — Jempson Noel
(74) *Attorney, Agent, or Firm* — The Roy Gross Law Firm, LLC; Roy Gross

(57) ABSTRACT

A method for depth mapping of objects in a scene by a system of a moving/movable platform is disclosed. According to some embodiments, the method includes actively illuminating the scene with pulsed light that is generated by at least one pulsed light illuminator and receiving, responsive to illuminating the scene, reflections on at least one image sensor that comprises a plurality of pixel elements. The method may further include gating at least one of the plurality of pixel elements of the at least one image sensor for converting the reflections into pixel values for generating reflection-based images that have at least two depth-of-field ranges and an overlapping DOF region. In addition, the method may include determining, based on at least one first (Continued)

pixel value of a first DOF in the overlapping DOF region, and based on at least one second pixel value of a second DOF in the overlapping DOF region, depth information of one or more objects located in the overlapping DOF region of the scene.

19 Claims, 23 Drawing Sheets

(51) Int. Cl.
    *G01S 17/18*     (2020.01)
    *G01S 17/931*     (2020.01)

(56) References Cited

U.S. PATENT DOCUMENTS

| | | | |
|---|---|---|---|
| 8,934,087 B1 * | 1/2015 | Stobie | G01S 7/495 356/4.01 |
| 10,656,275 B1 | 5/2020 | Bills et al. | |
| 10,712,446 B1 | 7/2020 | Bills et al. | |
| 2006/0000987 A1 * | 1/2006 | Weber | G01S 17/86 356/5.01 |
| 2007/0021849 A1 | 1/2007 | Naono et al. | |
| 2007/0058038 A1 * | 3/2007 | David | G01S 7/483 348/135 |
| 2009/0122297 A1 | 5/2009 | Ikeno et al. | |
| 2011/0157354 A1 * | 6/2011 | Kawahito | G01S 7/4863 348/140 |
| 2012/0051588 A1 * | 3/2012 | McEldowney | G03B 21/14 348/46 |
| 2012/0249781 A1 * | 10/2012 | Vollmerhausen | G01S 17/89 348/135 |
| 2012/0249998 A1 | 10/2012 | Eisele et al. | |
| 2013/0208154 A1 * | 8/2013 | Wang | H04N 25/135 348/E9.005 |
| 2014/0081459 A1 * | 3/2014 | Dubois | B25J 9/1697 700/259 |
| 2015/0355330 A1 | 12/2015 | Oberhammer et al. | |
| 2016/0003946 A1 * | 1/2016 | Gilliland | G01S 17/10 356/5.01 |
| 2016/0313446 A1 * | 10/2016 | Fu | G01S 7/4861 |
| 2018/0299554 A1 * | 10/2018 | Van Dyck | G01S 17/894 |

OTHER PUBLICATIONS

International Search Report of PCT/IB2016/057853 Completed May 2, 2017; Mailed May 7, 2017 6 Pages.
Written Opinion of PCT/IB2016/057853 Completed May 2, 2017; Mailed May 7, 2017 12 Pages.
European Office Action for Application No. 16836158.2, dated Mar. 15, 2021, 14 pages.
Communication mailed by the EPO May 14, 2020 pursuant to Article 94(3) EPC for European Patent Application 16 836 158.2 (Published as EP3423865A1).

* cited by examiner

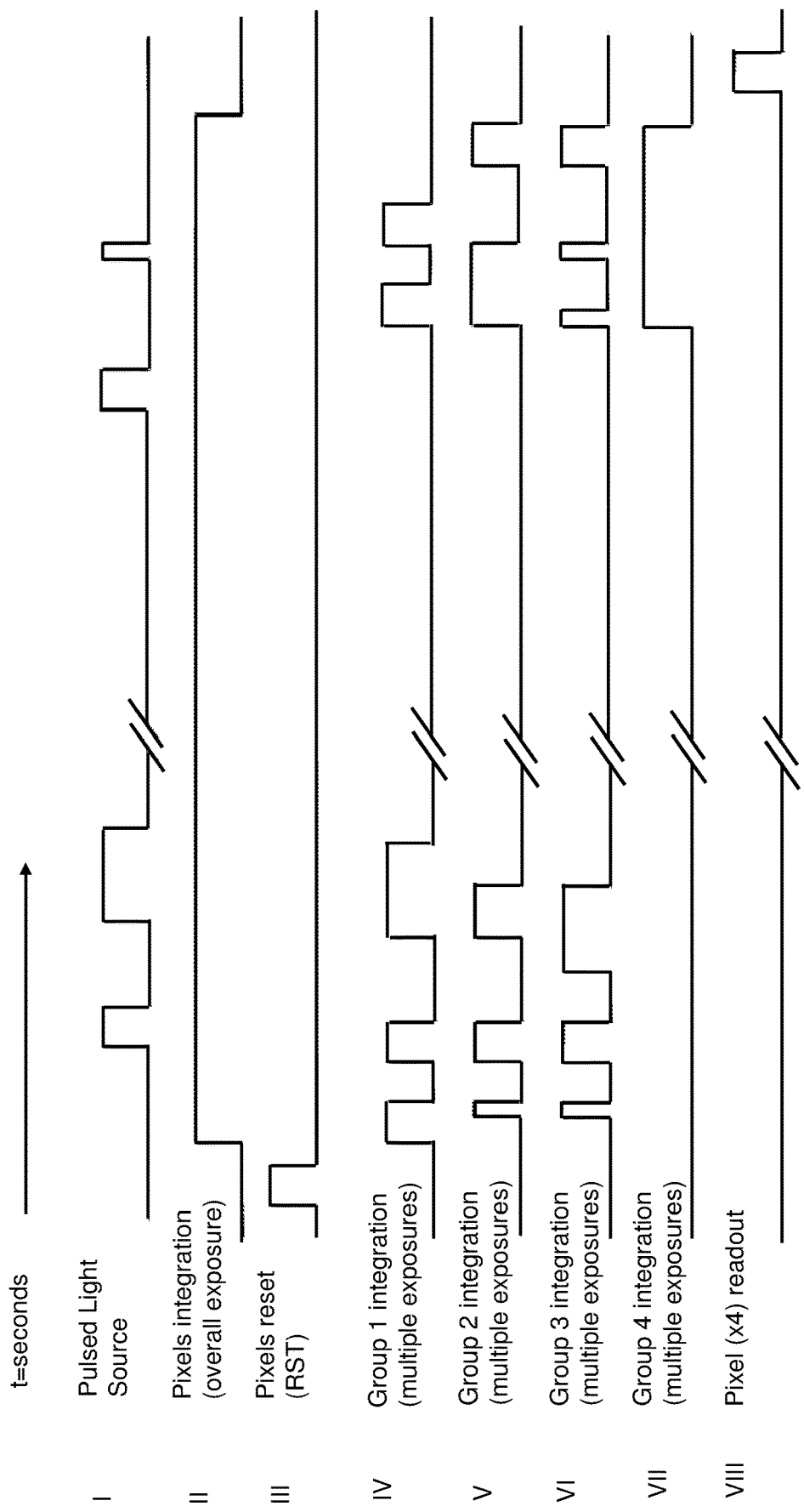

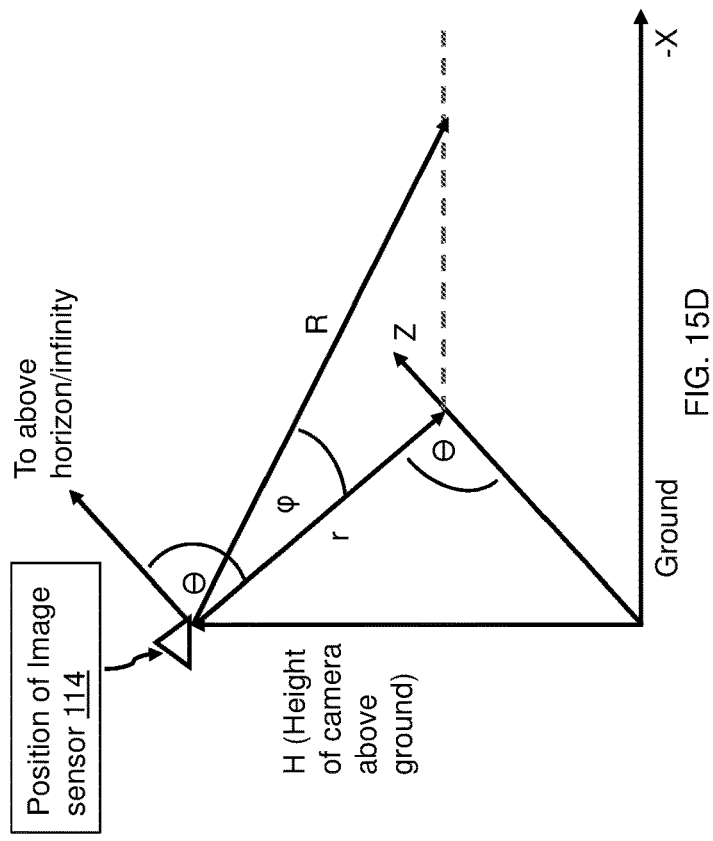
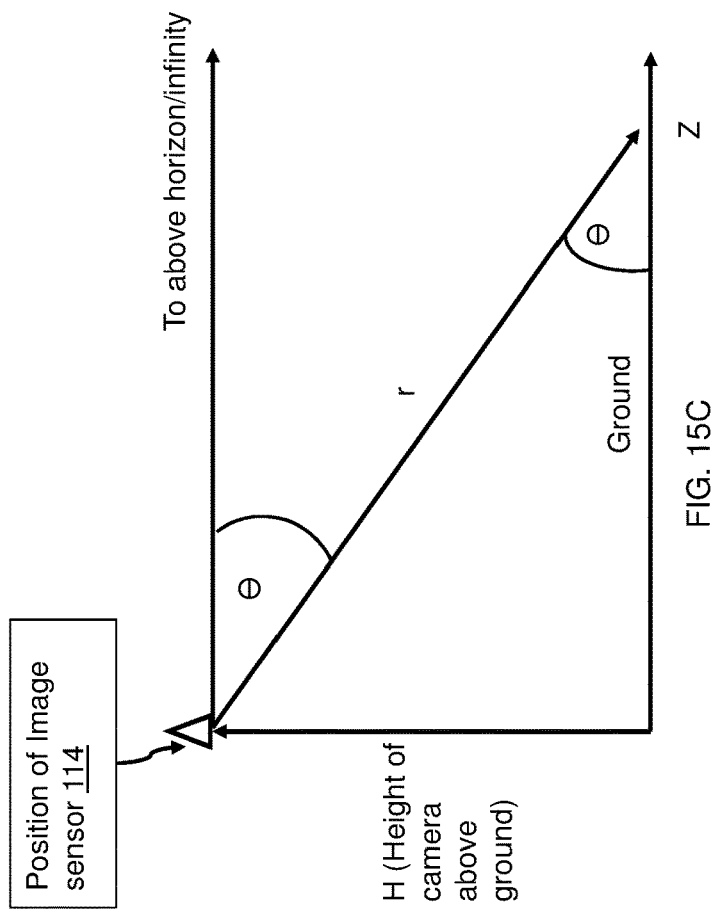

GATED IMAGING APPARATUS, SYSTEM AND METHOD

CROSS-REFERENCE TO RELATED APPLICATIONS

This application is a National Phase of PCT Patent Application No. PCT/IB2016/057853 having International filing date of Dec. 21, 2016, which claims priority of U.S. Provisional Patent Application No. 62/301,658, filed on Mar. 1, 2016, titled "DEPTH MAP ESTIMATION BASED ON LASER GATED IMAGING." The content of both applications is expressly incorporated herein by reference in its entirety.

TECHNICAL FIELD

The present disclosure relates in general to imaging apparatuses, systems and methods and, more particularly, to time-of-flight (TOF) imaging apparatuses, systems and methods.

BACKGROUND

Imaging apparatuses that are aimed at improving visibility have been employed in civilian applications for many years. Such imaging apparatuses produce images that improve visibility to allow navigate and steer a vehicle under poor visibility and adverse weather conditions such as during night, rain, fog and dust.

In general, images can be obtained actively and passively. Passive imaging apparatuses may use infrared electromagnetic (EM) radiation emanating from the objects to enhance their visibility. A passive imaging apparatus may for example utilize a thermal sensor that generates "emitted-based" image data to produce an image according to intensity differences of the infrared radiation. Additionally or alternatively, passive imaging apparatuses may use sources of ambient EM radiation (also: ambient light) that may reflect from and/or scatter off objects that are present in an environment being imaged. Such sources of ambient EM radiation can for example include traffic lights, streetlights, vehicle low/high beams, moonlight and/or starlight.

Active imaging apparatuses may rely, on the other hand, on an artificial light source that is part of the apparatus and employed for illuminating a scene. Responsive to illuminating a scene, light may be reflected from objects located within that scene and detected by an image sensor of the active imaging apparatus to produce "reflection-based" image data. Such artificial light source may be, for example, a laser diode that may emit EM radiation in the form of a series of pulses or in the form of a continuous wave.

The activation of the light source emitting pulsed light and the image sensor of the active imaging apparatus may be timed or coordinated with each other to allow the controlled imaging of a desired depth of field (DOF) of the scene having a minimal range ($R_{MIN}$) and a maximal range ($R_{MAX}$). Coordinating the activation of the light source and the image sensor for achieving the controlled imaging or selected imaging of various DOFs is known as "gated imaging" or "active gated imaging".

A gated imaging process for imaging a selected distance may for example include illuminating the scene by the light source with pulsed light using predetermined illumination parameters. The image sensor's pixel elements may be shuttered (e.g., mechanically by employing an external shutter in front of the image sensor and/or electronically etc.), i.e., the pixel element(s) may be in an "OFF" state (also: deactivated) for the duration of time required for the pulse to propagate from the light source to an object located a desired distance from the light source and receive at the image sensor the pulse reflected back from the desired distance. The image sensor is then set in an "ON" state (also: activated) for the duration required to detect the pulse reflected from the desired distance. In this manner, the apparatus may image only the object(s) located at the desired distance (or DOF) from the image sensor, while unwanted objects that may be located between the image sensor and the desired distance, may not be imaged.

The description above is presented as a general overview of related art in this field and should not be construed as an admission that any of the information it contains constitutes prior art against the present patent application.

OVERVIEW

Example 1 concerns method for depth mapping objects in a scene by an apparatus of a moving or movable platform, the method comprising: actively illuminating the scene with pulsed light that is generated by at least one pulsed light illuminator; receiving, responsive to illuminating the scene with the pulsed light, reflections on at least one image sensor that comprises a plurality of pixel elements; gating at least one of the plurality of pixel elements of the at least one image sensor for converting the reflections into pixel values for generating reflection-based image data descriptive of at least two depth-of-field (DOF) ranges and an overlapping DOF region; and determining, based on at least one first pixel value of a first DOF in the overlapping DOF region, and further based on at least one second pixel value of a second DOF in the overlapping DOF region, depth information of one or more objects located in the overlapping DOF region of the scene.

Example 2 includes the subject matter of example 1 and, optionally, wherein the actively illuminating of the scene is performed by pulsed light comprising a plurality of trains of light pulses for imaging a respective plurality of DOFs Example 3 includes the subject matter of examples 1 or 2 and, optionally, wherein the depth information has a resolution of 1 meters or less.

Example 4 includes the subject matter of any one of the examples 1 to 3 and, optionally, wherein the determining of depth information is based on field-of-view (FOV), environmental, and/or object information.

Example 5 includes the subject matter of any one of the examples 1 to 4 and, optionally, selectively gating at least two pixel subsets (also: subsets of pixel elements of the image sensor) of a group of subsets according to a group gating parameter or according to respective subset gating parameters for imaging by the at least two pixel subsets, respectively, the at least two DOF ranges of the scene.

Example 6 includes the subject matter of example 5 and, optionally, wherein gating parameters of one pixel subset are different from the gating parameters of another pixel subset of the group of subsets.

Example 7 includes the subject matter of any one of the examples 5 or 6 and, optionally, gating the at least two subsets of pixels such to obtain multiple exposures for at least one of the least DOF ranges.

Example 8 includes the subject matter of any one of the examples 6 or 7 and, optionally, reading out pixel data that is associated with the at least two pixel subsets to obtain one or more image frames that are descriptive of the at least two DOF ranges and their overlapping DOF range.

Example 9 includes the subject matter of example 8 and, optionally, wherein the gating the at least two pixel subsets is performed a plurality of times to obtain at least two different overlapping DOF regions comprising the object; and the depth mapping the pixel data descriptive of the object is based on values relating to the at least two different overlapping DOF regions.

Example 10 includes the subject matter of any one of the examples 5 to 9 and, optionally, wherein a pixel element of one or more of the at least two pixel subsets is passive.

Example 11 includes the subject matter of any one of the examples 5 to 10 and, optionally, wherein the at least two pixel subsets are controllable to alternatingly perform gating in correspondence with a pattern that is selected from a group comprising: a checkered, a diagonal, and a line pattern arrangement.

Example 12 includes the subject matter of any one of the examples 5 to 11 and, optionally, wherein the at least two pixel subsets are associated with respective Regions-of-Interest (ROIs) of the scene being illuminated during the illumination period.

Example 13 includes the subject matter of example 12 and, optionally, wherein a sequential selection of the at least two pixel subsets is made by employing a scanning mirror and/or wherein a sequential selection of the illuminator field of illumination (FOI) is made by employing a scanning mirror.

Example 14 includes the subject matter of any one of the examples 1 to 13 and, optionally, wherein the gating of the plurality of pixel elements is performed in a random or pseudo-random manner.

Example 15 includes the subject matter of any one of the examples 1 to 14, executed on at least one or a plurality of moving platforms.

Example 16 includes the subject matter of example 15 and, optionally, wherein the actively illuminating of the scene and gating of the plurality of pixel elements is executed by a plurality of gated imaging apparatuses respective of the plurality of moving platforms in coordination with each other so that determining depth information by the corresponding gated imaging apparatuses can be performed simultaneously without mutual interference between the plurality of gated imaging apparatuses.

Example 17 includes the subject matter of any one of the examples 1 to 16 and, optionally, converting, by one or more additional image sensors, a physical stimuli relating to the scene into an electronic signal to obtain additional values relating to the scene for depth mapping of pixel data that is descriptive of the object located in the overlapping DOF region.

Example 18 includes the subject matter of any one of the examples 1 to 17 and, optionally, reducing spatial resolution of data descriptive of the depth mapping to compensate for data storage limitations.

Example 19 includes the subject matter of any one of the examples 1 to 18 and, optionally, wherein the depth mapping is performed by employing a technique that is selected from a group of techniques comprising: weighted averaging; polynomial fitting; lookup tables; neural networks; and any combination of the aforesaid.

Example 20 concerns a gated imaging apparatus that is employable by a moving or movable platform for depth mapping of a scene of a geographic area in which the platform is located, the gated imaging apparatus comprising: at least one pulsed light illuminator for actively illuminating the scene with pulsed light generated by the at least one pulsed light illuminator; at least one image sensor that comprises a plurality of pixel elements for receiving reflections responsive to illuminating the scene with the pulsed light; a controller for gating at least one of the plurality of pixel elements of the at least one image sensor for converting the reflections into pixel values to generate reflection-based images that have at least two depth-of-field (DOF) ranges and an overlapping DOF region; a memory; and a processor that is operative to determine, by executing instructions stored in the memory, based on at least one first pixel value of a first DOF in the overlapping DOF region and further based on at least one second pixel value of a second DOF in the overlapping DOF region, depth information of one or more objects located in the overlapping DOF region of the scene.

Example 21 includes the subject matter of example 20 and, optionally, wherein the controller is operative to selectively gate at least two pixel subsets of the plurality of pixels according to respective subset gating parameters for imaging by the at least pixel subsets, respectively, the at least two DOF ranges of the scene.

Example 22 includes the subject matter of example 21 and, optionally, wherein the gating parameters of one pixel subset are different from the gating parameters of another pixel subset of the group of pixel subsets.

Example 23 includes the subject matter of example 21 or example 22 and, optionally, wherein the controller is operative to gate the at least two pixel subsets such to obtain multiple exposures for at least one of the least two depth-of-field (DOF) ranges.

Example 24 includes the subject matter of any one of the examples 21 to 23 and, optionally, wherein the controller is operative to read out pixel data that is associated with the at least two pixel subsets to obtain one or more image frames that are descriptive of the at least two DOF ranges and their overlapping DOF range.

Example 25 includes the subject matter of any one of the examples 21 to 24 and, optionally, wherein the controller is operative to gate the at least two pixel subsets a plurality of times to obtain at least two different overlapping DOF regions comprising the object; wherein the processor, by executing instructions stored in the memory, is operative to perform depth mapping of the pixel data descriptive of the object based on values relating to the at least two different overlapping DOF regions.

Example 26 includes the subject matter of any one of the examples 21 to 25, wherein at least one pixel of one or more of the at least two pixel subsets is a passive pixel.

Example 27 includes the subject matter of any one of the examples 21 to 26, wherein the at least two pixel subsets are controllable to alternatingly perform gating in correspondence with a pattern that is selected from a group comprising: a checkered, a diagonal, and a line pattern arrangement.

Example 28 includes the subject matter of any one of the examples 21 to 27 and, optionally, wherein the at least two pixel subsets are associated with respective Regions-of-Interest (ROIs) of the scene being illuminated during the illumination period.

Example 29 includes the subject matter of any one of the examples 20 to 28 and, optionally, comprising one or more scanning mirrors that are operably coupled with the controller, wherein the controller controls the scanning mirror for sequentially selecting the at least two pixel subsets and/or wherein the controller controls a scanning mirror for a sequential selection of the FOI.

Example 30 includes the subject matter of any one of the examples 20 to 29 and, optionally, wherein the controller is operative to gate the plurality of pixels in a random or pseudo-random manner.

Example 31 includes the subject matter of any one of the examples 20 to 30 and, optionally, comprising one or more additional image sensors that are operative to convert a physical stimuli relating to the scene into an electronic signal to obtain additional values relating to the scene for depth mapping of pixel data that is descriptive of the object located in the overlapping DOF region.

Example 32 includes the subject matter of any one of the examples 20 to 31 and, optionally, wherein the processor is operative to reduce spatial resolution of data descriptive of the depth mapping to compensate for data storage limitations, by executing instructions stored in the memory.

Example 33 includes the subject matter of any one of the examples 20 to 32 and, optionally, wherein the gated imaging apparatus is operative to image a scene under high intensity light conditions by subtracting passive image data that is descriptive of passive image information of the scene under high intensity light conditions, from image data that comprises both reflection-based and reflection-based image data.

Example 34 concerns a gated imaging system comprising: a plurality of gated imaging apparatuses according to any one of the examples 20 to 33, wherein the plurality of gated imaging apparatuses is employable by at least one or a plurality of moving platforms for performing, by each one of the plurality of gated imaging apparatuses, the method outlined in the examples 1 to 19.

Example 35 includes the subject matter of example 34, wherein the plurality of gated imaging apparatuses are employable by at least two moving platforms and comprise a plurality of controllers that are operative to control the light sources and to gate the pixels of the sensors of the plurality of gated imaging apparatuses in coordination with each other or randomly so that depth mapping can be performed simultaneously without mutual interference between the plurality of gated imaging apparatuses.

Example 36 concerns a computer program embodied in an information carrier comprising a tangible computer-readable storage device and/or an intangible machine-readable propagated signal, to control the operation of and/or for executing the following steps: generating pulsed light by at least one pulsed light illuminator of a gated imaging system employed by a moving platform for actively illuminating the scene; gating at least one of a plurality of pixel elements of at least one image sensor of the gated imaging system for converting reflections that are received by the at least one image sensor responsive to illuminating the scene with the pulsed light into pixel values for generating reflection-based images that have at least two depth-of-field (DOF) ranges and an overlapping DOF region; and determining, based on at least one first pixel value of a first DOF in the overlapping DOF region, and further based on at least one second pixel value of a second DOF in the overlapping DOF region, depth information of one or more objects located in the overlapping DOF region of the scene.

Example 37 includes the subject matter of example 36 and, optionally, wherein the depth mapping is performed by employing a technique that is selected from a group of techniques comprising: weighted averaging; polynomial fitting; lookup tables; neural networks; and any combination of the aforesaid.

Example 38 includes the subject matter of example 36 or 37 and, optionally, controlling the operation and/or executing the step of selectively gating at least two pixel subsets of the plurality of pixels according to respective subset gating parameters for imaging by the at least two pixel subsets, respectively, the at least two DOF ranges of the scene.

Example 39 includes the subject matter of example 38 and, optionally, wherein the gating parameters of one pixel subset are different from the gating parameters of another pixel subset.

Example 40 includes the subject matter of example 38 or 39 and, optionally, controlling the operation and/or executing the step of gating the at least two pixel subsets such to obtain multiple exposures for at least one of the least two depth-of-field (DOF) ranges.

Example 41 includes the subject matter of any one of the examples 38 to 40 and, optionally, controlling the operation and/or executing the step of reading out pixel data that is associated with the at least two pixel subsets to obtain one or more image frames that are descriptive of the at least two DOF ranges and their overlapping DOF range.

Example 42 includes the subject matter of any one of the examples 36 to 41 and, optionally, controlling the operation and/or executing the step of alternatingly performing gating of the plurality of pixels of the sensor in correspondence with a pattern that is selected from a group comprising: a checkered, a diagonal, and a line pattern arrangement.

Example 43 includes the subject matter of any one of the examples 38 to 42 and, optionally, controlling the operation and/or executing the step of: gating the at least of pixel subsets a plurality of times to obtain at least two different overlapping DOF regions comprising the object; and depth mapping the pixel data descriptive of the object based on values relating to the at least two different overlapping DOF regions.

Example 44 includes the subject matter of any one of the examples 36 to 43 and, optionally, controlling the operation and/or executing the step of actively illuminating the scene and gating the plurality of pixels by illumination sources and sensors of a plurality of gated imaging apparatuses respective of a plurality of moving platforms in coordination with each other or randomly, so that depth mapping by the corresponding gated imaging apparatuses can be performed simultaneously without mutual interference between the plurality of gated imaging apparatuses.

Example 45 includes the subject matter of any one of the examples 36 to 44 and, optionally, controlling the operation and/or executing the step of gating of the plurality of pixels in a random or pseudo-random manner.

Example 46 includes the subject matter of any one of the examples 36 to 45 and, optionally, wherein the computer program is employable in coordination by a plurality of moving or movable platforms.

Example 47 concerns a plurality of moving or movable platforms running the computer program of any one of the examples 36 to 46.

Example 48 concerns a computer program product that is directly loadable into the internal memory of a digital computer, comprising software code portions for performing the steps of any one of examples 1 to 19, when the product is run on a computer.

Example 49 concerns a computer program product comprising a non-transitory tangible storage medium readable by a processing circuit and storing instructions for execution by the processing circuit for performing a method comprising: generating pulsed light by at least one pulsed light illuminator of a gated imaging system employed by a moving platform for actively illuminating the scene; gating at least one of a plurality of pixel elements of at least one image sensor of the gated imaging system for converting reflections that are received by the at least one image sensor responsive to illuminating the scene with the pulsed light into pixel values for generating reflection-based images that have at least two depth-of-field (DOF) ranges and an overlapping DOF region; and determining, based on at least one first pixel value of a first DOF in the overlapping DOF region, and further based on at least one second pixel value of a second DOF in the overlapping DOF region, depth information of one or more objects located in the overlapping DOF region of the scene.

Example 50 concerns the use of the gated imaging apparatus of any one of the examples 20 to 33 for depth mapping of a scene of a geographic DOF region in which the platform is located.

Example 51 concerns the use of the gated imaging system according to example 34 or example 35 for depth mapping of a scene of a geographic DOF region in which the plurality of platforms are located.

This Overview introduces a selection of concepts in a simplified form that are further described below in the Brief Description of the Figures and the Detailed Description. This overview is not intended to identify key features or essential features of the claimed subject matter, nor is it intended to be used to limit the scope of the claimed subject matter.

BRIEF DESCRIPTION OF THE FIGURES

The figures illustrate generally, by way of example, but not by way of limitation, various embodiments discussed in the present document.

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. References to previously presented elements are implied without necessarily further citing the drawing or description in which they appear. The figures are listed below.

FIG. 10 schematically illustrates a gated imaging operating sequence, according to some embodiments;

FIGS. 15C and 15D show auxiliary geometric representations of the position of the image sensor;

DETAILED DESCRIPTION

Figure 1:
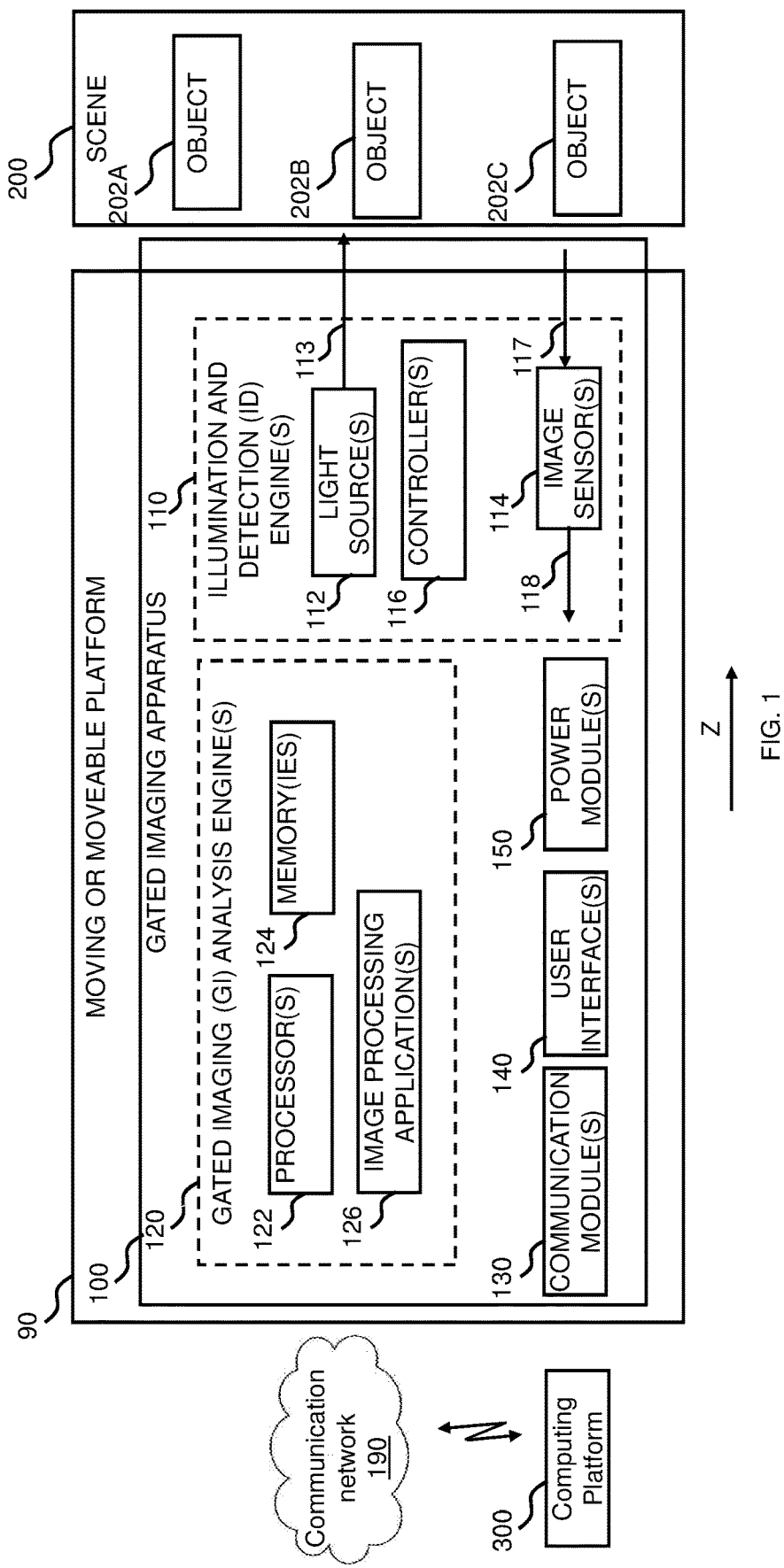
FIG. 1 is a schematic block diagram illustration of a gated imaging apparatus of a moving platform, according to some embodiments.

The following description of gated imaging apparatuses, systems and/or methods is given with reference to particular examples, with the understanding that such apparatuses, systems and methods are not limited to these examples. A gated imaging system comprises a plurality of apparatuses that are employed by at least two moving platforms located in a geographic area.

Aspects of embodiments disclosed herein relate to a gated imaging apparatus, system and method for obtaining distance information about a scene region (e.g., an object located in a scene) including for example three-dimensional (3D) information (also known as depth range information or depth range maps) of a scene region (e.g., an object's shape and/or the object's distance from a reference point, etc.). Optionally, data descriptive of a depth map may be used for obtaining reflection-based image data including, for example, nominal reflection-based image data that would be obtained by performing gated imaging and/or any other type of reflection-based image data (e.g., post-processed reflection-based image data for object classification and/or image artifact removal).

A DOF in a scene may be defined by the DOF's range, which extends from a minimum range $R_{min}$ (also: proximal boundary) to a maximum range $R_{max}$ (also: distal boundary) as measured from a positional reference in the scene (e.g., as measured from an image sensor and/or an illumination source). Otherwise stated, a DOF of a scene can be defined as the distance covered from a proximal to a distal boundary of an imaged range of the scene, as measured from a positional reference located in the scene.

It is noted that the gated imaging operating parameters disclosed herein and the illustrated gating functions are mere examples and should not be construed limiting. Accordingly, the light source and the image sensor may be operated in additional or alternative ways than what is disclosed herein to controllably produce reflection-based image data descriptive of one or more DOF ranges of a scene. For instance, a certain DOF range of interest may be imaged in a gated manner such to obtain first and second image data that are respectively descriptive of a first and a second DOF range comprised in the DOF range of interest.

Merely to simplify the discussion that follows, the terms "proximal" and "distal" as used herein refer to a position relative to the moving platform or a source of illumination (also: light source or illuminator) and the light emitted therefrom.

The minimum and/or maximum distance of a DOF that can be imaged by the gated imaging apparatus may depend, inter alia, on various operating parameters including, for example, the distance between the light sources(s) and the corresponding image sensor(s) of the apparatus. For instance, the minimum distance (e.g., 15 meters) of the DOF as measured from the light source may be depend on the geometry of overlap between the field of illumination of the light source and the field of view of the image sensor relative to the light source. In another embodiment, a scene region may be limited to a specific object of interest (e.g., an oncoming car, an obstacle ahead of a driving path, etc.). In an embodiment, the boundaries of a DOF for which a depth map is generated may be altered, e.g., adaptively and automatically.

The gated imaging apparatuses, systems and methods disclosed herein may be employed by moving or movable (also: non-stationary or mobile) as well as by stationary platforms. Merely to simplify the discussion that follows, without being construed as limiting, embodiments may herein be described in conjunction with moving platforms.

The gated imaging apparatus comprises one or more light sources that are operative (also: configured) to emit pulsed light towards a scene to illuminate the scene. In other words, the light source is operative to actively illuminate the scene. Pulsed light can comprise only a single light pulse, or one or more trains of light pulses. A train of light pulses comprises a series of regularly recurrent pulses having similar or identical characteristics.

The gated imaging apparatus further comprises one or more image sensors having video recording capabilities. Each one of the image sensors may include a plurality of pixel elements in an array or matrix arrangement and that are configured to detect light incident thereon. Otherwise stated, a pixel element of such image sensor is operative to convert a physical stimuli relating to light incident on the pixel element into an electronic signal which may then be readout for further processing and analysis. For example, responsive to illuminating the scene with the pulsed light, reflected light may be incident (also: received) on a plurality of pixel elements of at least one image sensor. The reflected incident light may be converted into pixel values respective of the plurality of pixels to generate reflection-based image data that is descriptive, inter alia, of reflection-based scene information of a desired DOF. It should be noted that while the description herein refers to "reflection-based data" and "reflection-based scene information", some of the light incident onto pixel elements of an image sensor of the gated imaging apparatus does not necessarily have to originate from the light source. Accordingly, light incident onto pixel elements of the gated imaging apparatus may also comprise light components that are not necessarily reflection-based. The term "pixel element" as used herein may also refer to a "pixel unit".

In an embodiment, a plurality of pixel elements of a pixel element may be configured to have different operating parameters including, for example, different spectral operating range, polarization responsiveness, dynamic range, signal to noise (S/N) ratio, and/or the like. For example, while the spectral response of a first pixel may be in the near infrared range (NIR), the spectral response of a second pixel may be in the visible spectrum (i.e. color information). In another example, a pixel element may be configured to detect (only) polarized light, whereas another pixel element may be configured to detect (only) unpolarized and/or partially polarized light.

Optionally, electro-optical modulators and/or other technologies may be employed in conjunction with or by the one or more image sensors of the gated imaging apparatus, e.g., to improve performance of the gated imaging apparatus and/or for implementing the selective activation and deactivation of a pixel element. For instance, an image sensor may be implemented using digital micro-mirror devices (DMDs), image intensifier or phototube coupled to image sensor for controlling of the selective activation. In a further example, the one or more image sensors may employ electron-bombarded CMOS (EBCMOS), electron multiplying or EMCCD technology to enable the detection of single photon events and/or the selective activation while maintaining comparatively high quantum efficiency.

Optionally, reflection-based image data may be registered with passively acquired image data a set of registered data, which may then be provided to a computerized system. Additionally or alternatively, a video showing depth mapping images of a scene may be presented to a user of the gated imaging apparatus in registration (e.g., synchronization) with a video of regular intensity images of the scene.

In an embodiment, a gated imaging apparatus, system and method may implement or employ a single exposure of pixel elements (i.e. single activation or sub-exposure) per image frame readout. In another embodiment, the gated imaging apparatus, system and method may implement or employ multiple exposures per single image frame readout.

Either way, pixel element exposure may be coordinated with the emission of pulsed light.

The coordination of the pixel element exposure with the emission of pulsed light may be implemented in a number of ways to implement various gated imaging operating sequences.

In some embodiments, pixel elements may be activated in synchronization with the emission of pulsed light. In some other embodiments, pixel elements may be activated while no pulse light is emitted, i.e., the activation of pixel elements is not synced with the emission of pulsed light. Otherwise stated, there may be no temporal overlap between the activation of pixel elements and the emission of pulsed light. For example, there may be a delay between the termination of the emission of pulsed light and the activation of pixel elements.

In an embodiment, the activation of pixel elements may be partially temporally overlapping with the emission of pulsed light source.

It should be noted that the term "light" as used herein may refer to electromagnetic (EM) radiation of any suitable wavelength for the purposes of the applications disclosed herein. Accordingly, the term "light" should not be construed as being limited to visible light and may additionally or alternatively include non-visible radiation such as, for example, light in the NIR, light in the short wave infrared range (SWIR) and light in the ultra-violate range. The light may be coherent, non-coherent or partially coherent. The light may be polarized, non-polarized or partially polarized. The light may have a wide spectral width (e.g. of the range of hundreds of nanometers such as originated from a black body), the light may have a mid-spectral width (e.g. of the range of tens of nanometers such as originated from a LED) or the light may have a narrow spectral width (e.g. of the range of a few nanometers such as originated from a laser). Moreover, the terms "light" and "EM radiation" may herein be used interchangeably.

In an embodiment, the gated imaging apparatus further comprises a controller which is operably coupled with the light source and the plurality of pixel elements respective of the one or more image sensors. The controller controls the operation of the pixel elements and the light source so that they operate in a timed manner for realizing gated imaging. For example, the controller may coordinate (e.g., synchronize) the timing and duration of the emission of pulsed light with the timing and exposure duration of the pixel elements to reflected pulsed light.

In an embodiment, the gated imaging apparatus is operative to implement gated imaging with the light source, the plurality of pixels elements of the one or more image sensors and the controller, so that light reflected and incident onto the pixel elements produces reflection-based image data that is descriptive of image slices that have at least two different depths-of-field (DOFs) and, optionally, a corresponding overlapping DOF region. In a first example, a DOF may range from $R_{MIN}$=30 m to $R_{MAX}$=70 m and another DOF may range from $R_{MIN}$=90 m to $R_{MAX}$=170 m. In a second example, a DOF may range from $R_{MIN}$=0 m to $R_{MAX}$=50 m and another DOF from $R_{MIN}$=35 m to $R_{MAX}$=80 m. In the second example, the two DOFs are partially overlapping at a region ranging from 35 m to 50 m.

In some embodiments, the gated imaging apparatus may be configured so that each object in a scene is imaged by at least two different DOFs. It should be noted that the terms "DOF" and "slice" may herein be used interchangeably.

It is noted that for the purposes of the discussion that follows, a DOF is defined with reference to an instant position of the light source and image sensor operating in timed coordination (e.g., in temporal synchronization) with each other. If the light source and image sensor are spatially fixed to the moving platform, the DOF can also be defined with respect to an instant position of the moving platform. The light source(s) and image sensor(s) employed for realizing gated imaging may be considered to be located relatively close to each other so that an offset in their position in a direction perpendicular to an illumination direction z can be considered negligible. Moreover, the light source(s) and image sensor(s) are considered to be fixed in position relative each other. In some embodiments, the light source(s) and image sensor(s) employed for realizing gated imaging may be considered to be in a fixed position between them to employ compensation for any delay in light propagation between them, which may for example be caused by a triggering signal delay provided for commencing an activation and/or a deactivation signal delay provided from the camera to the light source. For example, a fixed time offset may be added or subtracted due to a delay in light propagation from the light source(s) to the image sensor(s)), because the light source(s) and sensor(s) are not co-located. In some embodiments, a time offset may additionally or alternatively taken into account a difference in the propagation of control signals provided by the controller for controlling the light source(s) and sensor(s).

Moreover, to simplify the discussion that follows, the expression "providing reflection-based image data descriptive of an image slice", as well as grammatical variations thereof, may herein also be simply referred to as "providing an image slice".

In an embodiment, the gated imaging apparatus is operative to produce image data descriptive of the scene based on ambient light originating, e.g., from artificial and/or natural light sources. The term "ambient light" as used herein may refer to light that free of radiation components produced responsive to actively illuminating the scene by the light source(s) of the gated imaging apparatus. Natural light sources may for example comprise sunlight, starlight and/or moonlight. Artificial light sources may for example comprise city lights, road lighting and/or platform light (e.g. vehicle headlights). Optionally, artificial light sources may include light sources of other gated imaging apparatuses.

The gated imaging apparatus is operative to provide useful image data not only under good visibility conditions (e.g., daytime with no glaring sunlight, etc.) but also under poor visibility and adverse weather conditions including, for example, during nighttime, rain, snow, smog, water/mud spray, dust, fog and/or under glaring lighting conditions (e.g., glaring sunlight, glaring due to oncoming vehicle high-beams). For instance, the gated imaging apparatus is operative to produce useful image data even if sunlight is directly incident onto the image sensors. In addition, the gated imaging apparatus can be operative under different environmental scenes such as airborne, over land, over water and/or underwater. For example, the gated imaging apparatus may be mounted on a vehicle and operate in off-road, urban and inter-city roads. The gated imaging apparatus may further be operative to determine distance information about a scene region (e.g., one or more objects located in the scene, etc.) illuminated by the light source and imaged by the plurality of pixel elements of the one or more image sensors.

It should be noted that the term "determining distance information" (as well as grammatical variations thereof) may also encompass the meaning of the expressions "determining an estimate of distance information", "determining depth information", "depth mapping", as well as "estimating distance information". It is further noted that the expressions "distance", "depth" and "range" may herein be used interchangeably.

The distance information may be determined relative to the platform central axis of view (z-Axis) of the one or more image sensors and may, for example, comprise luminance information of an object surface in proportion to the distance of the object surface from the one or more image sensors.

The gated imaging apparatus may be employable in perimeter surveillance applications, autonomous vehicle functions, advance driver assistance systems (ADAS) functions, vehicle cabin monitoring, indoor surveillance, home gaming, home appliances control, in gesture recognition and/or other 3D range information-based applications.

In an embodiment, depth information (also: depth map information, estimated depth) about a scene region, which may comprise an object, may be determined based one or more first pixel values that belong to a first DOF range, and further based on one or more second pixel values that belong to a second DOF range. As already indicated herein above, the first and the second DOF range may be at least partially overlapping with regards to their depth ranges to define an overlapping DOF region, e.g., for depth mapping an object located in the overlapping DOF region. Optionally, the fields of view (FOVs) of the pixels and/or image sensors that are employed for imaging corresponding slices may be overlapping. Optionally, the fields of illumination FOIs of the light sources that are employed for imaging corresponding DOFs (also: slices) may be overlapping. In some embodiments, the one or more first and second pixel values may be descriptive of the same object. In some embodiments, the one or more first and second pixel values may be descriptive of different objects and utilized for determining depth information about a slice portion of a scene region or object, e.g., by employing one or more approximation techniques.

A training or calibration phase may be employed for obtaining an estimation model that can then be used for depth mapping estimation for determining, in an operational phase, a depth estimate. The training phase may for example comprise regression analysis (e.g., for weighted average or polynomial fitting in the operational phase), maximum likelihood, backpropagation (for neural networks in the operational phase) and/or any other suitable technique. The depth estimate can be obtained using various methods such as weighted average, polynomial fitting, lookup tables, neural networks, and/or any other suitable technique.

For example, during operational phase, a 3-slice (i.e. three slices) based depth estimation process is employed in which a depth is estimated for each pixel based on its gray level values at the three different slices—$x1$, $x2$, $x3$. In the operational phase, these three values can constitute the input to a polynomial function $f(x1, x2, x3)$ for estimating the corresponding range by summing a linear combination of the three arguments up to some order. The polynomial function $f(x1, x2, x3)$ was generated or modeled during the calibration phase.

During the calibration phase, a regression analysis-based estimator for example, can be constructed by modeling a relationship between a set of training data descriptive of raw measurements of various DOFs illuminated by a predetermined set of gating profiles, and depth information obtained for the scene region included in the various DOFs using a technique other than gated imaging.

In some embodiments, depth information that is determined based on gated imaging may constitute training data.

Optionally, newly determined depth information may constitute training data for a subsequent step of determining depth information. Hence, in some embodiments, a training model may be updated adaptively and "on-the-fly". In other words, calibration of gated imaging apparatus may be performed "on-the-fly", i.e., while moving platform is traversing the scene.

In an embodiment, depth information of an object may be determined based on one or more first pixel values in the overlap DOF region and belonging to the first DOF range, and further based on one or more second pixel values in the overlapping DOF region and belonging to the second DOF range.

In an embodiment, the first one or more pixel values may be in the overlapping DOF region whereas the second one or more pixel values may be outside the overlapping DOF region.

In an embodiment, the gated imaging apparatus may comprise a gated imaging (GI) analysis engine that is, inter alia, operative to determine depth information of the one or more objects located in the scene.

In an embodiment, the plurality of pixel elements of one or more image sensors may be grouped (also: temporal-spatially arranged) into two or more subsets of pixel elements for producing reflection-based image data that is descriptive of at least two different DOF ranges, respective of the two or more pixel subsets.

A group of pixel subsets refers to the plurality of subsets that is activated and deactivated in timed coordination for imaging a corresponding plurality of desired DOFs.

For example, a first pixel subset of one or more image sensors may be employed for imaging a first DOF, and a second pixel subset of the same one or more image sensors may be employed for imaging a second DOF.

Optionally, a first subset of pixel elements may have a spatial and/or temporal activation/deactivation pattern that is different from the spatial and/or temporal activation/deactivation pattern of a second subset of pixels or pixel elements.

To simplify the discussion that follows, the term "subset of pixel elements" may herein also be simply referred to as "pixel subset" or "subset", and is used to indicate a selection of at least two pixel elements to form a subset. In an embodiment, a subset may be composed of two or more pixel elements of a certain image sensor. In another embodiment, a subset may comprise of two or more pixel elements shared by at least two image sensors. For example, three pixel elements of a first image sensor and two pixel elements of a second image sensor may together form a subset of pixels or pixel elements.

In an embodiment, at least two pixel elements of one or more image sensors may be independently controllable. Optionally, each pixel element of the one or more image sensors may independently controllable.

In an embodiment, two different pixel subsets of the one or more image sensors may be independently controllable by the controller.

In an embodiment, the two or more respective DOF ranges respective of the two or more subsets of pixel elements may be read out in a single image frame (also: pixel value readout step).

In an embodiment, various gating profiles may be employed for producing reflection-based image data of a DOF range. Such gating profiles may be expressed by rectangular, trapezoid, triangle, and/or other geometries, or by arbitrary shapes not necessarily having a specific geometry. In other words, a gating profile can assume any practically applicable shape. A gating profile can be expressed as the result of performing convolution between a function describing the pulsed light and a function describing the pixel exposure (or sub-exposure). It is noted that the term "gating profile" can be defined for a given DOF, inter alia, by a pixel exposure profile. A triangular gating or intensity detection profile of smaller area than the trapezoid profile can be obtained, for example, by setting the integration duration to be equal or shorter than the illumination duration. A trapezoid-shaped gating profile can be obtained, for example, by setting the integration duration to be longer than the illumination duration, which in turn causes a collection of photons reflected from more distant objects that otherwise (in a triangular mode) would not be imaged by the sensor(s). Accordingly, for a given illumination duration, a trapezoid gating profile has a wider base than a triangular gating profile.

Correspondingly, to image a desired DOF, the illumination duration can be shorter for a trapezoid gating profile than for a triangular gating profile. In other words, a trapezoid gating profile can sweep a desired range of interest with less energy than with its triangular equivalent. In view of the aforesaid, a sweep or the imaging of a desired DOF can be done faster with a trapezoid than with a triangular gating profile.

The reconstruction of depth information for a range of interest is possible when it is imaged by at least two slices of different DOFs that overlap at least partially.

In some embodiments, general gating profiles, i.e., gating profiles without any constraint of their shape can be obtained by combining several, and optionally different, gating schemes in a single readout frame.

In an embodiment, the gated imaging apparatus is operative to automatically provide, simultaneously and/or sequentially, a plurality of image frames comprising data descriptive of a gated image (i.e. image data with DOF/slice characteristics), data descriptive of a passively acquired image of a scene (i.e. an image based solely on ambient light) and/or data descriptive of depths range information (i.e. 3D map information). The image frames that may be provided by the gated imaging apparatus may include data descriptive of additional or alternative types of scene information.

Reference is now made to FIG. 1. A moving platform 90 may comprise a gated imaging apparatus 100 for imaging a scene 200.

Moving platform 90 may for example embody a land-based vehicle including, for instance, a passenger car, a motorcycle, a bicycle, a transport vehicle (e.g., a bus, truck, a rail-based transport vehicle, etc.), a watercraft, an aircraft (e.g., to facilitate formation flying), a robot, a pedestrian wearing gear that incorporates gated imaging apparatus 100, a submarine, a multipurpose vehicle such as a hovercraft and/or the like. Optionally, such vehicle may be a fully autonomous vehicle (for example a self-driving car) and/or partially autonomous vehicle. Gated imaging apparatus 100 may for example provide enhanced object detection and forward collision warning (e.g., for automatically triggering a vehicle's braking systems) and, optionally, improve detectability of objects having a comparatively low Radar cross-section (RCS) objects.

Further, moving platform 90 may embody, for example, a multifunction mobile communication device such as a "Smartphone", a laptop computer, a tablet computer, a wearable device and/or a notebook computer. Optionally, moving platform may be embodied by a helmet mounted display (HMD) and/or any other wearable display device. For example, a gated imaging apparatus may be implemented by a smartphone which may be mounted on car's dashboard. In a further example, light sources and image sensors of a gated imaging apparatus may be integrated with or mounted on the frame of a pair of glasses that is configured to overlay gated imaging information coaxially (including substantially coaxially) with the field of view of the glasses' wearer. In yet further examples, only some components of a gated imaging apparatus may be comprised in a multifunction mobile communication device and/or in a wearable device.

Optionally, gated imaging apparatus 100 may be wearable by a person and operative to produce visual, audible and/or tactile output that conveys information about a distance of the person from object 202. Such person may for example be visually impaired.

Scene 200 may comprise one or more objects 202. In order to distinguish between each of the objects 202, capital alphabetic characters are added after the numerals, for example, objects 202A, 202B, and 202C. However, when there is no need to particularly distinguish each of the objects, they are simply and collectively referred to as objects 202.

Objects 202 may comprise, for example, artificial light sources (e.g., vehicle lighting for forward, lateral and/or rear illumination, signaling lighting; traffic lights; street lighting; flickering light emitting diodes (LEDs); interior lighting seen from the street; emergency lighting, etc.), natural light sources (e.g., moonlight, sunlight, starlight, etc.), and/or reflective objects including, for instance, diffuse reflective objects (e.g., pedestrians, cyclists, vehicles, curbs, road debris, animals etc.); and/or retroreflective objects (e.g., retroreflective road signs; retroreflective tapes, retroreflective paint, and/or other conspicuity devices that may be provided on vehicles, pedestrians, and/or other traffic participants to increase their conspicuity).

In an embodiment, gated imaging apparatus 100 may comprise one or more light illumination and detection (ID) engines 110 and one or more gated imaging (GI) analysis engines 120.

Depth mapping is, in principle, performed relative to an ID engine coordinate system that is spatially fixed to ID engine 110 and descriptive of a position and orientation of ID engine 110 relative to a World Coordinate System (WCS). WCS which may for example be expressed by the Cartesian coordinates $X_{WCS}$-$Y_{WCS}$-$Z_{WCS}$. In one embodiment, ID engine 110 may be movably (e.g., rotatably) mounted on moving platform 90. In another embodiment, ID engine 110 may be spatially fixed relative moving platform 90. Merely to simplify the discussion that follows, without be construed limiting, at least some of the embodiments of the discussion that follows may to the case where ID engine 110 is considered to be fixed in space relative to moving platform 90 (e.g., both light sources 112 and image sensors 114 are spatially fixed relative to moving platform 90 when mounted and/or comprised in moving platform 90). Accordingly, depth mapping can be considered to be performed relative to a platform coordinate system which is descriptive of an orientation and position of moving platform 90 relative to the world coordinate system. Optionally, the origin O of the platform coordinate system may always coincide with the origin O of the ID engine coordinate system. Optionally, when the orientation and position of the ID coordinate system are spatially fixed relative to moving platform 90, both the orientation and origin O of the ID coordinate system may always coincide with the orientation and origin of the platform coordinate system. In the latter case, the expressions ID coordinate system and platform coordinate system may be used interchangeably.

It is noted that the expression "gated imaging operating parameters" as used herein may also refer to parameters employed by GI analysis engine 120.

ID engine(s) 110 and GI analysis engine(s) 120 may be realized by one or more hardware, software and/or hybrid hardware/software modules, e.g., as outlined herein.

It is noted that while components of gated imaging apparatus 100 are shown as being comprised in moving platform 90, this should by no means be construed limiting. For instance, in some embodiments, GI analysis engine 120 may be implemented by a computing platform 300 that is located remotely from moving platform 90. Such computing platform 300 may for example comprise a server (which may relate to one or more servers and/or a distributed computer system implemented, e.g., on other vehicles (not shown).

The term "engine" as used herein may comprise one or more computer modules, wherein a module may be a self-contained hardware and/or software component that interfaces with a larger computerized system. A module may comprise a machine and/or machines executable instructions. A module may be embodied by a circuit or a controller programmed to cause the system to implement the method, process and/or operation as disclosed herein. For example, a module may be implemented as a hardware circuit comprising, e.g., custom VLSI circuits or gate arrays, Application-specific integrated circuit (ASIC), off-the-shelf semiconductors such as logic chips, transistors, and/or other discrete components. A module may also be implemented in programmable hardware devices such as field programmable gate arrays, programmable array logic, programmable logic devices and/or the like.

ID engine 110 may include one or more light sources 112 (e.g., a laser, a LED, etc.), image sensors 114, and one or more controllers 116 for controlling the operation of light source(s) 112 and image sensor(s) 114.

Light source 112 is operative to emit pulsed light 113 and may for example operate in the ultraviolet spectrum, the visible spectrum, NIR and/or Short Wave Infra-red (SWIR). Light source 112 may comprise, for example, a LED, Laser (e.g. a vertical cavity surface-emitting laser (VCSEL), an edge emitter, or a quantum dot laser) and/or any other type of light source operative to pulsed light in a controlled manner.

Image sensor 114 is operative to sense light 117 incident thereon. Responsive to the light incident thereon, signal values can be produced for generating reflection-based image data 118. Image sensor 114 may be embodied, for example, by a charge-coupled device (CCD) sensor or a complementary metal-oxide semiconductor (CMOS) sensor for implementing, e.g., an active pixel sensor (APS) array. Optionally, image sensor 114 may also be realized as a hybrid sensor (e.g., a readout integrated circuit (ROIC) CMOS, an indium gallium arsenide (InGaAs) based photodetector, a mercury cadmium telluride (MCT) based photodetector), with or without gain, etc.).

In an embodiment, image sensor 114 may comprise receiver optics (not shown) that is operative to convey at least the electromagnetic wavelengths similar to those provided by light source 112. In an embodiment, the receiver optics (not shown) may be operative to focus incoming light onto the light sensitive area of image sensor 114. Such receiver optics (not shown) comprise, for example, a lens assembly having a focal length of 16 mm and f-number of 1.2.

In an embodiment, the receiver optics may be operative to function as a band pass filter for filtering out certain wavelength spectrums. The receiver optics (not shown) may be mounted externally on the lens assembly and/or internally in the lens assembly. The receiver optics (not shown) may be configured to transmit, for example, 90% of the wavelengths emitted by the light source 112, and, for example, have full width at half maximum (FWHM) transmission wavelength band of 30 nm, and an out band blocking of optical density of at least 3 (i.e. transmission of at least 0.001%).

In an embodiment, the receiver optics (not shown) may be operative to filter various light polarizations and/or to polarize light. For example, the receiver optics may comprise a lens assembly that functions as a linear polarizer, having an extinction ratio of, for example, at least 1:1,000, at least 1:2000, e.g., up to $1:10^6$. The receiver optics (not shown) may be mounted perpendicular to a polarized light source 112. In an embodiment, the lens assembly of the receiver optics (not shown) may have a telecentric design to at least reduce or even eliminate the effect of magnification shift or parallax error which may otherwise occur for light reflected from scene 200 into the receiver optic's lens assembly if no telecentric design was employed.

In an embodiment, image sensor 114 can be operative to detect modulated electromagnetic radiation. Responsive to the detection of modulated electromagnetic radiation, image sensor 114 may be activated (e.g., start accumulating photons). For instance, image sensor 114 may be configured such that the sensor is activated responsive to the detection light emitted by light source 112. Optionally, image sensor 114 may be activated or set in an ON state only if at least some of the light reflected from scene 200 originates from light source 112. Image sensor 114 may for example include a synchronization mechanism (not shown) that is adapted to detect electromagnetic radiation originating from light source 112, and further operably coupled with image sensor 114 for selectively activating image sensor 114 responsive to the detection of electromagnetic radiation originating from light source 112. For example, the synchronization mechanism (not shown) is configured to cause image sensor 114 to be exposed to continuous or partially continuous (e.g., pulsed) wave modulation originating from light source 112.

It is noted the terms "ON" state (also: activated) and "OFF" state (also: deactivated) can include substantially opened and substantially closed, such that an open shutter may (only) accumulate a significant percentage (i.e., not necessarily 100%) of the reflected photons and a closed shutter may nonetheless accumulate a small percentage (i.e., not necessarily 0%) of the reflected photons. An ON image sensor state may mean a relatively open sensor and an OFF image sensor may mean a relatively closed sensor.

While controller(s) 116 is schematically illustrated as being external to image sensor(s) 114, this should by no means be construed limiting. Accordingly, in some embodiments, controller 116 may be comprised (e.g., embedded) in image sensor(s) 114. For instance, image sensor 114 itself may implement the controlling of pixel elements.

GI analysis engine 120 may include one or more processors 122, memories 124 for implementing one or more image processing applications 126.

Elements of ID engine 110 and GI analysis engine 120 may be operatively coupled with each other, e.g. may communicate with each other over one or more communication buses (not shown) and/or signal lines (not shown), for implementing gated imaging methods, processes and/or operations, e.g., as outlined herein.

In an embodiment, gated imaging apparatus 100 may comprise one or more communication modules 130, user interfaces 140, and power modules 150 for powering the various components, applications and/or elements of gated imaging apparatus 100.

Without derogating from the aforesaid and merely to simplify the discussion that follows herein, the above-referenced one or more elements having identical or similar functionality and/or structure may herein be referred to in the singular. For instance, "the one or more light source(s) 112" may herein be simply referred to as "light source 112".

The term "processor", as used herein, may also refer to a controller, and vice versa. A processor such as for example processor 122, and a controller such as for example controller 116 may be implemented by various types of controller devices, processor devices and/or processor architectures including, for example, embedded processors, communication processors, graphics processing unit (GPU)-accelerated computing, soft-core processors and/or embedded processors.

Memory 124 may include one or more types of computer-readable storage media including, for example, transactional memory and/or long-term storage memory facilities and may function as file storage, document storage, program storage, or as a working memory. The latter may for example be in the form of a static random access memory (SRAM), dynamic random access memory (DRAM), read-only memory (ROM), cache and/or flash memory. As working memory, memory 124 may, for example, include, e.g., temporally-based and/or non-temporally based instructions. As long-term memory, memory 124 may for example include a volatile or non-volatile computer storage medium, a hard disk drive, a solid state drive, a magnetic storage medium, a flash memory and/or other storage facility. A hardware memory facility may for example store a fixed information set (e.g., software code) including, but not limited to, a file, program, application, source code, object code, data, and/or the like.

Communication module 130 may, for example, include I/O device drivers (not shown) and network interface drivers (not shown) for enabling the transmission and/or reception of data over a communication network 190 for enabling, e.g., communication of components and/or modules of gated imaging apparatus 100 with components and/or modules of moving platform 90 and/or for enabling external communication of gated imaging apparatus 100 such as vehicle-to-vehicle (V2V), vehicle-to-infrastructure (V2I) or vehicle-to-everything (V2X). For example, components and/or modules of gated imaging apparatus 100 may communicate with computing platform 300 via communication network 190. A device driver may for example, interface with a keypad or to a Universal Serial Bus (USB) port. A network interface driver may for example execute protocols for the Internet, or an Intranet, Wide Area Network (WAN), Local Area Network (LAN) employing, e.g., Wireless Local Area Network (WLAN)), Metropolitan Area Network (MAN), Personal Area Network (PAN), extranet, 2G, 3G, 3.5G, 4G including for example Mobile WIMAX or Long Term Evolution (LTE) advanced, 5G, Bluetooth® (e.g., Bluetooth smart), ZigBee™, near-field communication (NFC) and/or any other current or future communication network, standard, and/or system.

User Interface 140 may for example include a keyboard, a touchscreen, an auditory and/or visual display device including, for example, a head up display (HUD), an HMD and/or any other wearable display; an electronic visual display (e.g., an LCD display, an OLED display) and/or any other electronic display, a projector screen, and/or the like.

Power module 150 may comprise an internal power supply (e.g., a rechargeable battery) and/or an interface for allowing connection to an external power supply.

Reverting to ID engine 110, controller 116 may execute instructions stored in a memory to cause the execution of the gated imaging methods, processes and/or operations as described herein. It is noted that controller 116 may be external to the image sensor(s) 114 and/or internal, i.e., comprised in the image sensor(s) 114.

Light source 112 is operative to illuminate scene 200 with pulsed light 113, schematically indicated herein to propagate in space in positive Z direction. Responsive to illuminating scene 200, light may be reflected from objects 202 located within scene 200 and detected by image sensor 114 to produce "reflection-based" image data 118 for processing by GI analysis engine 120.

The activation and deactivation of light source 112 and image sensor 114 can be performed in timed coordination (e.g., synchronized) with each other, e.g., by controller 116, to allow the controlled imaging of one or more DOFs or slices of scene 200. The activation and deactivation of light source 112 and image sensor 114 may be implemented electronically and/or mechanically (e.g. shutter, DMD).

In an embodiment, light source 112 may include emitter optics (not shown) operative to project light, to polarize and/or filter light according to its polarization. Emitter optics (emitter optics) may further be adapted to diffuse light (e.g. by employing holographic diffuser, optical lenses etc.), and/or project one or more FOIs. In an embodiment, emitter optics (not shown) may include a wavelength controller that is based, e.g., on an electrical method (e.g. thermo-electric cooler), a mechanical method, an optical method and/or any other suitable technology that can be employed for controlling (e.g., stabilizing) illumination wavelengths.

In an embodiment, light source 112 may comprise a light source controller (e.g., implemented as a part of controller(s) 116) and power supply (e.g., implemented as a part of power module(s) 150). Optionally, electrical power can originate from and be provided via electrical power lines (not shown) of moving platform 90. Optionally, the light source controller may be operative to drive pulsed and/or modulated illumination. Optionally, the light source controller may be operative to control operating parameters of the emitter optics (e.g., of a wavelength controller). Optionally, the light source controller may be operative to receive and adapted to operate according to control signals (e.g., a trigger signal) provided by a main controller. Such main controller may for example be implemented as part of controller 116.

According to some embodiments, light source 112 may be integrated with and/or arranged in proximity to vehicle functional lights lighting and signaling devices. With respect to automotive lighting for instance, light source 112 may be integrated, for example, with headlamps, auxiliary lamps, front/back fog lamps, cornering lamps, spotlights, front/back position lamps, daytime running lamps, lateral lights, turn signal lamps, rear position lamps, brake lights, reversing lamps and/or end-outline marker lamps, etc. Optionally, light source 112 may be integrated with and/or arranged in proximity to retroreflective objects. In some embodiments, light source 112 and image sensor 114 may be positioned on and/or incorporated in roof of the vehicle. In some embodiments, light source 112 may be a standalone unit.

In an embodiment, light source 112 may comprise two or more light emitting units (not shown) operative to emit light with respectively different parameters. For example, a first light emitting unit may be operative to emit light at a first wavelength range (e.g., in the NIR spectrum) and a second light emitting may be operative to emit light at a second wavelength (e.g., in the SWIR spectrum, in the visible spectrum).

In an embodiment, light source 112 may be a Class 1 laser product (based on IEC 60825-1, edition 3) where the light source intensity (i.e. output optical power) is controlled as a function of the platform 90 velocity. For example, above 5 KPH, light source 112 may operate at full optical power, whereas when the speed of platform 90 is equal or lower than 5 KPH, the light source optical power may be reduced or its operation even stopped.

Referring to GI analysis engine 120, processor 122 may execute instructions stored in memory 124 resulting in image processing application 126. Merely to simplify the discussion that follows, methods and processes disclosed herein may be outlined herein in conjunction GI analysis engine 120.

In an embodiment, GI analysis engine 120 is operative to implement depth mapping of an object 202. In other words, GI analysis engine 120 is operative to determine and assign a depth value to one or more pixel elements descriptive of an object 202. Gated imaging apparatus 100 is operative to perform depth mapping at a resolution that, for example, is 1 meter or less, or 0.5 meter or less.

Figure 2:
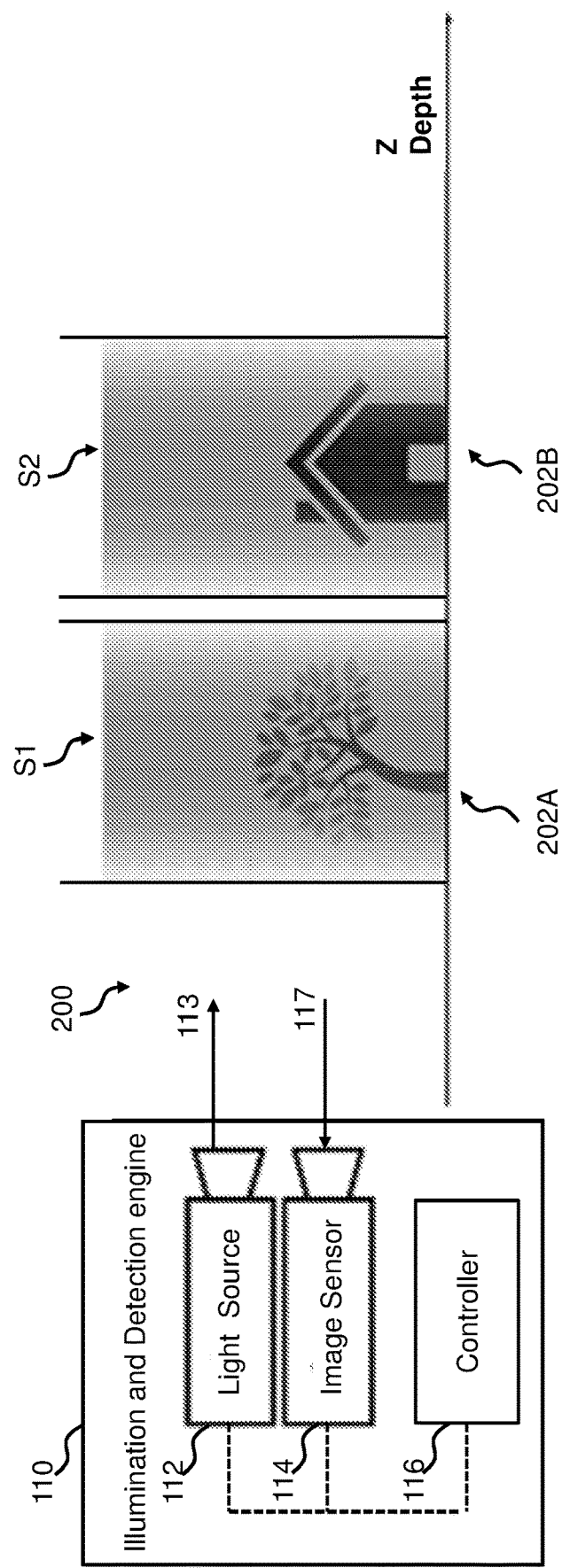
FIG. 2 is a schematic illustration of the gated imaging of objects in a scene, according to some embodiments.
Figure 3:
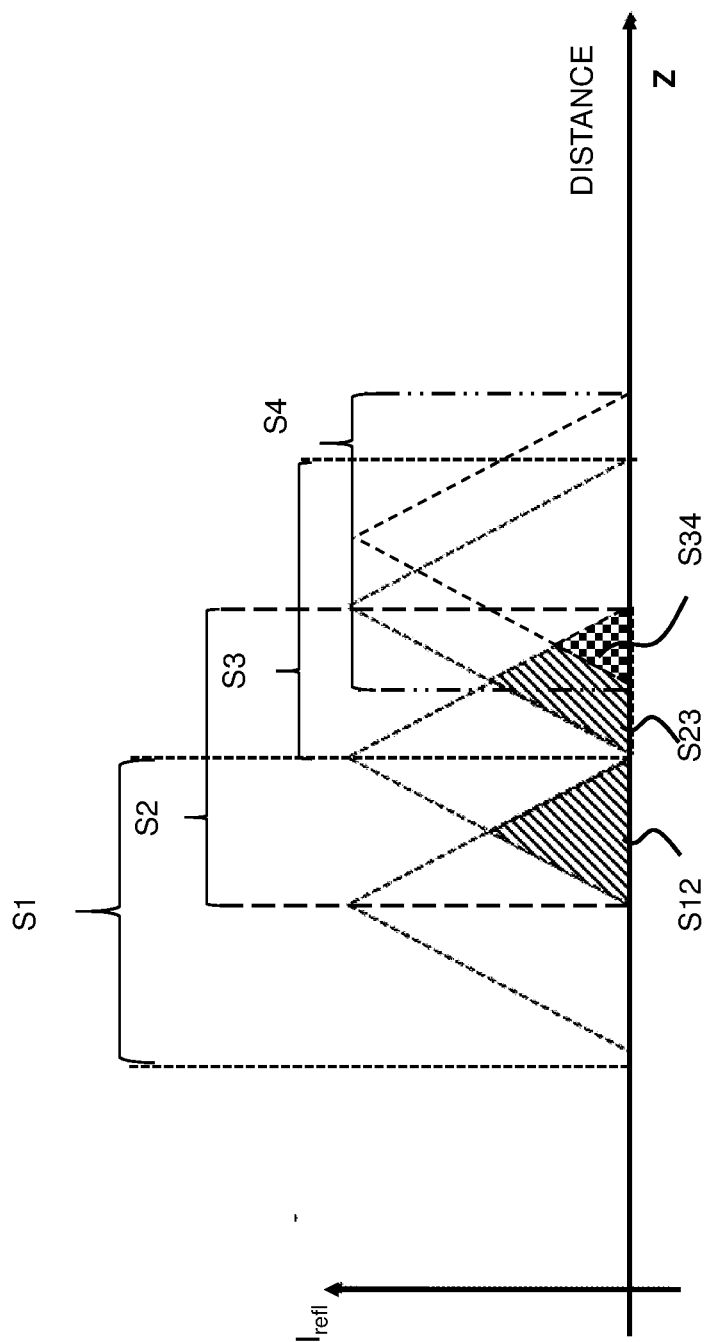
FIG. 3 is a schematic illustration of employing gated imaging using triangular gating profiles, according to some embodiments.

Additional reference is made to FIG. 2 and to FIG. 3. ID engine 110 is configured to controllably (also: selectively) illuminate different slices such as, for example, slices S1-S4, e.g., simultaneously or sequentially. The gating may be performed using gating operation parameter values such to obtain two or more slices that are at least partially overlapping to obtain one or more overlap regions such as, for example, overlap region S12 (resulting from partial overlap between slice S1 and S2), overlap region S23 (resulting from partial overlap between slice S2 and S3) and overlap region S34 (resulting from partial overlap between slice S3 and S4). In the example schematically shown in FIG. 3, for a given DOF, the exposure of pixel elements may linearly increase to a maximum that configured to be in the center of the slice. From the center of the slice, the exposure may then decrease from the maximum exposure to zero.

The gating profiles and overlap patterns shown in FIG. 3 are not to be construed limiting and are for illustrative purposes. Accordingly, any additional or alternative intensity gating profile and/or overlap pattern may be employed suitable, e.g., for performing depth mapping of pixel value relating to an object 202. Accordingly, a gating profile does not necessarily have to be "triangular" as exemplified in FIG. 3.

Figure 4A:
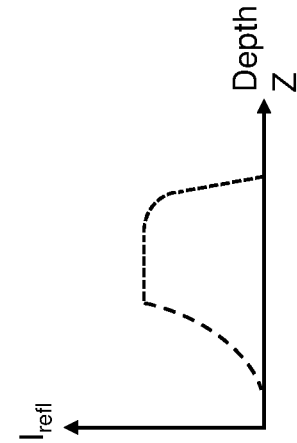
FIGS. 4A-4C are schematic illustrations of alternative individual gating profiles, according to some embodiments.
Figure 4B:
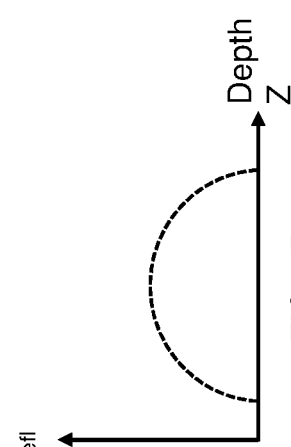
Figure 4C:
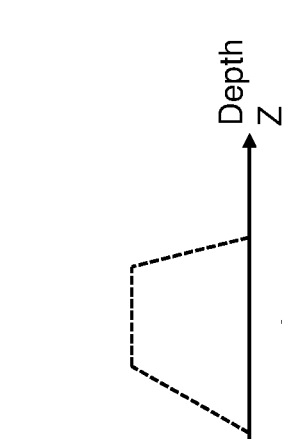

Additional or alternative example gating profiles are illustrated in FIGS. 4A-4B schematically showing a trapezoid gating profile (FIG. 4A), and a curved gating profile (FIG. 4B). FIG. 4C schematically illustrates an example of an "arbitrary" gating profile which delineates a substantially polygonal shape (including, a substantially polygonal shape) with curved and/or straight vertices and/or edges. Optionally, at least two different gating profiles may be generated for any given frame.

In some embodiments, different gating profiles normal to Z may be generated, i.e., laterally in X-Y direction, e.g., by mutually controlling the emission of light from two or more light sources 112 such to generate interference patterns in a controlled manner.

The accuracy or resolution of depth maps that can be obtained may vary as a function of Z, with decreasing resolution the greater the distance Z, due to dispersion of the photons. Analogously, the resolution of depth maps may decrease the greater the distance from the optical axis Z. In other words, the closer to the center of the FOV, the more accurate may be a depth map estimation.

Figure 4G:
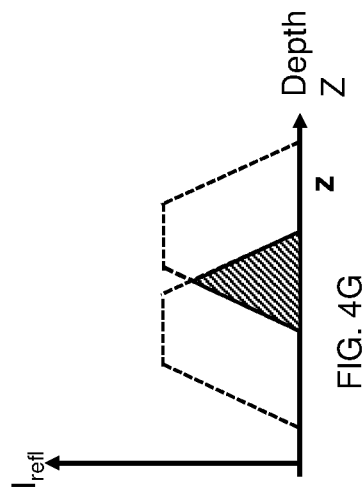
FIGS. 4D-4G are schematic illustrations of further alternative gating profiles and overlap patterns, according to some embodiments.
Figure 4F:
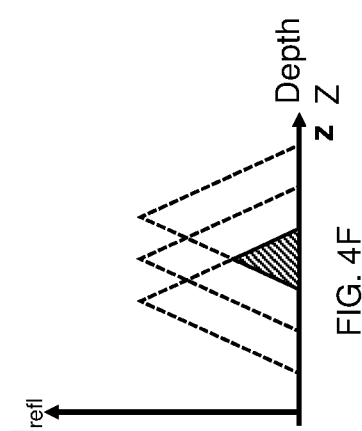
Figure 4E:
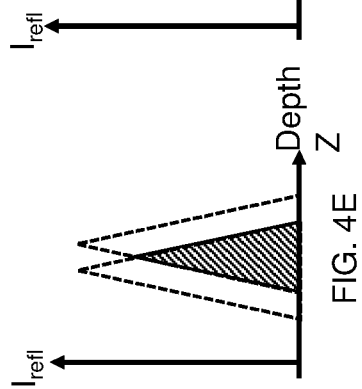
Figure 4D:
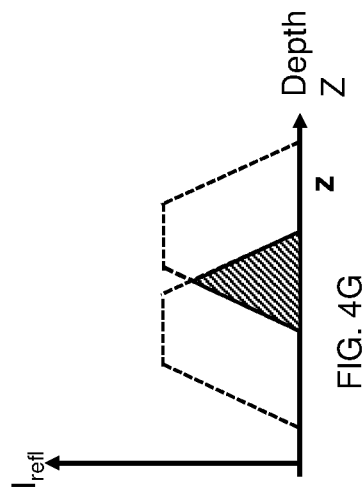

Various comparatively different overlap patterns are exemplified in FIGS. 4D to 4F for triangular gating profiles. For instance, FIG. 4D schematically shows wide triangular gating profiles with large overlap compared to the gating profile and overlap pattern shown in FIG. 4E schematically exemplifying comparatively narrow profiles and small overlap. A triangular gating profile may for example be obtained by setting the exposure time to be equal or shorter than the illumination time period. FIG. 4F schematically exemplifies a multiple overlap gating profile, i.e., a gating sequence in which the same area is gated two times or more. FIG. 4G schematically exemplifies partially overlapping trapezoid gating profiles which are created when the illuminating duration and the integration duration are different from each other. For example, by setting the integration duration to be longer than the illumination duration, a trapezoid shaped gating profile is created. A trapezoid gating profile as for example shown in FIG. 4G may be obtained by setting the exposure time to be longer (e.g., twice) the illumination time period.

In some embodiments, values relating to gating operation parameter values may be predetermined. In some embodiments, values relating to gating parameter values may be adapted (also: modified, adjusted) automatically (e.g., iteratively) "on-the fly" and/or dynamically, e.g., depending on an input received at gated imaging apparatus 100.

Optionally, values relating to gating parameters may be configurable "on-the-fly" by a user of gated imaging apparatus 100. Such user may for example include a driver, pilot and/or passenger of moving platform 90, and/or an administrator of gated imaging apparatus 100. Optionally, some values relating to some gating operation parameters may be predetermined while some others may be adapted "on the fly", e.g., automatically or by the user. Gated imaging operating parameter values may, for example, relate to: slice ranges; range of overlap region; amount of slice overlap; image frame readout duration; frame readout start time; frame readout end time; numbers of pixel subsets in an image readout frame; number of pixel elements per subset; exposure time of the pixel elements of a pixel subset; rise time and/or fall time of a pixel element; rise time and/or fall time of the pixel elements of a pixel subset; efficiency of signal transfer relating to a pixel element (e.g. by controlling the transfer gate(s) voltage), to the pixel elements of a pixel subset, and/or to an image readout frame; image sensor pixel data readout bandwidth per image frame; spatial resolution of data descriptive of the depth mapping (e.g., reduction by 25% and e.g., corresponding increase in spatial resolution), e.g., according to data storage available; image sensor FOV (e.g. to compensate for decreased accuracy or resolution at FOV boundaries compared to the center of the FOV); image sensor Region-of-Interest (ROI); pulsed light duration(s) per image frame; number of times a pulsed light is emitted per image frame; a pulsed light rise time; a pulsed light fall time; peak power of a pulsed light (e.g., per image frame); light power per slice; pulsing frequency of a pulsed light, e.g., for a certain image frame; individual pulse width; wavelength and/or polarization of light emitted by light source; light source FOI; gated imaging DOF starting point (i.e. $R_{MIN}$), gated imaging DOF end point (i.e. $R_{MAX}$); gated imaging DOF Signal-to-Noise ratio (SNR); number of DOFs per image readout frame, gated imaging DOF profile; and/or image data fusion schemes per image frame, etc. A reduction in spatial resolution may be compensated by correlating a signal value produced by a given pixel element with the signal values produced by neighboring pixel elements (pixel elements that are neighboring to the given pixel element).

A single sub-exposure of an image sensor pixel element can be defined as an exposure that occurs at least once prior a pixel readout. The same pixel element of the image sensor may have multiple sub-exposures (activation and deactivation) prior to its readout.

The number of pulses and sub-exposures and/or duration may be adapted to meet day and night lighting conditions. For instance, in nightlight conditions, sub-exposure duration of each subset of pixel elements may be comparatively longer than during daylight conditions. In another example, operating parameters may be adjusted to meet fast changes in environmental lighting conditions (e.g., when entering a tunnel). In a yet other example, depth mapping may be performed for a closer DOF when driving at relatively slow velocity compared to the DOF when driving at a higher velocity. In other words, the higher a driving velocity, the more distant may be the DOF for which depth mapping may be performed. Optionally, values of gated imaging operating parameters may be adapted according to the type and/or behavior of an object in an imaged DOF(s).

In some embodiments, values of gating operation parameters may be adjusted to obtain reflection-based image data that provides comparatively improved information (e.g., improved image quality for a desired purpose) such as, for example, reduced motion-induced artifacts (e.g., reduce "edge" artifacts), easier object segmentation, backscatter reduction or elimination (e.g., from aerosols such as fog and/or dust), reduce or eliminate oversaturation, blooming effects in the image sensor (for example, by collecting fewer pulses from shorter distances, by adjusting the light intensity and/or the shape of an emitted pulsed light to adjust the overall exposure level of the camera to near-field scenery and avoid high intensity reflections from very close objects); increase Signal to Noise Ratio (SNR); a reduction in required illumination power (e.g., 50% reduction in illumination like, e.g., laser power) to obtain comparatively similar image quality; to provide comparatively more uniform effective illumination of the desired DOF) and/or increased contrast, compared to the information that would have been obtained if no adaptations had been made to the gating operation parameter values. In an embodiment, high intensity light conditions (e.g., bright daylight) may be dealt with by subtracting passive image data that is descriptive of passive image information from image data that comprises both passive and reflection-based image data. The subtraction may be performed pixel-wise and prior to the optional display of image information.

As a result of adjusting gating parameter values, correspondingly different gating profiles and/or slice overlap patterns may for example be obtained. Gating parameters may not only relate to the gating profiles and/or overlap patterns but, for example, also to pulsed light parameters including, for example, intensity, frequency, form, phase, and/or polarization.

In some embodiments, an optimization logic may be employed for determining the gating operating parameter values. For example, predetermined or default gating operation parameter values may be employed by ID engine 110 producing reflection-based image data for processing by GI analysis engine 120. Based on the result(s) of the processing of the reflection-based image data, image processing application 126 may provide controller 116 with instructions to use updated gating operation parameter values which may be different from the predetermined gating parameter values.

As already mentioned herein, based one or more first pixel values that belong to a first slice, and further based on one or more second pixel values that belong to a second slice, gated imaging apparatus 100 is operative to determine depth information for an object 202 located in scene 200 illuminated by light source 112.

Using the method disclosed herein, one or more pixel values $PV_{n,m}$ (optionally, each pixel) of an image sensor 114 are associated with a distance z as a function of the pixel values $PV_{n,m}$ obtained from at least two of the available slices Sn of different DOFs having an overlap region. It is noted that an estimate for distance z may be determined also for a pixel value which is outside the overlap region. In the discussion that follows, pixel elements PE are considered to be arranged in a gated imaging apparatus x-y coordinate plane that is perpendicular to GI apparatus axis z.

Figure 5B:
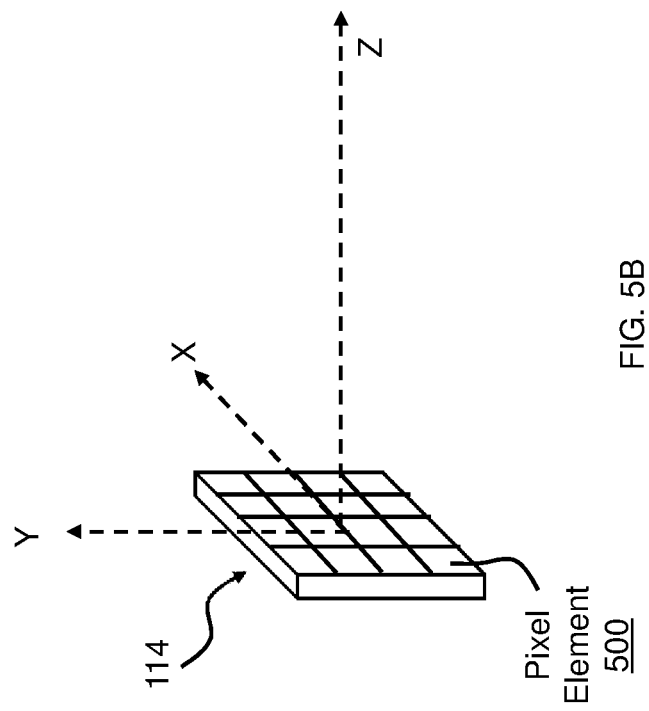
FIG. 5B is a schematic isometric illustration of an image sensor, according to some embodiments.
Figure 5A:
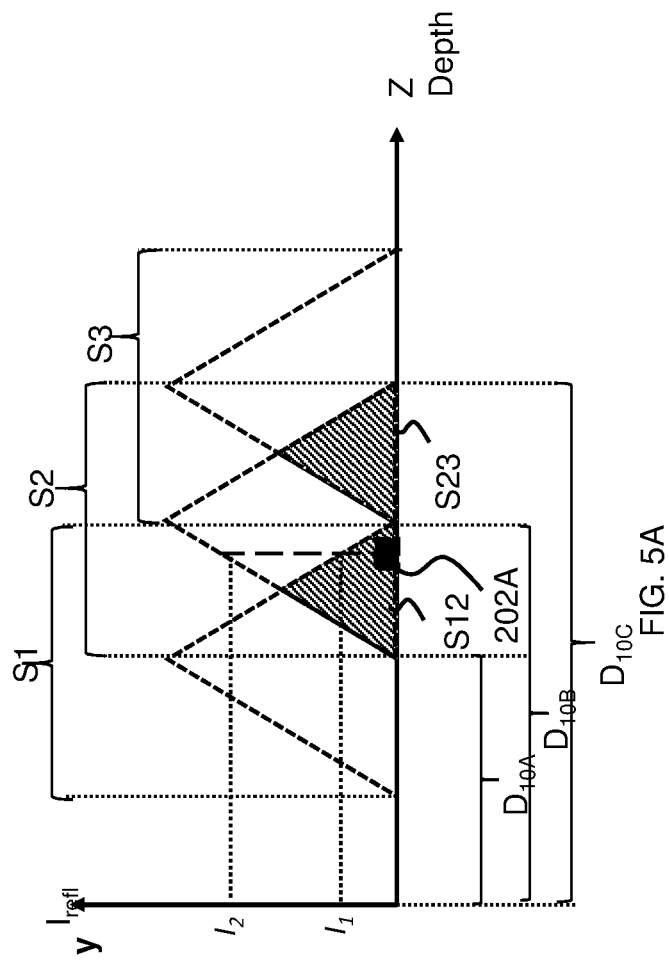
FIG. 5A is a schematic illustration an object imaged by three depth of field (DOF) profiles, according to some embodiments.

Additional reference is made to FIG. 5A and to FIG. 5B. When employing gated imaging, a pixel value produced by a pixel element (also: PE) 500 imaging an object is proportional to the distance z of the imaged object from image sensor 114. Generally, the method may include generating a plurality of gating profiles such that for each one of one or more (e.g., at least two) selected pixel positions of an array, over a desired range or DOF of a scene being imaged, a plurality of sets (e.g., vectors) of pixel-related values (e.g., brightness and/or color) descriptive of an object being imaged over the desired range is obtained, wherein with respect to each one of the one or more (e.g., at least two) selected pixel positions of the array, the obtained plurality of sets of pixel-related values is injectively or one-to-one mapped to a respective plurality of imaged distances over the desired range. The at least two pixel-related values of a set that is associated with a selected pixel position can be used to offset for differences in reflectance of different surfaces of an object and/or two or more objects. In an embodiment, the set of injectively mapped pixel-related values may be based on the values of a plurality of pixels (e.g., an average of four spatially neighbouring pixels).

A depth map z(x,y) may be expressed, e.g., as follows:

$$z(x,y)=f(I_{1,refl}(x,y),I_{2,refl}(x,y),\ldots I_{s,refl}(x,y),\theta) \qquad (1)$$

wherein the function f can accept as an input a vector of length s and can be of various types of function families (e.g. polynomial, trigonometric, neural network of various topologies, etc.) parametrized by a set of coefficients determined in a training or calibration phase by executing a calibration or training method according to one or more estimation models.

A pixel value produced by pixel element 500 imaging object 202 in scene 200 is proportional or corresponds to the value (denoted as "$I_{refl}$") of the gating profile. Scene 200 can be illuminated with at least two different gating profiles that are constructed to image the same object 202. In other words, the at least two different gating profiles are constructed to (e.g., consecutively or simultaneously) image an overlapping DOF region in which the object is located. The same object 202 is thus imaged in an overlapping DOF region at least twice by the at least two different gating profiles.

Optionally, the DOF imaged by one gating profile may be fully encompassed by the DOF of another gating profile. Optionally, the distance over which $I_{refl}$ spans (e.g., the slices imaged by two different trapezoid gating profiles) may be equal and aligned with each other. Otherwise stated, a first gating profile that is different from a second gating profile may image the same DOF. Optionally, two gating profiles may suffice for depth mapping of an object 202, provided that the one gating profile is monotonically increasing and the other gating profile is monotonically decreasing with at least partial overlap between the two gating profiles.

In view of the aforesaid, responsive to imaging object 202B located at a distance z from image sensor 114 using three different gating profiles, each pixel element is associated with a vector having a length of three $v=[I(x_1,y_1), I(x_2,y_2), I(x_3,y_3)]$, wherein elements $I(x_1,y_1)$, to $I(x_n,y_n)$, n=3, denote the pixel values obtained respective of the three different gating profiles for each gated pixel element 500 of image sensor 114. Optionally, more than three pixel values may be associated with each gated pixel element 500.

In order for the depth mapping to be invariant with respect to various parameters including, for example, different object reflectance, differences between pixels' gain and offset, and/or the like, each vector (which has a length of comprises at least two pixel values), may be normalized to obtain normalized a vector $\tilde{v}$ that has a mean of 0 and a standard deviation of 1, as follows:

$$\tilde{v}=(v-<v>/std(v)) \quad (2)$$

where $<v>$ denotes the mean and $std(v)$ the standard deviation of the pixel values of vector v.

The at least two different gating profiles are configured such that, for a gated pixel element 500, each distance $z_i$ from image sensor 114 to an object in the scene 200 is mapped one-to-one with a normalized vector $\tilde{v}_i$ of pixel values. Otherwise stated, over a certain desired (e.g., maximum) ranging interval $z_{interv}$ that may be defined according to practical and operable limitations, for a given pixel element, any distance z of an object 202 from image sensor 114 is injectively mapped with a corresponding normalized vector $\tilde{v}$ of at least two pixel values, which are respectively obtained responsive to imaging the object located in an overlapping DOF region with at least two different gating profiles. Hence, for a given pixel element, the normalized vectors $\tilde{v}$ that can be obtained responsive to performing a procedure of gated imaging are different from one another for any distance z and object (identical and/or different objects) being imaged. The injective mapping may be performed for all pixel elements 500 participating in a gated imaging procedure. It is noted that, optionally, identical normalized vectors $\tilde{v}$ may be obtained for different distances z only if the identical normalized vectors $\tilde{v}$ are associated to different pixel elements.

Using a normalized vector $\tilde{v}$, an estimate of a distance z of object 202 from image sensor 114 may be determined by building one or more estimation models having estimation model parameters θ and which are based on, for example, a finite series of functions of the elements of a normalized vector $\tilde{v}$ (e.g., polynomial function, harmonic function); an n-dimensional lookup table (LUT), and/or a feedforward neural network. A variety of training algorithms may be employed for different estimation models. For instance, linear regression for a function series estimator, and backpropagation for a feedforward neural network.

The estimation model has estimation model parameters θ that can be determined in a training phase (also: calibration phase), based on a set of different normalized "reference" vectors vref which are mapped, in the training phase, with their respective reference ranges or reference distances. For instance, in the training phase, a set of different normalized reference vectors is generated by imaging an object with a respective number of different gating profiles having corresponding desired DOFs. The values (herein denoted "$I_{refl}$") of a gating profile is mapped with their corresponding reference distance $z_{ref}$ using (e.g., in a garage) range measurement equipment that is independent of the gated imaging apparatus employed for generating in the training phase the different gating profiles.

The following example outlines how a distance or range estimation can be determined based on a series of polynomials and consecutive imaging of slices or DOFs. Considering for example that a given pixel produces, for a certain distance, the following 3 pixel values for 3 different and consecutive slices: v=[55, 213, 101]. The mean and standard deviation of vector v are 123 and 81.265 respectively. The corresponding normalized vector $\tilde{v}$=[−0.8368, 1.1075, −0.2707]. Further, the following is an example of a second degree polynomial with some (previously learned) estimation model parameters (e.g., coefficients):

$$d(\tilde{v})=55+11.3*\tilde{v}_1-6.2*\tilde{v}_2-0.11*\tilde{v}_3+2.3*(\tilde{v}_1)^2+0.85*(\tilde{v}_2)^2+0.33*(\tilde{v}_3)^2. \quad (3)$$

By plugging $\tilde{v}$ into $d(\tilde{v})$ the estimated range is obtained which is 41.32[m]. In the example equation 3, the exponent values of the elements are calculated and the result thereof summed up to obtain a scalar output, which is then multiplied by the corresponding coefficient. Clearly, additional or alternative mathematical manipulations may be performed to arrive at the estimated range, e.g., depending on the estimation model and algorithm employed.

The following equation 4 may be considered as representing a special case of equation 1.

$$z(x,y) = \frac{\sum_s [\alpha_s(x,y) \cdot I_{s,refl}(x,y)] \cdot D_s}{\sum_s [\alpha_s(x,y) \cdot I_{s,refl}(x,y)]} \quad (4)$$

wherein $\alpha_s(x,y)$ is a correction term or coefficient that is associated with each pixel and respective slice s; $I_{s,refl}(x,y)$ is the pixel value at location x,y for slice s; and $D_s$ is a parameter.

If all $\alpha_s(x,y)$ are set to be equal to 1, the following equation is obtained:

$$z(x,y) = \frac{\sum_s [I_{s,refl}(x,y) \cdot D_s]}{\sum_s I_{s,refl}(x,y)} \quad (5)$$

which can be rewritten as:

$$z(x,y) = \sum_s \left(\frac{I_{s,refl}(x,y)}{\sum_s I_{s,refl}(x,y)}\right) \cdot D_s \quad (6)$$

Equation 6 is in fact, just a 1st degree polynomial estimation of the depth based on (differently) normalized gray level values.

In some embodiments, pixel values relating to external light sources and/or of other pixel elements, may be taken into account (e.g., subtracted or offset) to arrive at the depth map z(x,y), e.g., as follows in equation 7:

$$z(x,y)=f(I_{1,refl}(x,y)-O(x,y), \quad (7)$$

$$I_{2,refl}(x,y)-O(x,y),$$

$$\ldots I_{s,refl}(x,y)-O(x,y),\theta)$$

wherein O(x,y) stands for the pixel values of the scene, measured without, (e.g., before) active illumination, and therefore captures the ambient light contribution to the active illumination measurements. As already indicated herein, θ represents the estimation model parameters of an estimation model (e.g., the coefficients of a polynomial obtained in the training phase).

It is noted that estimation model parameters θ may be updated dynamically "on-the-fly", during the operation of gated imaging apparatus 100. Generally, a gating profile can be seen as a concept or construct that is used to facilitate expressing a relationship between an illumination function that is descriptive of the illumination duration and intensity emitted by the light source(s), and a sensor function that is descriptive of the exposure time of the sensor(s) that are employed for sensing light reflected from a scene responsive to illuminating the scene according to the said illumination function. The convolution between the two functions produces a function which is the "gating profile" (also: detection function) and which is, inter alia, indicative of the amount of light intensity detected by the sensor(s) during a "gating" time period. In other words, the gating profile incorporates or describes the operating parameters of the light source(s) and the sensor(s), which are expressed by the respective illumination and sensor functions.

When the illumination and the sensor function are rectangular and of equal length, the obtained gating profile is triangular. On the other hand, the convolution of two unequal length illumination and sensor functions results in a trapezoid-shaped gating profile. When for example the image sensor exposure time period is set to be twice as the illumination period, a trapezoid gating profile is obtained that has three sections with equivalent lengths Δz. If the trapezoid gating profile is shifted by a distance Δz for each consecutive slice, overlapping trapezoids can be obtained for which each point in space is illuminated by exactly one plateau, one positive slope edge and one negative slope edge. Additional factors that influence the shape of the gating profile include, for example, delay time between light emission and sensor exposure, and/or pulsed light and/or sensor exposure rise and fall shape.

In an embodiment, once depth information relating to an object 202 is associated with one or more pixel position of image sensor 114, "neighborhood"-based procedures may be invoked including, for example, filtering artifacts (e.g., filtering out multiple reflections and edge artifacts), spatial filtering, averaging, corrections, deblurring, object segmentation for performing neighborhood-based operations on reflected-based image data that is descriptive of a certain region-of-interest of scene 200, validating depth information based on information received from other sensors, etc.

In an embodiment, gated imaging apparatus 100 may be configured to image scene 200 with a DOF of fixed width and constant distance from moving platform 90, e.g., as measured from the DOF's lower boundary to platform 90). For example, depth mapping may be performed for a DOF of up to 100 m from platform 90. While platform 90 is moving, scene 200 is traversed by ID engine 110 and depth information is collected for the area traversed by the DOF.

As already indicated herein, the boundaries of a DOF for which a depth map is generated may be altered, e.g., adaptively and automatically. More specifically, the distance of the DOF's lower boundary from ID engine 110 and/or the distance between the upper and lower boundary of a DOF may be adjusted dynamically on-the-fly. In one example, the distance of a DOF's lower boundary from ID engine 110 may be controlled to remain constant, while the distance of the DOF's upper boundary may be controllably adjusted. In another example, the distance of a DOF's upper boundary from ID engine 110 may controlled to remain constant, while the distance of the DOF's lower boundary from ID engine 110 may be controllably adjusted. In a yet further example, the distance between a DOF's lower and upper boundary as well as the distance of the DOF's lower boundary (or alternatively, the DOF's upper boundary) from ID engine 110 may be controllably adjusted.

For example, in a first operating mode, depth mapping may be implemented with a slice of comparatively narrower DOF to attain a depth map of higher resolution than in a second operating mode that uses a wider DOF than the first operating mode. In a further example, a DOF may be controllably adjusted as a function of a distance to an object and/or as a function of the size of the object being imaged. Optionally, the larger the object, the wider the DOF. Analogously, the smaller the object, the narrower may be the DOF. The range of a DOF may depend on the outcome of object classification. Optionally, for an object classified as "large", a comparatively wide DOF may be employed than for objects classified as "small". Optionally, wider DOFs may be employed for the depth mapping of cars than for the depth mapping of pedestrians, animals and/or the like. The classification of objects may be based on feature extraction including, for example, according to the number of legs (2 legs for humans, 4 legs for animals), "V"-shape two-legged walkers, direction of traversing, velocity, height, and/or the like.

Optionally, the range of the DOF may depend on the velocity of an object relative to ID engine 110 and/or its distance from ID engine 110. For example, the higher the velocity of an oncoming vehicle and the further away the object from ID engine 110, the wider may be the DOF, and the DOF imaging the oncoming vehicle may be controllably narrowed, the closer the vehicle to ID engine 110. In the latter case, the distance of the lower boundary from ID engine 110 may remain constant or adjusted (e.g., shifted to come closer to ID engine 110) depending on the distance of the oncoming vehicle from ID engine 110. Analogously, a DOF imaging a distancing vehicle may be controllably increased and the lower boundary may, optionally, be shifted to become more distant from ID engine 110.

Optionally, the DOF may be adjusted depending on visibility conditions. For example, the more adverse the visibility conditions, the smaller may be the DOF (e.g., the DOF may be controllably decreased) and/or the smaller is the maximal range ($R_{MAX}$) and/or additional light pulses per pulsed light and/or longer sensor exposure times are required to achieve an adequate SNR. Analogously, the better the visibility conditions, the wider may be the DOF (e.g., the DOF may be controllably increased) and/or the larger is the maximal range ($R_{MAX}$) and/or less light pulses per pulsed light and/or longer sensor exposures are required to achieve an adequate SNR. Here also, the distance of the DOF's lower boundary from ID engine 110 may be adaptively shifted according to the visibility conditions. It is noted that visibility may be classified using reflection-based data received from gated imaging apparatus 100 and/or by additional sensors and/or systems. For example, under more adverse the visibility conditions the DOF may be of 50 m with a minimal range ($R_{MIN}$) of 5 m and a maximal range ($R_{MAX}$) of 55 m whereas under comparatively better visibility conditions, the DOF may be of 150 m with a minimal range ($R_{MIN}$) of 5 m and a maximal range ($R_{MAX}$) of 160 m.

In some embodiments, gated imaging apparatus 100 is configured to automatically control operating parameters of ID engine 110 and/or GI analysis engine 120.

For example, operating parameters relating to pulsed light 113 may be automatically controllable including, for example, illumination intensity (e.g., by controlling the numbers of activated light emitting elements), frequency, phase, form (e.g., temporal pulse width) and/or polarization of pulsed light 113. In some embodiments, ID engine 110 operating parameters relating to pulsed light 113 may be predetermined or adjusted automatically based on an input received by gated imaging apparatus 100. Such input may for instance be based on an estimate of a depth of an object, e.g., determined by GI analysis engine 120; relate to reflection-based image data generated by image sensor(s) 114; relate to environmental parameters including, for example, scene visibility; the type of vehicle (e.g., land-based vehicle, aircraft, watercraft, submarine vehicle, space vehicle); road conditions (e.g., wet, dry); road type (highway, urban road, countryside road); in case of submarine vehicle: water parameters (freshwater, seawater); traffic parameters (e.g., traffic volume, if there are oncoming objects or not, etc.); type of geographic area in which moving platform 90 is located (e.g., urban area, rural area or sub-urban area); and/or relate to operational parameters of moving platform 90 including, for example, velocity, acceleration rate, deceleration rate, movement (e.g., driving) direction; a region-of-interest of scene 200 to be imaged; parameters relating to driver or pilot (e.g., age, state of health, level of alertness, level of tiredness); operational state of elements of moving platform 90 (e.g., headlights operational functionality), ADAS functions, vehicle control modes, e.g., ranging from a mode in which the driver completely controls the vehicle at all times to a mode of fully-autonomous driving. For instance, gating parameters may be automatically adjusted to compensate for headlight malfunction.

In some embodiments, illumination intensity, element exposure time and/or other operating parameters may be automatically adjusted for different slices in order to compensate for the angular beam divergence and/or for atmospheric attenuation. Such compensation may for instance be attained by increasing the number of pulses and sub-exposures per time period (e.g., per frame), the pulses temporal width, pulse optical peak power and/or the number of illuminating elements employed. For example, the further away from light source 112 the slice S of scene 200 that is to be imaged, the greater may be the illumination intensity of the pulsed light to compensate, e.g., for beam divergence and/or atmospheric attenuation. Optionally, the illumination intensity, form, phase, and/or polarization of each pulse of the pulsed light may be selectively controlled. For example, one or more pulses of a train of light pulses may be controllably emitted at higher power than other pulses of the train. In some embodiments, activation and deactivation timing and/or other operating parameters of the pixel elements may be adjusted, e.g., according a desired ROI of scene 200. Optionally, the gain of a pixel element and/or of a subset of pixels may be controllably adjusted according to, for example, the ambient lighting conditions.

In some embodiments, gated imaging apparatus 100 may be communicably coupled with (e.g., a vehicle's CAN-BUS) moving platform 90 and, optionally, update gating operation parameters according to data received from moving platform 90. In some embodiments, gated imaging apparatus 100 may be configured to automatically control operating parameters of moving platform 90, e.g., responsive to the reflection-based image data.

Figure 6:
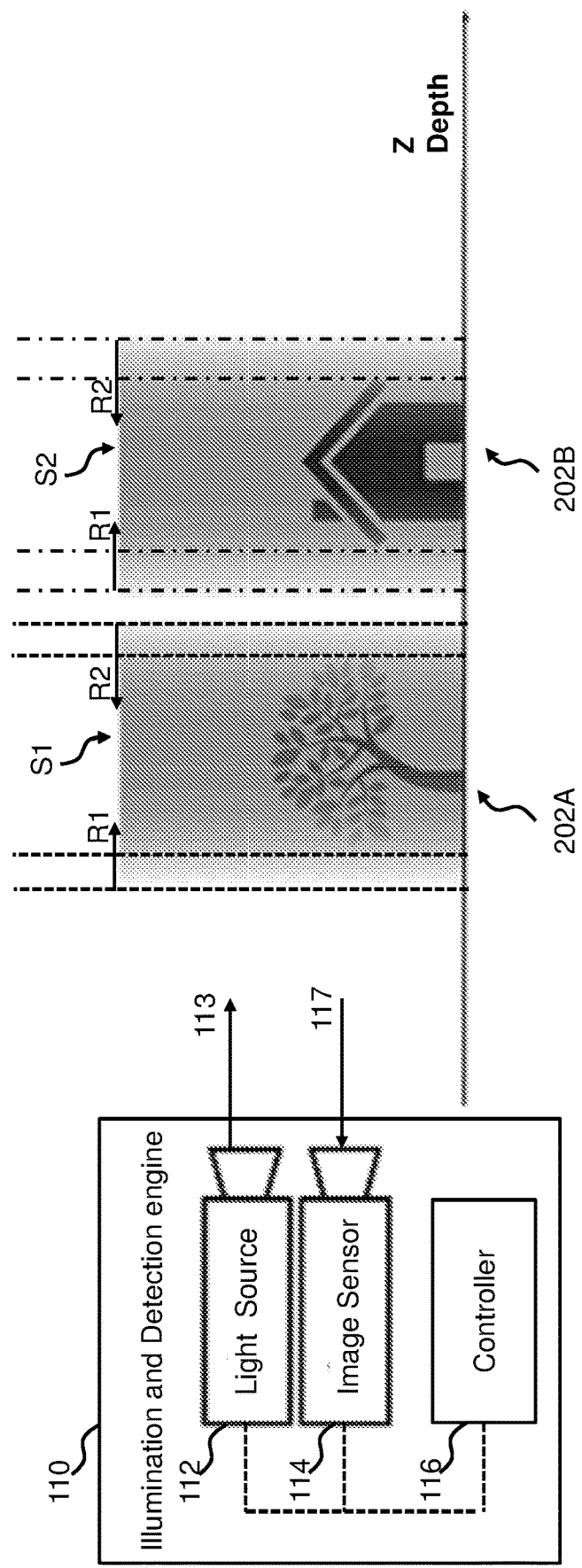
FIG. 6 is a schematic illustration of the gated imaging of objects in a scene by adapting depths of fields (DOFs), according to some embodiments.
Figure 7A:
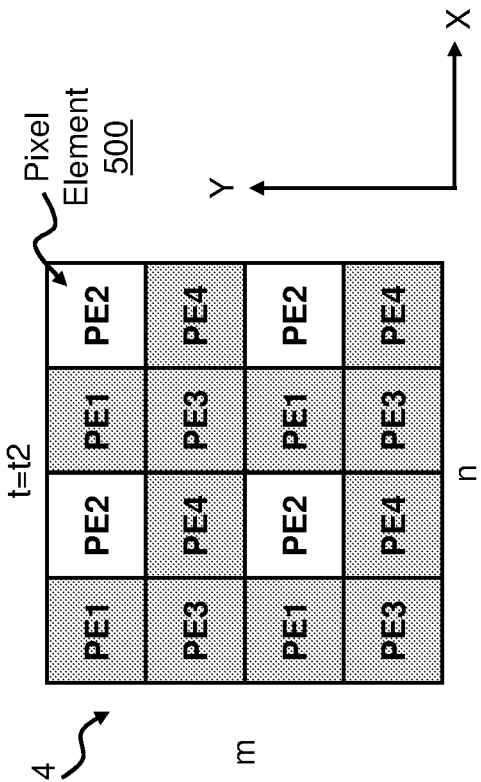
FIGS. 7A-7D schematically illustrate a sequential checkerboard-based activation pattern of an image sensor's pixel elements, according to some embodiments.
Figure 7B:
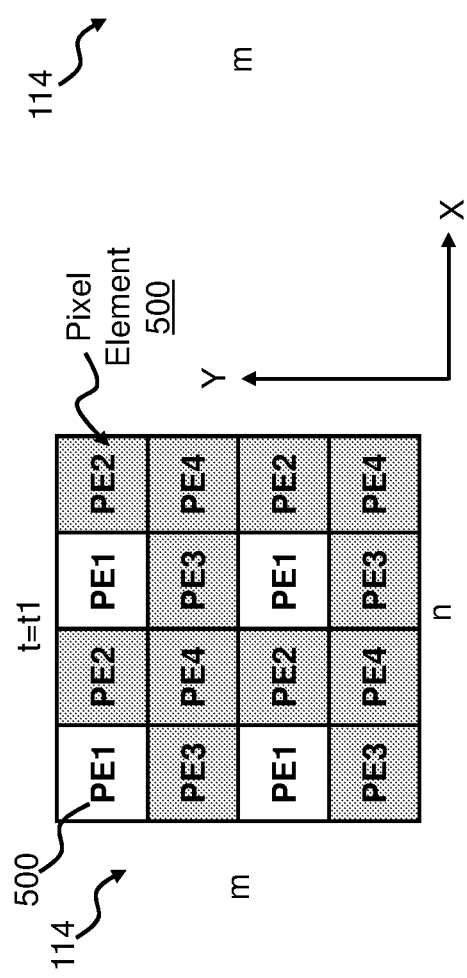
Figure 7C:
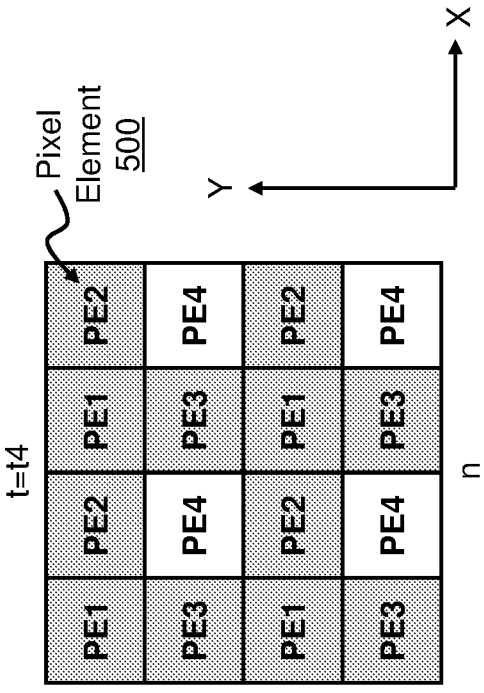
Figure 7D:
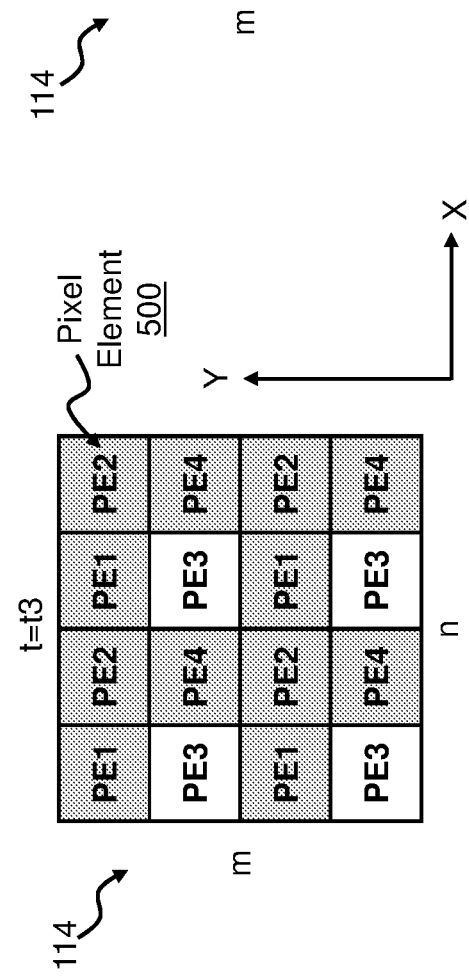
Figure 8A:
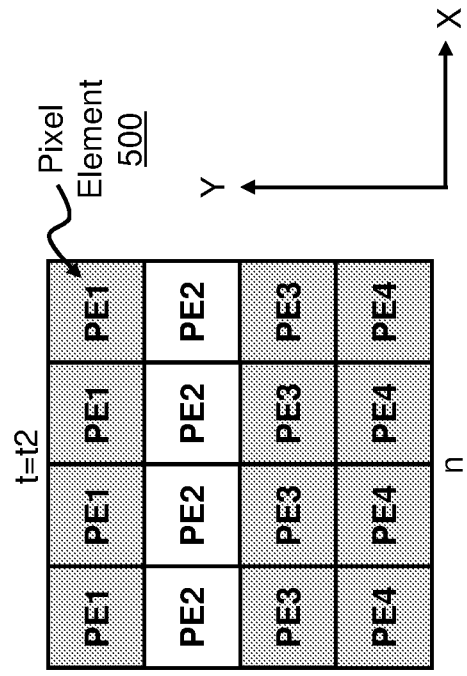
FIGS. 8A-8D schematically illustrate a sequential line-based activation pattern of an image sensor's pixel elements, according to some embodiments.
Figure 8B:
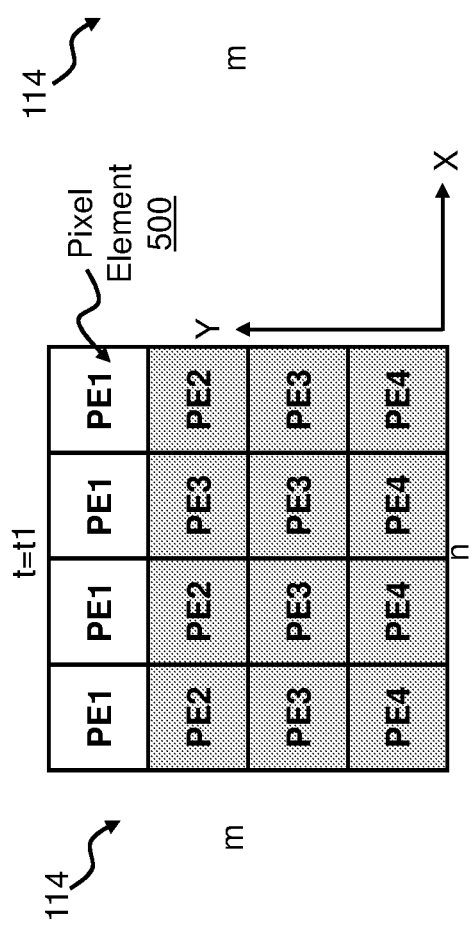
Figure 8C:
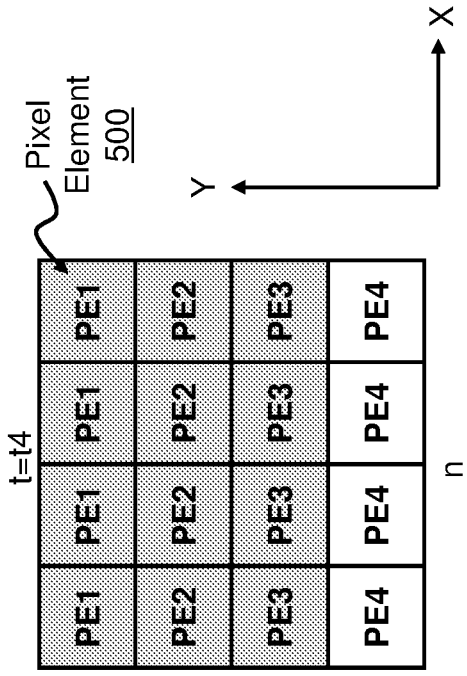
Figure 8D:
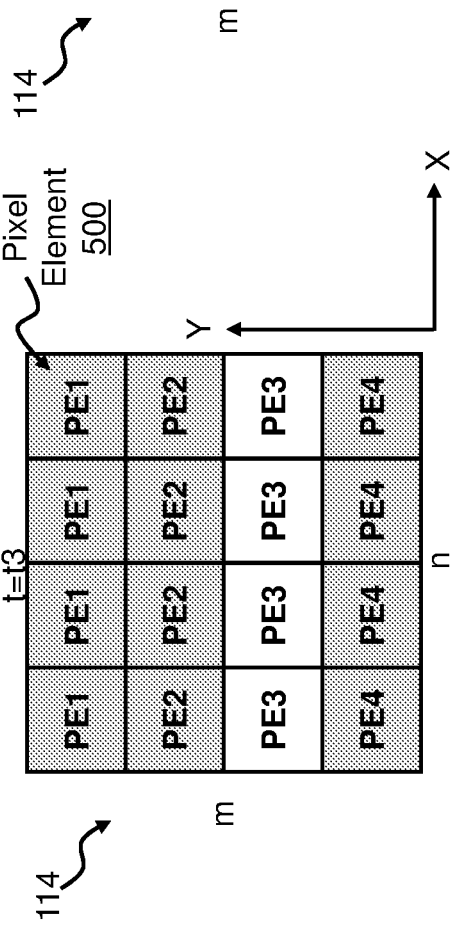
Figure 9A:
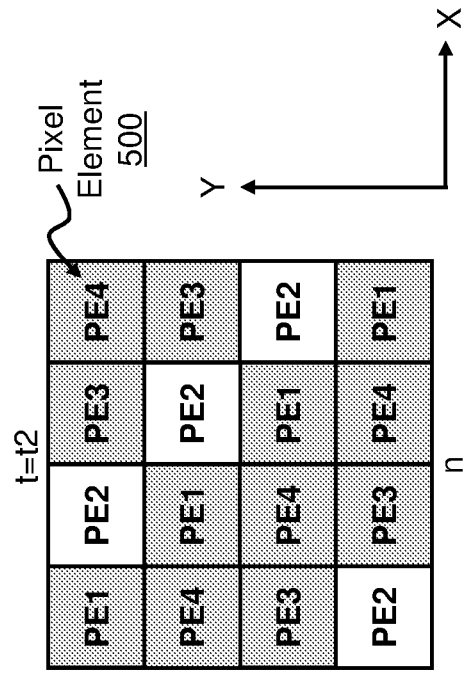
FIGS. 9A-9D schematically illustrate a sequential diagonal-based activation pattern of an image sensor's pixel elements, according to some embodiments.
Figure 9B:
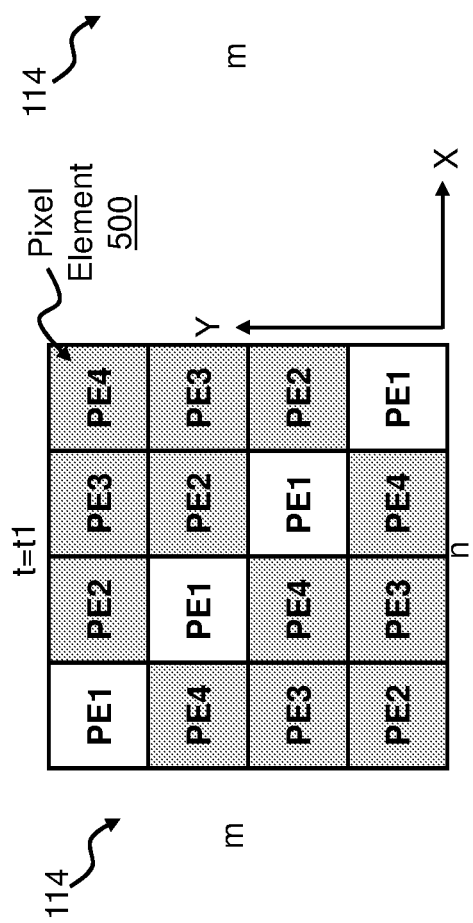
Figure 9C:
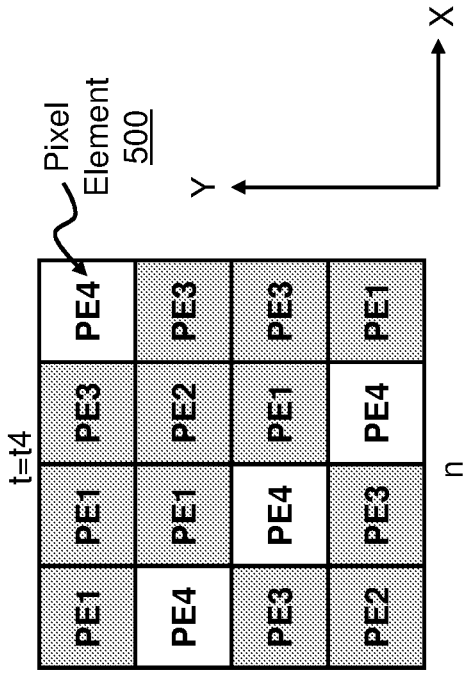
Figure 9D:
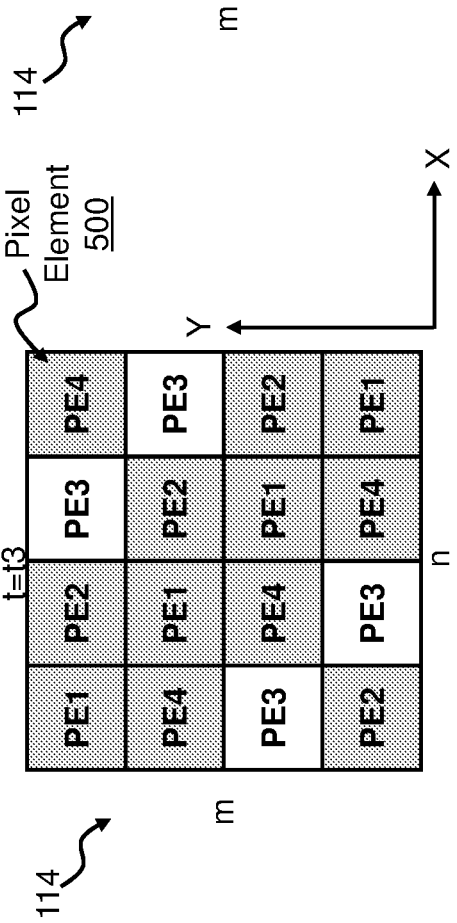

In some embodiments, gating parameters may be adapted automatically, e.g., iteratively, for example to increase the spatial resolution of an object of interest, e.g., by adjusting the DOF of a slice (e.g., narrowing and/or widening) to closer match an estimated depth of an object of interest. For example, as schematically exemplified in FIG. 6, the DOFs of slices S1 and S2 can be automatically iteratively narrowed (as shown schematically by arrows R1 and R2) to match the estimated depths of objects 202A and 202B. In some embodiments, slices S may be adjusted so that an overlap DOF region closer matches an estimated depth of an object of interest. In other words, embodiments of the gated imaging apparatus, system and method enable single target investigation regarding, e.g., depth mapping.

In some embodiments, the gating profile may be adjusted automatically, e.g., based on an estimated shape of an object of interest in a scene region. For example, gated imaging apparatus 100 may be operative to select between one of a triangular or trapezoid gating profile, depending on which gating profile is estimated to better capture the object. For example, objects that are estimated to have a relatively large depth for all heights H, may be better captured with a trapezoid gating profile than with a triangular profile. Optionally, parameters for processing and/or analyzing reflection-based image data by image processing application 126 may be automatically adjusted, e.g., iteratively.

Disclosed apparatuses, systems and methods may be employed in conjunction with various databases (not shown), such as road infrastructure databases, navigation information, and/or crowd-sourced data, and their gated imaging operating parameters updated accordingly. For example, illumination and/or exposure parameters can be updated according to expected road, traffic and/or weather conditions along a planned route. Such databases may be external and/or internal to moving platform 90.

In some embodiments, frame readout may be adjusted, as outlined herein below in more detail. A readout frame may be defined as the transfer of signal values from the pixel elements of the image sensor(s) 114 to memory 124 and/or image processing application(s) 126 for further processing by processor 122. In other words, a readout frame is defined as the process of image sensor data readout from the array of pixel elements of image sensor 114.

In some embodiments, pixel elements PE may be controlled to be responsively exposable to light (e.g., sub-exposured or gated) at least twice during a readout frame. For example, if the lighting conditions worsen, the number of exposures during a certain time period may be increased and/or the gating profiles may be configured to image a scene at comparatively closer ranges. For example, under clear atmospheric conditions, the DOF may have a minimal range ($R_{MIN}$) of 30 m and a maximal range ($R_{MAX}$) of 250 m with 1,000 pulses/sub-exposures per image frame whereas during rain, snow, fog and/or other adverse visibility conditions, the DOF has minimal range ($R_{MIN}$) of 30 m and a maximal range ($R_{MAX}$) of 150 m with 1,200 pulses/sub-exposures per image frame. The multiple sub-exposure of pixel elements PE during an image frame can reduce image artifacts such as edges that may otherwise appear if no sub-exposure per DOF was employed.

Different procedures may be employed for transferring signal values concerning light sensed by image sensor(s) 114 from ID engine 110 to GI analysis engine 120 for further processing and analysis via, for example, any one of the as the following digital interfaces: Low-voltage differential signaling (LVDS) protocols, Mobile Industry Processor Interface (MIPI) protocols, etc.

In some embodiments, signal values relating to a plurality of slices may be read out from image sensor(s) 114 in a respective plurality of frames. For example, signal values relating to slice S1 may be read out in a one frame, and signal values relating to slice S2 may be read out in another frame.

In some embodiments, two or more slices of the plurality of slices may be read out in a single frame. For example, signal values relating to slices S1 and S2 may be readout in one frame.

Optionally, gated imaging apparatus 100 may be configured so that various pixel element exposure and/or frame readout procedures can be employed, e.g., depending on the environmental conditions.

Additional reference is made to FIGS. 7A to 9D. Image sensor 114 comprises a plurality of pixel elements (PE) 500 that may be arranged to realize a certain light filter array. It is noted that the number of pixel elements 500 shown in the figures is for illustrative purposes only and should not be construed as limiting. In some embodiments, one or more of the pixel elements 500 in image sensor 114 may be operated not in accordance with a gated imaging sequence. Such pixel element may be considered to be "passive" in the sense that its operation is not controlled in coordination with light source 112. In other words, the operating parameters of a passive pixel are independent of the operation of light source 112. Pixel elements 500 operating in this "passive" mode may have a single exposure per frame readout or multiple exposures per pixel value readout. A signal value generated by such passive pixel element may for example be used for providing a non-gated pixel data for image processing application(s) 126, e.g., to subtract or offset external signal values relating to external or ambient light sources (e.g., sun light), and/or to subtract signal values originating from other image sensor pixels elements. Optionally, the signal value of a passive pixel element may be employed to set a threshold (e.g., a cutoff value) for other pixel value signal accumulation modes. Optionally, the signal value of a passive pixel element may be used for gated imaging timing/coordination purposes of a scene that is imaged by multiple gated imaging apparatuses 100. Due to the fact that each GI apparatus 100 can operate in a comparatively low overall duty cycle (e.g., any GI apparatus 100 may not necessarily have to emit light all the time) each one of the GI apparatuses may use its passive pixel elements to sense if any one of the other GI apparatuses is actively imaging scene 200. A given gated imaging apparatus may be idle or inactive (not actively image scene 200) during time periods in which the number of actively illuminating apparatuses is above a high threshold. The given gated imaging apparatus may become active in other time periods for performing gated imaging, when the given apparatus senses for the other time periods that the number of actively illuminating apparatuses drops to below a low threshold. In this manner, the probability that the plurality of GI apparatuses adversely affect each other's gated imaging operations (e.g., glare each other) may be reduced or minimized. In some embodiments, the GI apparatuses may operate according to a time-divisions multiplexing procedure so that in a certain geographic area, only one GI apparatus at a time may actively illuminate a scene. In an example, a geographic area may be defined as a geographic region in which there can be direct LOS between moving platforms, when not taking into account other traffic participants. Additionally or alternatively, a geographic area may be a predefined section whose boundaries may be defined by addresses, geographical coordinates, and/or by the location and/or distances from physical objects of the geographic area. In view of the aforesaid, for a given geographic area, the number and/or the identities of the moving platforms that are member of the system may change over time.

The sequential numbering of the pixel elements from PE1 to PE4 shown in FIGS. 7A to 9D is for illustrative purposes only to exemplarily group, a plurality of pixel elements into at least two subsets of pixel elements for producing, at different times or time periods, reflection-based image data that is descriptive of at least two different DOF ranges, respectively. In other words, the numerical subscripts to "PE" (e.g., PE1, PE2, etc.) are used to indicate the association of pixel elements to their respective subsets, which are controllably activated in accordance with an activation sequence. For example, a first subset of pixel elements PE1 may be employed for imaging during a first time period a first DOF range, and a second subset of pixel elements PE2 of one or more image sensors may be employed subsequently for imaging a second DOF range during a second time period after the imaging of the first DOF by the first subset of pixel elements PE1 has been completed. The sequential imaging of the DOFs by the different pixel subsets PEn (e.g., n=1 . . . 4) may be executed repeatedly after completion of a cycle of sequentially imaging DOFs by all pixel subsets of image sensor 114. Another example, a first subset of pixel elements PE1 may be employed for imaging during a first time period a first DOF range, and a second subset of pixel elements PE2 of one or more image sensors may be employed subsequently for imaging a second DOF range during an overlapping (partial or full) time period as of the imaging of the first DOF by the first subset of pixel elements PE1. Both the number of pixel elements in a pixel subset as well as the pixel element positions relative to each other in a pixel subset and further the position of the pixel subsets relative to each other shown in FIGS. 7A-9D is for exemplary purposes only and should not be construed in a limiting manner. Hence, image sensor 114 may employ a different number of pixel elements per subset and/or have a different pixel subset geometries than those discussed herein. The expression "controlling a pixel element" as used herein as well as grammatical variations thereof may refer to the operation of selectively activating (set in an ON state) and deactivating (set in an OFF state) of the pixel elements. In some embodiments, at least two pixel elements PE of image sensor 114 may be independently controllable by controller 116. In some embodiments, each pixel element (also: "PE") 500 of image sensor 114 may be independently or individually controllable by controller 116. In some embodiments, at least two subsets of pixel elements may be independently controllable by controller 116. In some embodiments, for a certain time period, in timed coordination with the activation of light source 112, only a selected subset or selection of pixel elements of image sensor 114 may be activated. The selected subset may be member of a group of selectable subsets of pixel elements. Optionally, the pixel elements of a subset may be selectively activated and deactivated in synchronization, e.g., for imaging a desired DOF. Optionally, pixel elements of a subset may be operated unsynchronized, e.g., to image different regions-of-interest by the pixel elements of the same subset. In some embodiments, distinct pixel subsets may be employed for each DOF being imaged. In some other embodiments, two or more different pixel subsets may be employed per DOF imaging. The activation and deactivation timing of first pixel elements of a pixel subset may be different from the activation and deactivation timing of second pixel elements of a second pixel subset, e.g., for imaging a first and a second DOF that are different from each other. The amount of energy required for operating light source 112 to image scene 200 with a plurality of DOFs in a single frame through the controlled activation and deactivation of a corresponding plurality of subsets of pixel elements of a subset, is lower compared to the energy that would be required if for each DOF, light source 112 and all pixel elements 500 were operated in a gated manner, and the reflection-based image data of each DOF was readout in a separate readout frame. The savings in energy may be at least 10%, at least 20%, at least 30%, at least 40%, at least 50%, at least 60%, at least 70%, at least 80%, or at least 90%.

If depth mapping is performed "regularly", it is obtained using a combination of at least three images (wherein each image represents at least one DOF). Each image frame may require, for example, about 700 pulses or a train of 700 pulses (and, for each frame, a consecutive sensor sub-exposure for collecting light reflected from the scene responsive to illuminating the scene with the 700 pulses) so that 2100 pulses would in total be required. However, if image sensor 114 is activated so that in a single readout frame depth mapping can be performed (i.e., at least three images (wherein each image represents at least one DOF) are obtained in the same readout frame), then only 700 pulses would be required in total. Accordingly, in the above example, the energy saving is about 66%. Reference is made to the following to the following exemplary operating parameters: $P_{laser}$=500 Watt (Optical peak power Laser); TI=0.8 microseconds (Pulse length); η=0.75 (Pulse Shape or fill factor); N=700 (number of pulses per frame); E (Energy per frame)=$P_{laser}$*TI*η*N=0.21 Joule. Considering the aforementioned laser operating parameters, the energy saving in Joule would be about 0.42 Joule. This method (multiple DOF accumulation within a single image frame) provides (compared to a single DOF accumulation within a single image frame):

1. Lower overall system illumination time which; eases multi-platform scenarios, enables GI system to have a lower frame rate, reduces edge artifacts and enables lower image sensor throughput; and 2. lower overall illuminated light which; eases laser safety compliance and reduces the light source emitting component (e.g. laser, LED, etc.) size and/or peak power.

As exemplified in FIGS. 7A-9D, the plurality pixel elements PE of image sensor 114 may be arranged according to an m×n matrix, wherein m defines the row number index increasing along positive Y starting from m=1, and n the column number index increasing in positive X direction starting from n=1. As exemplarily shown in FIGS. 7A-9D, activation and deactivation of pixel elements of image sensor 114 may be spatially and temporally controlled according to a pattern defined by pixel subsets (also: pixel clusters).

In an embodiment, at least two subsets of a group of subsets may comprise a different number of pixel elements. In another embodiment, each subset of the same group may comprise the same number of pixels (e.g., four pixels). The pixel elements that are members of the first subset, second subset, third subset and fourth subset of a group of subsets are respectively designated by alphanumeric labels PE1, PE2, PE3 and PE4.

For example, at a time stamp t1, first pixel subset PE1(1, 1), PE1(1,3), PE1(3,1), and PE1(3,3) is set to be active (operative to sense light) for a time duration Δt, while the remaining pixel elements PE2-PE4 are inactive (inoperative to sense light). At time stamp t2>t1, second pixel subset PE2(1,2), PE2(1,4), PE2(3,2), and PE2(3,4) is set to be active for a time duration Δt while the remaining pixel elements PE1 and PE3-PE4 are inactive. Further, at a time stamp t3>t2, third pixel subset PE3(2,1), PE3(2,3), PE3(4, 1), and PE3(4,3) is set to be active for a time duration Δt while the remaining pixel elements PE1-PE2 and PE4 are inactive. Finally, at time stamp t4>t3, fourth pixel subset PE4(2,2), PE4(2,4), PE4(4,2), PE4(4,4) is set active for a time duration Δt while the remaining pixel elements PE1-PE3 are inactive. Clearly, different sequences of pixel subset activation may be employed, e.g., as follows: For example, second pixel subset PE2 may be first be activated and deactivated, followed by the activation and deactivation of first pixel subset PE1, which is then followed by the activation and deactivation of third pixel subset PE3 and further followed by the activation and deactivation of fourth pixel subset PE4. Considering for instance N pixel subsets in a group, at least N! temporally sequential subset activation/deactivation sequences may be implemented, in embodiments where each pixel subset of a group is to be activated only once per image frame.

In some other embodiments, the activation of a subset of pixels may commence before the activation of a preceding subset of pixels has terminated. For instance, second pixel subset PE2 may be activated while the first pixel subset PE1 is still active, and PE1 may be set to OFF only after a delay time $T_{close}$ from the start time of the activation of PE2. In other words, there may be some temporal overlap in the activation of two consecutive pixel subsets. In other words, at least during a certain time period, the first and second pixel subsets PE1 and PE2 for example may be set to be concurrently active. Clearly, the temporal overlap can be controlled for any type of pixel subsets, and should not be construed limited to PE1 and PE2. Either way, the controlling of the group of pixel subsets can be performed such that the pixel subsets of the group accumulate light reflections that are received responsive to the illumination of the scene by the same pulsed light. As already indicated herein, pulsed light can include a train of light pulses. Alternatively, pulsed light can include a single light pulse.

Specifically referring to FIGS. 7A to 7D, the pixel subsets may be spatially arranged and temporally sequentially activated and deactivated according to a checkered pattern.

As shown in FIGS. 8A to 8D, the pixel subsets may be spatially arranged and temporally sequentially activated and deactivated according to a horizontal line pattern. Analogously, the pixel subsets may optionally be spatially arranged and temporally sequentially activated and deactivated according to a vertical line pattern (not shown).

As shown in FIGS. 9A to 9D, the pixel subsets may be spatially arranged and temporally sequentially activated and deactivated according to a diagonal pattern.

The checkerboard and line patterns referred to herein should not be construed as limiting. Accordingly, pixel elements may be arranged into subsets exhibiting alternative concurrent spatial activation and deactivation patterns than those illustrated in the Figures including, for example, rectangles, triangles, hexagons, octagons, diamonds, staggered squares, staggered rectangles, staggered triangles, staggered diamonds, Penrose tiles (or any other non-periodic spatial pattern), rhombuses, and distorted rhombuses. Accordingly, pixel elements may delineate the shape (not illustrated) of, for example, rectangles, triangles, hexagons, octagons, diamonds, staggered squares, staggered rectangles, staggered triangles, staggered diamonds.

In some embodiments, the activation of two or more pixel subsets may be at least partially temporally overlapping. In other words, the exposure time of different subsets of pixels may be at least partially overlapping. For example, at least during a certain time period, the first and second pixel subsets PE1 and PE2 may be set to be concurrently active. Further details are discussed and exemplified herein below in conjunction with FIG. 10. Sequence I exemplifies a pulsed light activation sequence by light source 112. Sequence II exemplifies a pixel's possible overall integration time during a frame. Sequence III shows the timing of the pixels reset procedure (RST) of the signal memory storage(s), which occurs prior to commencing with pixel integration and, optionally, prior to illuminating scene with pulsed light 113. Further, sequences IV to VII show example activation and deactivation timings for the plurality of pixel subsets PE1-PE4. As schematically illustrated in sequences IV to VII, the various pixel subsets may be activated, at least for some period, concurrently. Sequence VIII exemplifies the timing of the readout process of the pixels signal values. Starting exposure (including e.g., sub-exposure) of image sensor 114 while light source 112 is still illuminating scene 200 may be particularly (but not exclusively) suitable for the gated imaging of comparatively short range-distances (e.g., up to 50 meters). As already outlined herein, pixel (signal) values relating to a plurality of slices may, in some embodiments, be read out from image sensor 114 in a respective plurality of frames. Additionally or alternatively, two or more slices of the plurality of slices may be read out in a single frame. Considering from example the operating sequence illustrated in FIG. 10, the readout process VIII is shown to be executed after accumulation of signal values for a plurality of pixel subsets (e.g., groups PE1-PE4) optionally controlled to image a plurality of slices. It is noted that in some embodiments, for a given image readout frame, the readout of the pixel values occurs simultaneously. In some other embodiments, the readout may not necessarily occur simultaneously. For instance, the readout of the pixel values may be performed sequentially for all pixel elements, or for at least two of the pixel elements of the image sensor(s).

Reverting to FIGS. 7A-9D, the arrangement of the pixel elements discussed herein in conjunction with should not be construed limiting with respect to the implementation of a certain color filter array. Pixel elements of image sensor 114 may be configured to implement various B/W or color filter array including, for example, a Bayer filter array, a RGBE filter array, a cyan CYMG filter array, a RGBW filter array, a spectral filter array implemented on at least some of the pixel elements (e.g. bandpass filter, short pass filter, long pass filter etc.) and/or the like.

In some embodiments, a subset of pixel elements may implement a color filter pattern such as, for example, a B/W or color filter array including, for example, a Bayer filter array, a RGBE filter array, a CYGM filter array, a RGBW filter array, a multi-spectral filter array (e.g. based on Fabry-Perot filters), a hyper-spectral filter array, multi-spectral band filter array (e.g., providing visible, NIR and SWIR spectral bands) and/or the like. For example, each subset of the first to fourth subset shown in the FIGS. 7A to 9D may implement a Bayer filter array.

According to some embodiments, pixel elements may be grouped into a subset in accordance with their detection parameters including, for example, polarization and/or spectral filter parameters. For example, a first subset of pixel elements may be operative to detect linear polarized light, whereas a second subset pixel elements may be operative to detect circularly polarized light. In a further example, a first subset of pixel elements may be operative to detect light of a first spectral range, whereas a second subset of pixel elements may be operative to detect light in a second spectral range that is different from the first spectral range.

For instance, a subset of pixel elements may image only a certain color. For example, the first and fourth subsets of pixel elements PE1 may filter the color green, whereas, the second and third subsets of pixel elements PE2 and PE3 may image the colors red and blue.

Image sensor(s) 114 of ID engine 110 may have various configurations including, for example, a mono-configuration, a stereo-configuration, e.g., to present slightly offset images to the user for providing the user a 3D visual representation of a region of scene 200. Optionally, gated imaging apparatus 100 may be configured to operate in conjunction with eyewear to present slightly offset images for presenting the user 3D representation of an imaged scene. Based on reflection-based image data, disclosed apparatuses, systems and methods may be configured to provide ADAS functions such as; Lane Departure Warning (LDW), Lane Keeping Support (LKS), Forward Collision Warning (FCW), Traffic Sign Recognition (TSR), Intelligent High/Low beam control, Traffic lights indication, Pedestrian detection, animal detection, object detection, Parking assist, blind spot detection, etc.

Figure 11B:
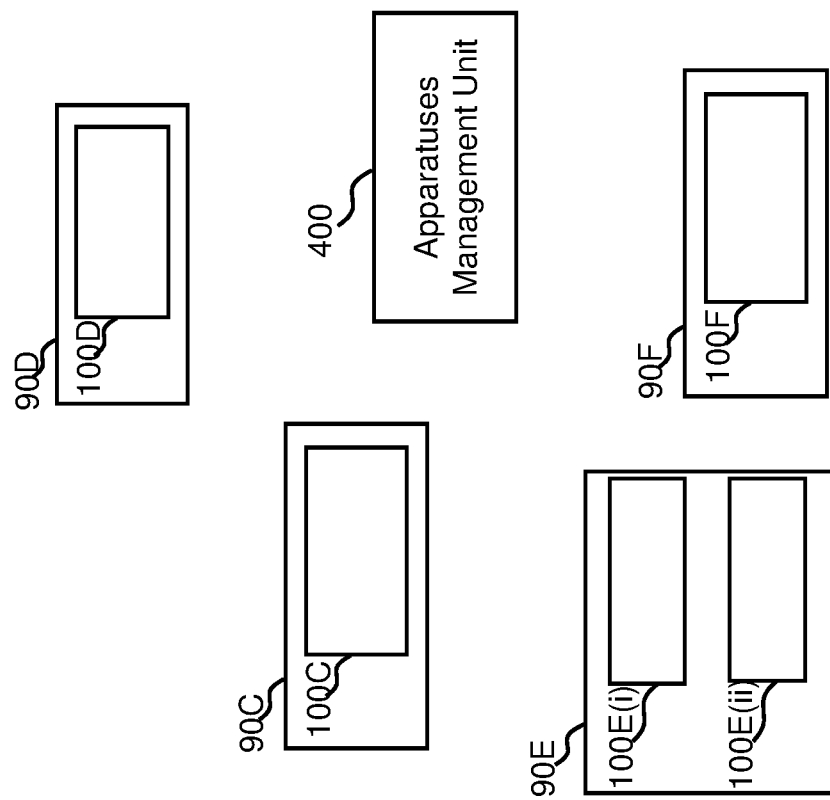
FIG. 11B is a schematic illustration of a plurality of moving platforms in a geographic area, the plurality of moving platforms employing one or more gated imaging apparatuses that are managed by an apparatuses management unit, according to some embodiments.
Figure 11A:
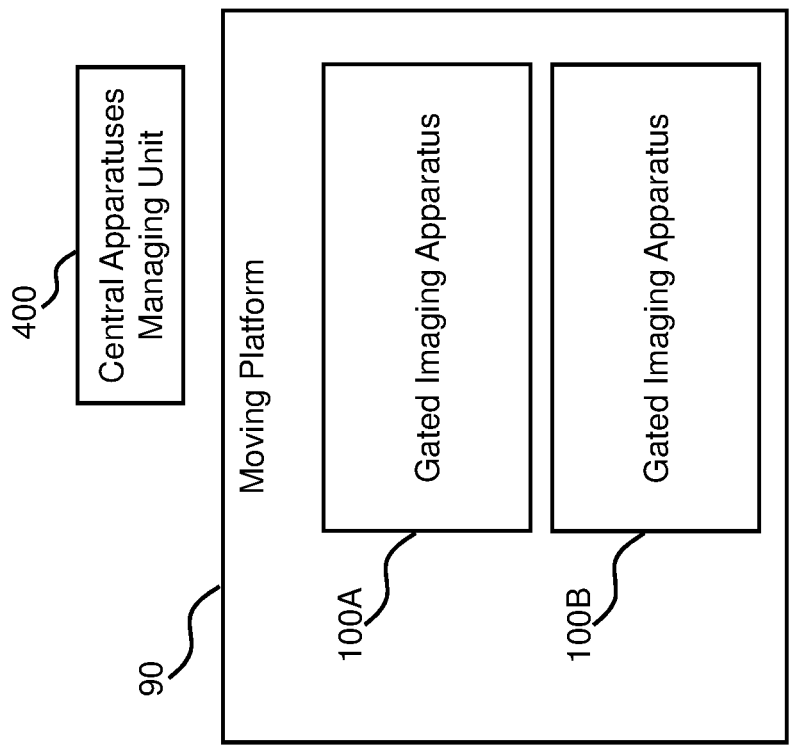
FIG. 11A is a schematic block diagram illustration of a moving platform employing a plurality of gated imaging apparatuses, according to some embodiments.

Additional reference is now made to FIG. 11A. Moving platform 90 may for example be comprise a plurality of gated imaging apparatuses 100 (e.g., apparatuses 100A and 100B), each having at least one illuminator and image sensor, e.g., as described above, e.g., to increase the illumination power, angular and spatial resolution, and/or frame rate, etc.

Further referring to FIG. 11B, a gated imaging method may for example be implemented by a plurality of gated imaging apparatuses 100 (e.g., apparatuses 100C-100F) that are employed by a plurality of moving platforms (e.g., moving platforms 90C-90F), e.g., to increase the illumination power, angular and spatial resolution, and/or frame rate etc.

In an embodiment, the ID engines 110 of at least two of the gated imaging apparatuses 100 exemplified in FIG. 11B may have different FOVs and/or field of illumination.

Reflection-based image data representing image slices or depth maps that are produced by a plurality of ID engines 110 and that have overlapping FOV may be combined to generate larger images by employing image stitching.

According to some embodiments, the plurality of gated imaging apparatuses 100 employed by platforms 90 may be operated to reduce or avoid mutual interference or otherwise inadvertent interaction between different gated imaging apparatuses. For example, apparatuses management unit 400 may control the operation (e.g. via V2V communication) of the plurality of gated imaging apparatuses 100C-100F. In another example, gated imaging may be performed by applying random operating parameters to reduce or avoid inadvertent interaction, e.g., between gated imaging apparatuses 100C-100F. For example, a random delay between gated frame acquisitions may be applied, e.g., to reduce errors that may otherwise be introduced into the output provided by first gated imaging apparatus 100C by the active illumination of the same scene by gated imaging apparatuses 100D-100F. Optionally, random frame starting and/or ending time may be employed. Optionally, when using a plurality of pixel subsets within the same frame for imaging a respective plurality of DOFs, the pixel subsets may be gated randomly.

In some embodiments, platform position data descriptive of position-time tuple information of moving platforms 90 may be taken into account to coordinate the operation of the gated imaging apparatuses 100 employed by the platforms. For example, time shifting of gated imaging acquisition may be imposed on gated imaging apparatuses that are determined to be in relatively close proximity to each other (e.g., within 50 meters distance from other).

In some embodiments, different scene regions may be allocated to each gated imaging apparatus by apparatuses management unit 400 that is operably connected with all the gated imaging apparatuses. The allocation may be done in a way that improves the measurement resolution and/or shortens the updating duration.

In some embodiments, multiple gated imaging apparatuses 100 may be operated to image the same ROI and/or DOF to provide more accurate depth map estimates compared to depth map estimates that may be obtained if only one gated imaging apparatus is employed. In some embodiment, reflection-based image data received from multiple gated apparatuses 100 may be weighted and combined to obtain improved depth map estimates. The weighting may be performed adaptively and automatically.

According to some embodiments, depth mapping may be performed based on image data produce by gated imaging apparatuses employed by different moving platforms. For example, a first DOF may be imaged by a first gated imaging apparatus 100C of a first moving platform 90C, and a second DOF may be imaged a second gated imaging apparatus 100D a second moving platform 90D. Based on the first and the second DOF, a depth map may be generated for a scene portion comprised in the first and/or second DOF.

Figure 12A:
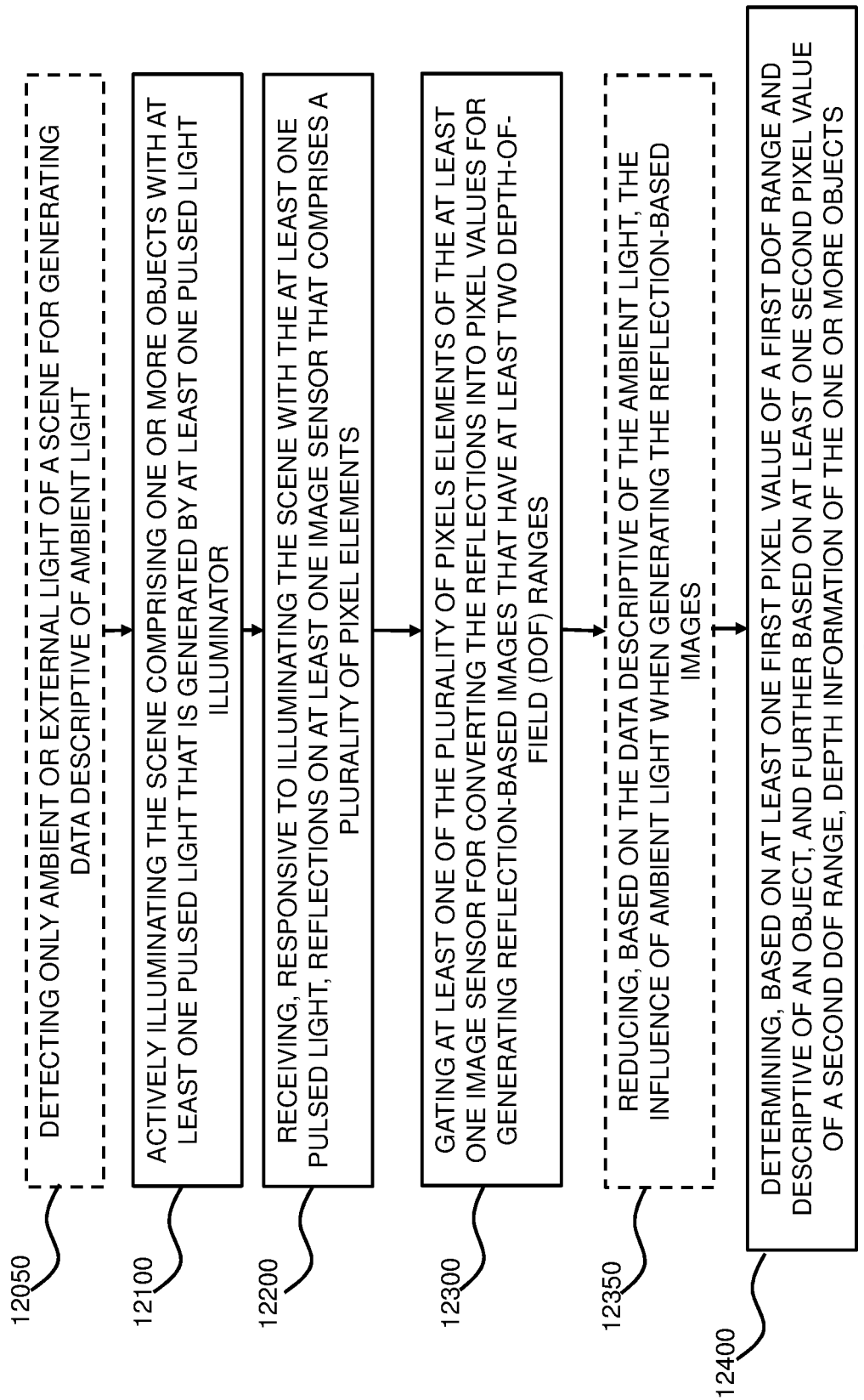
FIG. 12A is a flowchart diagram of a gated imaging method, according to some embodiments.

In some embodiments, additional apparatuses may be comprised by or employed in combination with a gated imaging apparatus 100 including, for example, Radars; Ultrasonic sensors; LIDARs; stereo cameras, mono-cameras, passive or emission-based imaging systems employing optical flow analysis and/or any other type of imaging, depth mapping or ranging technology. For instance, embodiments of the apparatuses, methods and/or systems disclosed herein may complement LIDAR techniques, for example, since gated imaging apparatus 100 is capable to produce, in principle, "continuous" 2D and 3D image data whereas LIDAR may require traversing the scene for the scanning thereof to produce a depth map. Gated imaging apparatus 100 and method may be comparatively less costly in terms of time and computational resources required for generating depth data, and it may also be less difficult to meet (e.g., automotive) regulatory requirements with gated imaging apparatuses, systems and/or methods than with LIDAR-based apparatuses and methods. In addition, gated imaging apparatuses 100 can be comparatively easily integrated in a passenger car. For example, a camera unit (comprising image sensor 114) may be mounted internally in the vehicle cabin behind the car's windshield, and light source 112 may be mounted next to the front vehicle lighting. In some embodiments, gated imaging apparatus 100 may image a scene by a DOF whose parameters are set based on distance information received systems that employ non-gated imaging techniques. For example, the distance to an object of interest from platform 90 may initially be determined using non-gated imaging techniques (e.g., LIDAR, Radar, camera system, etc.), and gated imaging apparatus 100 may execute gated imaging of a scene according to depth information obtained when employing the non-gated imaging techniques. The non-gated imaging techniques such as LIDAR may be employed to facilitate gated imaging apparatus 100 to acquire a target or, otherwise stated, image an object of interest in the scene. In some other embodiments, non-gated imaging techniques may traverse a scene according to information received from gated imaging apparatus 100. Additional reference is made to FIG. 12A. A method for depth mapping a scene by one or more gated imaging apparatuses of a moving or movable platform comprises, as indicated by step 12100, actively illuminating the scene comprising one or more objects with pulsed light that is generated by at least one pulsed light illuminator. As indicated by step 12200, the method further includes receiving, responsive to illuminating the scene with the pulsed light, reflections on at least one image sensor that comprises a plurality of pixel elements. As indicated by step 12300, the method includes gating at least one of the plurality of pixels elements of the at least one image sensor for converting the reflections into pixel values for generating reflection-based images that have at least two DOF ranges. As indicated by step 12400, the method further includes determining, based on at least one first pixel value of a first DOF range and descriptive of an object, and further based on at least one second pixel value of a second DOF range, depth information of the one or more objects. According to some embodiments, the gated imaging method may include a procedure (optionally, mainly during day-time) that takes into account the influence of ambient light when producing reflection-based images. For example, as indicated by step 12050, the method may include, prior to actively illuminating a scene, detecting ambient light only for generating data that is descriptive of ambient light. Detecting ambient light only may be accomplished by exposing (e.g., activating) the pixel elements of sensor(s) 114 while the light received from scene 200 is free (including substantially free) of radiation components that would be reflected from scene 200 responsive to actively illuminated the scene by light source(s) 112.

Further, as indicated by step 12350, the method may include reducing, based on the data that is descriptive of the ambient light, the influence of ambient light when generating the reflection-based images, which are generated responsive to actively illuminating the scene (step 12300), e.g., to reduce or eliminate ambient-light induced artifacts. It is noted that the procedure of detecting ambient light only, may occur at least once or a plurality of times per image readout frame. For example, one or more pixel elements may be passively exposed to ambient light only, prior to each sub-exposure of a pixel subset. Optionally, the ambient-light pixel values of each sub-exposure may be accumulated and subtracted prior to readout of the image frame (i.e. subtraction may be done within the pixel). Optionally, an excess threshold may be determined based on the (e.g., accumulated) ambient-light pixel values. Optionally, pixel values for producing reflection-based images may be capped by the excess threshold. By imaging both ambient light as well as light reflected due to illumination of scene 200 in a single readout frame, depth maps may be determined faster compared to the time required for determining a depth map in which ambient light and a DOF are imaged and readout each time in a separate frame.

Figure 12B:
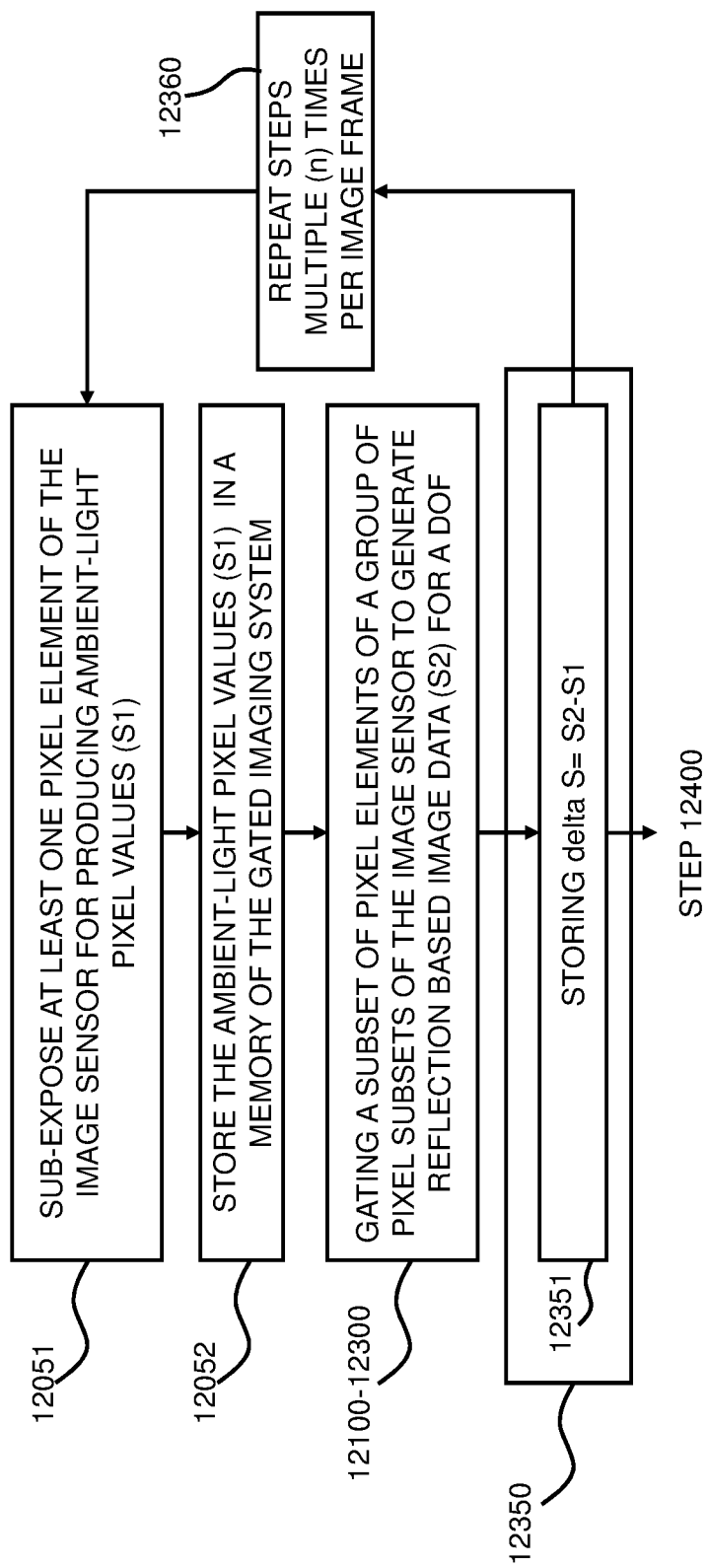
FIG. 12B is a flowchart diagram of a method for reducing the influence of ambient light induced artifacts in the gated imaging method.

Additional reference is made to FIG. 12B. Step 12050 may for example include (step 12051) sub-exposing at least one pixel element of image sensor 114 to produce ambient-light pixel values (S1). The method may then include storing the ambient-light pixel values S1 in a memory of gated imaging apparatus (step 12052). Memory of gated imaging apparatus (step 12052) may be implemented in the pixel level and/or in the image sensors and/or in the gated imaging apparatus (e.g. camera unit consisting the image sensor, external memory or the camera unit etc.). The method may then include performing the steps 12100-12300 of FIG. 12A, which can for example be collectively referred to as gating a subset of pixel elements of a group of pixel subsets of image sensor 114 to generate reflection-based image data (S2) for a DOF, which may then be followed by step 12350 of reducing, based on the data descriptive of the ambient light, the influence of ambient light when generating the reflection-based images. Step 12350 may include, for example, storing delta S=S2−S1 (step 12351). As indicated by block 12360, the steps 12051-12351 illustrated in FIG. 12B may be repeated multiple (n) times in accordance with the numbers of DOFs being imaged per image frame prior to readout of signal S×n (i.e. n(S2−S1), neglecting any associated noise) thereof.

In some embodiments, sub-exposing at least one pixel element for producing ambient light pixel values as well as gating a subset of pixel elements of a group of pixel subsets may occur, for example, at least 500, 600, 700, 800, 900, 1000 times per image frame. In other words, the steps 12051-12351 shown in FIG. 12B may be executed at least 500, 600, 700, 800, 900, 1000 times per image frame. The duration of an image may be, for example, 1 millisecond or less. The shorter the delay between the sub-exposure for collecting ambient light only, and the sub-exposure for gated imaging, edge artifacts may become less visible. It is noted that the same statement may hold true if the sensor's pixel elements are all fully exposed for ambient light sensing and gated imaging. During ambient light sensing by image sensor 114, light source 112 does not actively emit light. According to the operating sequence discussed in conjunction with FIG. 12B, the ambient light sensing and gated imaging can be performed in a temporally alternating manner.

In some embodiments, in order to cope with fast varying scenes (usually due to high driving velocity), image registration may be applied on the raw data determining a depth estimate. In a more specific example, the motion between consecutive frames can be non-rigid, e.g., due to motion of platform 90 in scene 200 causing "zooming" of the scene at image sensor 114 and/or due to motion of other objects (e.g., cars) in the scene relative to platform 90. In order to register under such dynamic imaging conditions, the pixel values that are obtained at a same pixel position in one frame and in a subsequent frame to the same surface area of an object, a local movement vector field may be required for exact and correct pixel value registration. This can for example be achieved by incorporating optical flow techniques on two consecutive frames to produce such local movement vector field of the movement for every pixel in the scene. Registration of the frames based on such local movement vector field before the depth map estimation can reduce or even eliminate the motion artifacts that may otherwise sometimes be seen in depth maps generated under dynamic imaging conditions.

In some embodiments, image data produced by various sub-exposures descriptive of a corresponding number of DOFs may be multiplexed to generate a single DOF. In some embodiments, image data descriptive of the single DOF may be demultiplexed to obtain image data descriptive of a plurality of distinct DOFs. The single DOF may, for example, be considered to be a linear combination of a plurality of DOFs readout in a single image readout frame.

Figure 13A:
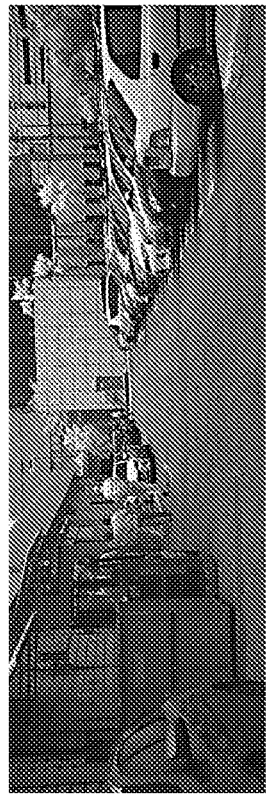
FIG. 13A shows a passively acquired image of a scene.
Figure 13B:
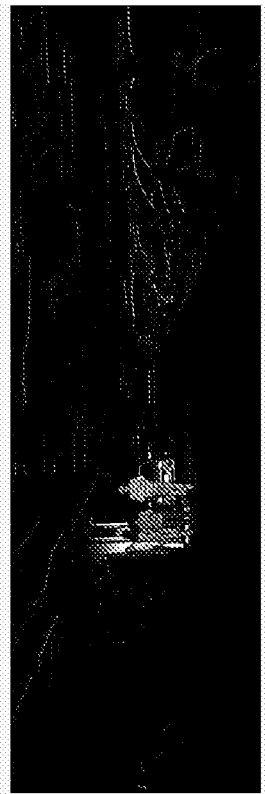
FIG. 13B shows a gated image of a first DOF of the scene of FIG. 13A that was acquired using gated imaging and from which passively acquired image information shown in the FIG. 13A was removed.
Figure 13C:
FIG. 13C shows a gated image of a second DOF of the scene of FIG. 13A from which passively acquired image information shown in the FIG. 13A was removed and which was further processed to remove at least some or all edge artifacts.

Additional reference is made to FIGS. 13A-13C. As already mentioned herein, by sequentially sub-exposing a plurality of subsets of pixel elements for readout, a respective plurality of DOFs in a single image frame, motion-induced artifacts (e.g., "edge" artifacts) may be reduced or eliminated. FIG. 13A shows a passively acquired image of a scene in a "passive" frame ("passive" in the sense that the system light source was not illumination and the system accumulated only ambient light). FIG. 13B shows a first DOF of the scene ranging from 15 m-30 m, which was imaged in an "active" frame (not illustrated, "active" in the sense that the system light source provided illumination) using gated imaging with no pixel sub-exposure and from which the passively acquired image information of FIG. 13A was subtracted. Due to the delay between the passive and active image frames, edge artifacts are introduced into the image shown in FIG. 13B. FIG. 13C shows a second DOF of the scene ranging from about 30 m-45 m which was imaged using gated imaging with no pixel sub-exposure, and from which passive image information was subtracted. However, the image shown in FIG. 13C, was further processed to remove edge artifacts (e.g., using low-pass filtering), which may increase blurring.

According to some embodiments, a depth map of scene 200 may be generated by an apparatus that is not a gated imaging apparatus (e.g., by a LIDAR-based apparatus). Based on the depth map, an object 202 may be detected. A DOF comprising the detected object 202 may then be further imaged by gated imaging apparatus 100, e.g., for classification of the object. Object classification may comprise their classification into pedestrians, animals, traffic signs etc. Gated imaging apparatus 100, may facilitate object detection (e.g., pedestrian detection).

According to some embodiments, a selected DOF of a scene 200 may be imaged by gated imaging apparatus 100. A depth map of object 202 detected in the selected DOF may then be determined by another apparatus (e.g., by a LIDAR-based apparatus) for classification of object 202.

According to some embodiments, imaging of a scene, object detection and depth mapping for subsequent classification may all be performed by gated imaging apparatus 100. For example, for an image sensor 114 that can produce a maximum of 120 Frames Per Second (FPS) the image sensor may be able to employ, for the example applications listed below, a corresponding maximum FPS when the gating is performed with pixel subsets:

60 FPS for obtaining depth range information (e.g. 10 m to 150 m)

30 FPS with a full DOF (e.g. 10 m to 250 m)

15 FPS with a partial DOF (e.g. 50 m to 75 m for object classification)

15 FPS with a passive image (e.g. ambient light)

According to some embodiments, information produced by gated imaging apparatus 100 may be validated by other apparatuses and/or systems (e.g., by imaging apparatuses that employ gated imaging and/or any other imaging and/or ranging technology). For example, depth maps produced by other apparatuses may be correlated with depth maps produced by gated imaging apparatus 100.

According to some embodiments, data produced by gated imaging apparatus 100 may be fused with data provided by other apparatuses.

According to some embodiments, gated imaging apparatus 100 be operative to provide a panoramic, a 360° and/or surround image as well as ranging information, e.g., in real-time. For example, moving platform 90 may comprise a plurality of ID engines 110 that are arranged around the perimeter of moving platform 90. In a further example, ID engine(s) 110 may be rotatably mounted on moving platform 90 to allow the traversing and scanning (while traversing) of the scene surrounding moving platform 90. In such configurations, the operation of a plurality of ID engines 110 may be coordinated with each other to allow their operation with no interference as described hereinabove.

In embodiments, gated imaging apparatus 100 may provide redundancy to other apparatuses that may be employed, e.g., for highly automated driving such as SAE/VDI compliant Level 4 & 5.

Figure 14A:
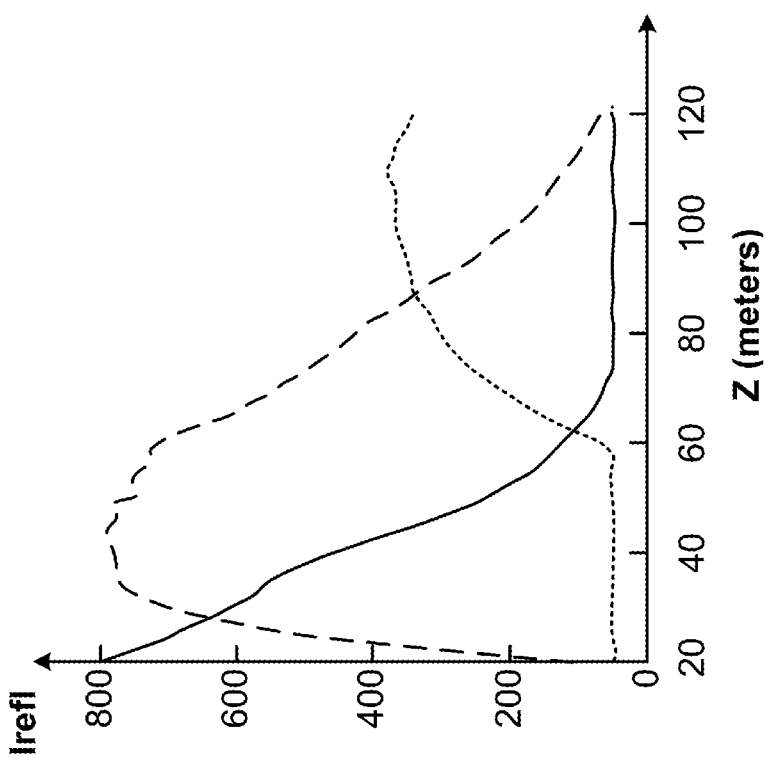
FIG. 14A shows the plots of an example set of three gating profiles that were obtained according to corresponding example operating parameters.

Reference is made to FIG. 14A, which schematically shows the plots of an example set of three gating profiles that were obtained according to corresponding example operating parameters. It is noted that in FIG. 14A, the axis denoted $I_{refl}$ is indicated in a scale of color depth ranging from 1-1024, according to 10 bits per color channel or pixel. However, the units for $I_{refl}$ may be arbitrary and alternative scales may be used.

TABLE 1

Example Gating Parameters

| | Nearest profile (blue) | Medium range profile (red) | Farthest profile (yellow) |
|---|---|---|---|
| Number of repetitions (light pulses/exposure) | 202 | 591 | 770 |
| Illumination period [μsec] $T_{light}$ | 0.24 | 0.28 | 0.37 |
| Delay between illumination start time and integration start time [μsec] $T_{Delay}$ | 0.02 | 0.12 | 0.38 |
| Integration period [μsec] $T_{Gate}$ | 0.22 | 0.42 | 0.42 |

Additional example parameters that were used to obtain the gating profiles shown in FIG. 14A:

Light source peak power: ~1000 Watt
Light source wavelength: 808 nm
Light source field of illumination: 24 deg by 8 deg
Vehicle window transmission (the camera is behind the window): ~30%
Rise/fall time of pulse light: ~75 ns
Rise/fall time of gated image sensor transfer gates: ~50 ns
Camera lens F #=1.2
Camera lens F=23 mm
Pixel dimensions: 10 um by 10 um
Pixel QE X Fill factor (FF) @ 808 nm: ~50%
Gating image sensor resolution: 1280 by 960 (video output is 1280 by 720).

The above noted example operating parameters are suitable for range or distance estimation in an interval ranging from 20-150 [m].

As already outlined herein, a distance estimate may be determined based on various estimation models, by employing a variety of training algorithms, optionally with a tradeoff between accuracy and computational complexity. Moreover, as long as for a desired ranging interval, for a given pixel element, the distances are injectively mapped with the normalized vectors, a distance estimate can be determined.

It is noted that instead of ensuring that the normalized vectors are injectively mapped to distances, the normalized vectors may be input to a function generating corresponding outputs, wherein the function is constructed so that the generated outputs are injectively mapped with measured reference distances.

Figures 14B, 14C:
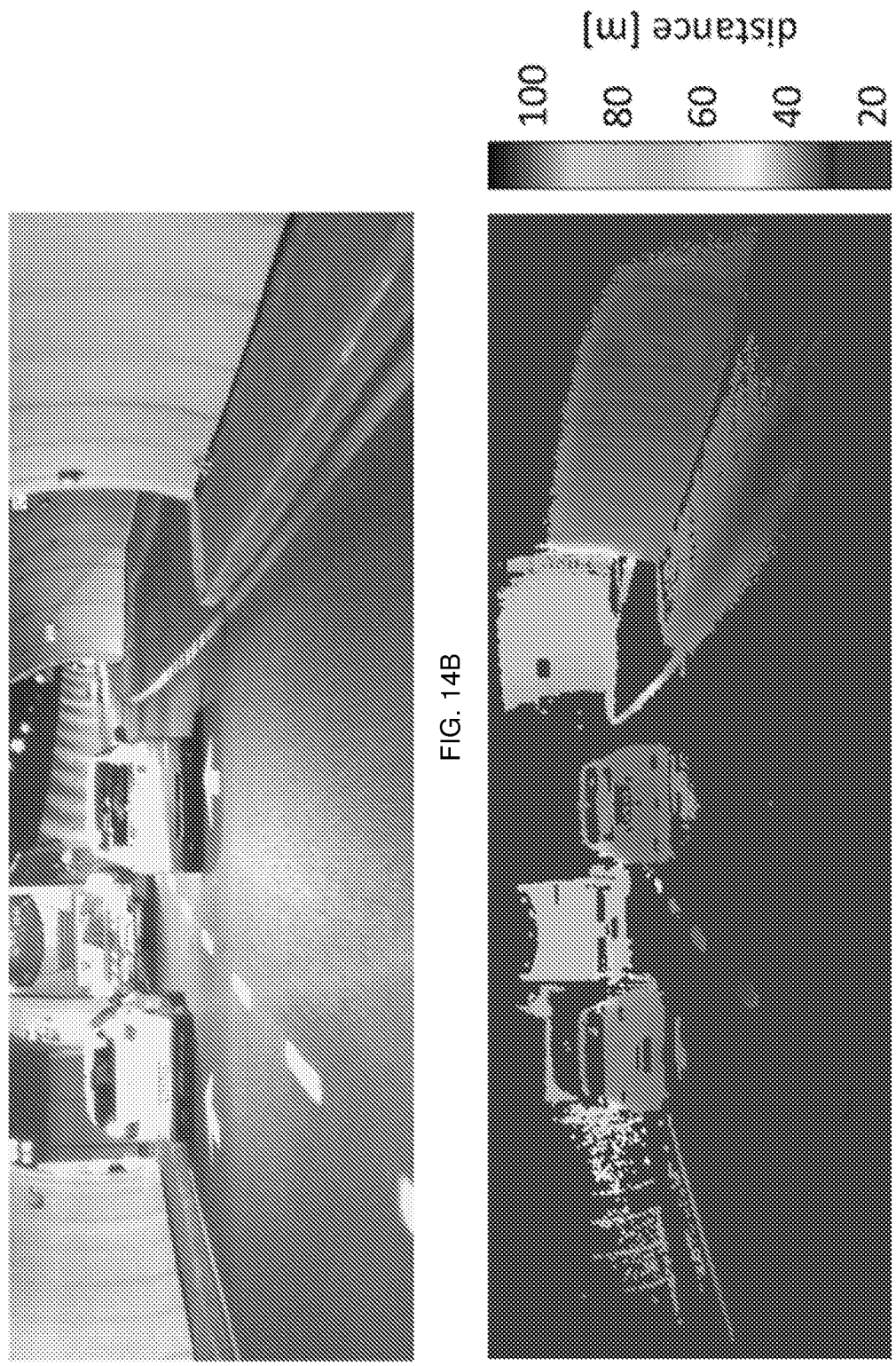
FIG. 14B shows an image of a passively imaged scene.
FIG. 14C shows a depth map of the scene of FIG. 14B.

Reference is now made to FIG. 14B, which shows a passively acquired image of a scene in the visible range. FIG. 14C shows a depth map of the scene shown in FIG. 14B which is acquired using gated imaging using, e.g., the gating profiles shown in FIG. 14A.

Figures 15A, 15B:
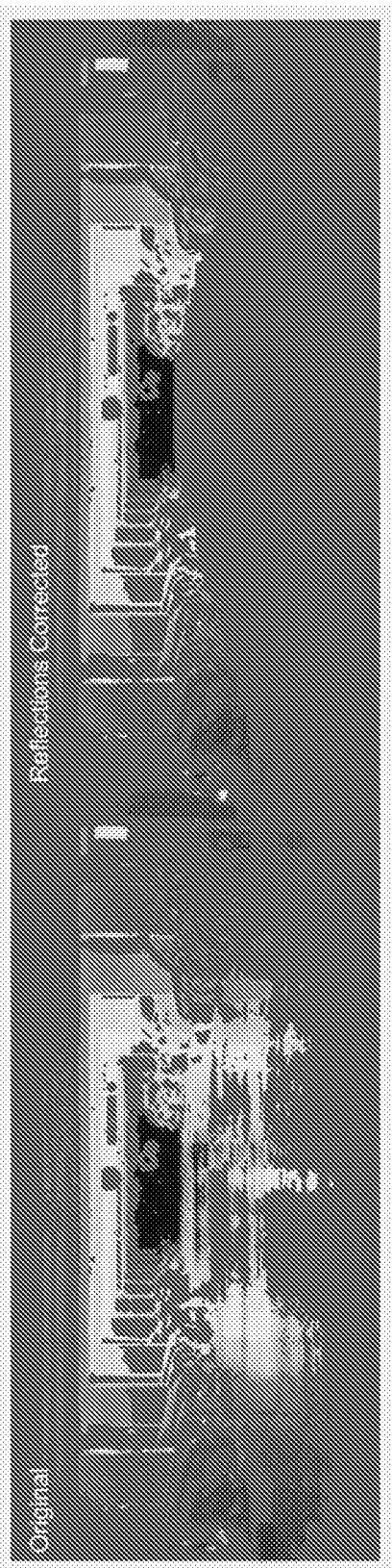
FIG. 15A shows a depth map of a scene with multipath reflection artifacts.
FIG. 15B shows a depth map of the scene of FIG. 15A with comparatively less or no multipath reflections artifacts.

Further reference is made to FIGS. 15A and 15B. Based on the depth information provided by gated imaging apparatus 100, procedures may be employed to correct for multipath reflections artifacts (also: mirroring) in scene 200. Such multipath reflections artifacts are exemplified in the image of FIG. 15A. Assuming for example, a virtual flat world scenario, and taking into account the position and orientation of image sensor 114 (i.e., camera height above the road and pitch angle relative to the "virtual flat world"), the range of each pixel to the flat virtual world can be determined. Now, if the depth information produced for a pixel position exceeds a range or distance to the virtual flat world (e.g., within some tolerance), it may be inferred that the range for the same pixel position is a reflection-induced artifact, which may then be filtered out by GI analysis engine 120. FIG. 15B shows a depth map image of the same scene of FIG. 15A with comparatively less or no multipath reflections artifacts and which were removed using the procedure outlined herein.

Further referring to FIGS. 15C and 15D, a depth map of a virtual flat world may be expressed, for example, by the following equation:

$$DM_{virtual\_flat\_world}(\theta, \varphi) = \frac{h_{camera}}{\sin(\theta - \theta_0)\cos(\varphi - \varphi_0)} \quad (8)$$

where $h_{camera}$ represents the height of the sensor above ground of the virtual flat world; $\theta$ represents sensor's pitch angle, and $\varphi$ represents the sensor's azimuth angle. The parameters $\theta_0$ and $\varphi_0$ describe infinity. Pixels above the horizon are set to infinity.

In an embodiment, the horizon's distance from the sensor may be defined solely by a single distance from the sensor in $DM_{virtual\_flat\_world}$ and determined according to a point of convergence of virtual straight lines as "seen" from the sensor's instantaneous FOV. In another embodiment, the distance of the horizon's virtual world from the sensor may be defined to have a certain range tolerance (upper and lower boundary), which may be for example be determined as follows:

$$\frac{\partial DM_{virtual\_flat\_world}(\theta, \varphi)}{\partial \theta} \cdot \Delta\theta = \text{Horizon } tolerance_{virtual\_flat\_world}[m] \quad (9)$$

$$\begin{aligned}\frac{\partial DM_{virtual\_flat\_world}(\theta, \varphi)}{\partial \theta} &= \frac{dR}{d\theta} \\ &= \frac{h}{\cos\varphi}\frac{d}{d\theta}\frac{1}{\sin\theta} \\ &= -\frac{h}{\cos\varphi}\frac{\cos}{(\sin\theta)^2}\end{aligned} \quad (10)$$

If a pixel element is known to be associated in the virtual flat world with a depth or range that is below or at a shorter distance than the virtual horizon (or its lower margin), yet in the real world application the range estimate determined for an object exceeds the horizon's distance (or its upper boundary distance), then it can be inferred that the determined range estimate is a reflection of an object, and not the real range of the object from the pixel.

It is noted that while the description of FIGS. 15A and 15B refers to the elimination of multiple reflection (also: mirroring), the same approach may be employed to detect image artifacts not necessarily related to the problem of mirroring.

It one embodiment, the multipath reflections artifacts may be addressed by setting the delay time between the pulse light end to the sensor sub-exposure). For example, if an area (between 10-30 m) in the scene causes multipath reflections the system may collect DOFs starting from 30 m.

It one embodiment, the multipath reflections artifacts scene areas may be addressed by setting the sensor ROI to provide an image excluding these areas.

Figure 16A:
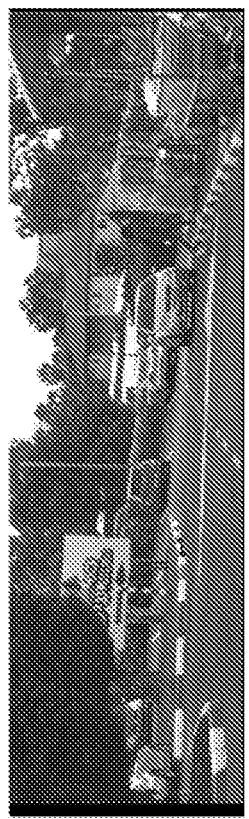
FIG. 16A shows an image of a scene that was acquired passively.
Figure 16B:
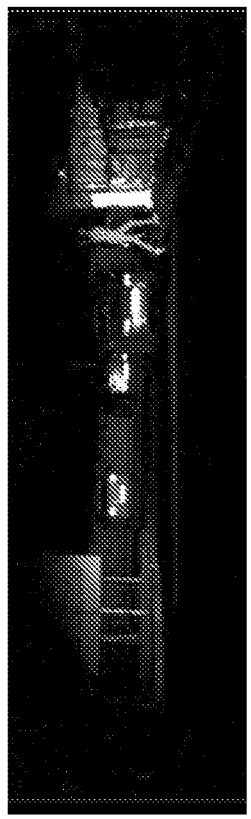
FIG. 16B shows a DOF image of the scene of FIG. 16A and which was acquired using gated imaging.
Figure 16C:
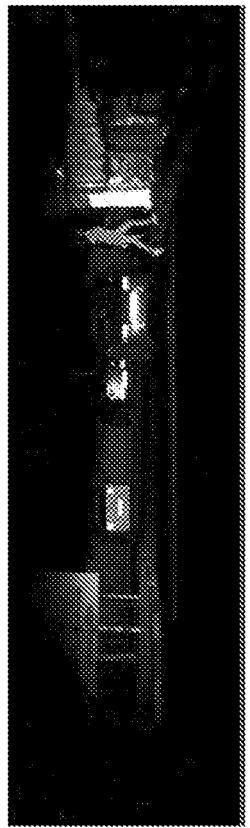
FIG. 16C shows a combined view of the images shown in FIG. 16A and FIG. 16B.

Additional reference is made to FIGS. 16A-16C. In some embodiments, a passively acquired image of a scene may be combined (e.g., superimposed) with one or more gated images of the same scene to present a combined view of the scene. FIG. 16A shows a passively acquired image of a scene produced by an image sensor operating in the visible range and FIG. 16B shows a gated image of a certain DOF of the same scene. FIG. 16C shows the image of FIG. 16A superimposed on the image of FIG. 16B. Superimposing or otherwise combining scene information in the visible spectrum with gated image information can facilitate object detection, classification, and identification. More specifically, combining visible spectrum information with the additional contrast information obtained in gated imaging can create a synergistic effect that allows facilitating image processing and analysis. For instance, standard computer vision algorithms that are based on RGB, RCCC (red, clear, clear, clear) and/or any other visible pattern array color processing may be used more efficiently due to the increased contrast.

As already indicated herein above, data produced by gated imaging apparatus 100 may be fused and/or otherwise used in conjunction with data provided by other apparatuses. For example, DOF data descriptive of depth information, which includes distance information of object(s) 202 relative to moving platform 90 in the illumination direction and, optionally, x-y position information relative to the illumination direction (i.e., relative to the moving platform or ID engine coordinate system), can be used for determining, validating or updating a position-time tuple estimate (described by "platform position data") of moving platform 90 with respect to the World Coordinate System (WCS). For example, DOF data can be combined with platform position data produced by EM communication signal-based positioning techniques including, for example, Global Navigation Satellite System (GNSS) (e.g., Global Positioning System (GPS), Global Navigation Satellite System (GLONASS), Wi-Fi, Cellular Communication (e.g., GSM, 4G), air traffic signals (e.g. ADS-B), and/or EM signals of any other current or future wireless communication network, standard, and/or system. For example, objects 202 in scene 200 may be mapped relative to the World Coordinate System and stored along with object ID information in a map server (not shown) that is accessible by gated imaging apparatus 100. For instance, static objects 202, which may refer to objects that can be considered to be spatially fixed relative to the WCS such as, for example, street signs, road signs, traffic lights, crosswalks, roadside posts, speed cameras, license plates, and/or the like, may be mapped with world coordinates. Additionally or alternatively, vehicles, mobile devices carried by pedestrians, and/or other traffic participants may be mapped with world coordinates, e.g., in real-time.

The object position data of (optionally: each) static and/or moveable objects 202 may be stored in the map server (not shown) along with the respective object ID. DOF data relating to static and/or moveable objects 202 produced by gated imaging apparatus 100 may be used in association with the object position data and the platform position data, e.g., for obtaining an updated position-time tuple estimate, which may be comparatively more accurate than a previous position-time tuple estimate.

For example, gated imaging apparatus 100 may detect a certain static or moveable object (e.g., object 202C). Object 202C may be depth mapped, e.g., as outlined herein, to obtain DOF data for object 202C (which in addition depth information can optionally also include x-y information). In an embodiment, gated imaging apparatus 100 may provide the map server with object identification information (e.g., an image of a road sign, its surrounding, and the approximate position; a license plate number) of the detected object 202C. In response, the map server (not shown) may search for a match between the object ID information provided by gated imaging apparatus 100 and the object ID stored in the map server (not shown). If there is a match (or a substantial match), the map server (not shown) may provide gated imaging apparatus 100 the object position data (e.g., (differential) GPS information of the road sign or the vehicle to which the license plate belongs, image information, ultrasonic information) that is associated with the detected object 202C, to gated imaging apparatus 100.

Based on the received object position data of object 202C, and further based on the DOF data for object 202C, object-based platform position data may be produced. The produced object-based platform position data may then be used in association with current platform position data for obtaining updated platform position data that is descriptive of an updated position-time tuple estimate of moving platform 90. Optionally, the object-based platform position data may be fused with the current platform position data. Optionally, the object-based platform position data may be compared against the current platform position data for validating the current platform position data. If the outcome of the comparison meets a data-fusion criterion, (e.g., deviation is below a threshold), the above-noted fusion of the different data may be performed. Conversely, if the comparison does not meet the data-fusion criterion (e.g., deviation is equal or above the threshold), data fusion may not be performed. In the latter case, a further comparison may optionally be performed until the outcome meets the data-fusion criterion. Optionally, in the case where the comparison does not meet the data-fusion criterion, either the current platform position data or the object-based platform position may be used as a basis for providing platform position information.

Figure 17A:
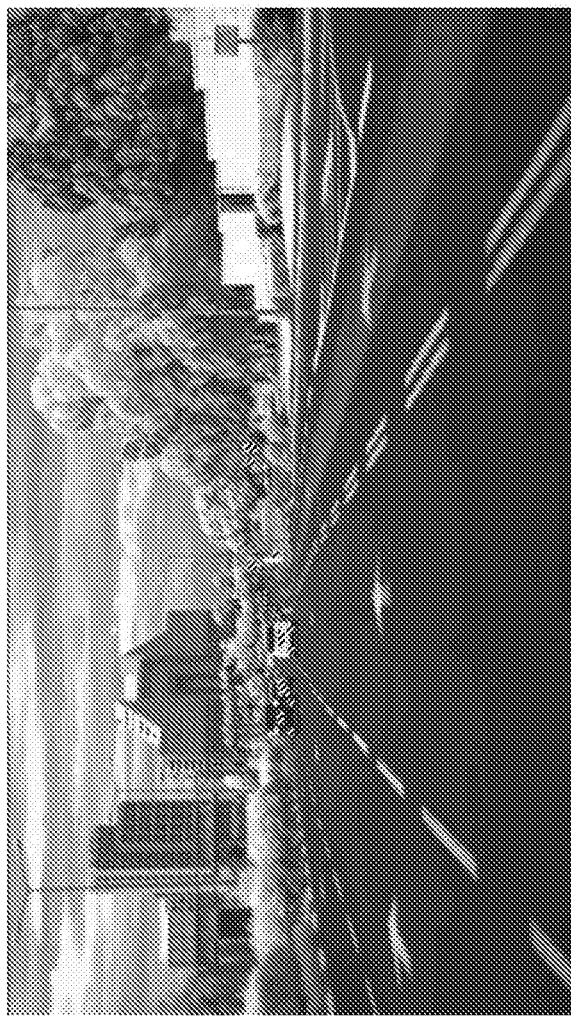
FIG. 17A is an image of a scene in which conspicuity objects are highlighted.
Figure 17B:
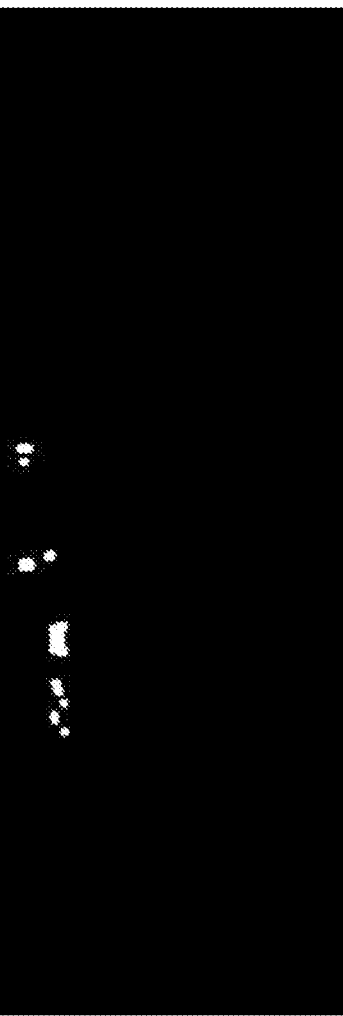
FIG. 17B is an image showing only the conspicuity objects of FIG. 17A.

Additional reference is made to FIGS. 17A and 17B. According to some embodiments, the localization (positioning) of the vehicle platform may be based on fixed (constant) objects 202 in the imaged scene 200, e.g., facilitated with the help of conspicuity devices (e.g., highly reflective surfaces, retroreflective objects such as retroflective tapes and/or paint) attached to and/or included in object 202. FIG. 17B is a GI binary image in daytime, where only highly reflective surfaces are shown. The GI binary image is a "subtracted image", which is generated by subtracting passive image information (ambient light) from combined active and passive image information (i.e., an image comprising ambient and gated image information. A certain threshold may be taken into account when performing the subtraction of the passive image information from the combined passive-active image information to obtain the active image information. For instance, in the subtracted image, pixel values that are below the said threshold may be set to 0. FIG. 17A shows an example of passive image information that is overlaid with binary image information so that a GI passive image with an overlay of the binary image in daytime where only highly reflector surfaces are particularly noticeable.

Based on the angle of each highly reflector as viewed by ID engine 110 and, optionally, based on the sensor's location in moving platform 90, the moving platform's position may be correlated with a database (e.g., high definition maps) descriptive of locations in WCS of these stationary highly reflector surfaces and, based on the outcome of the correlation, determine an estimate for the moving platform's current position (e.g., pinpoint the platform's position).

Figure 18A:
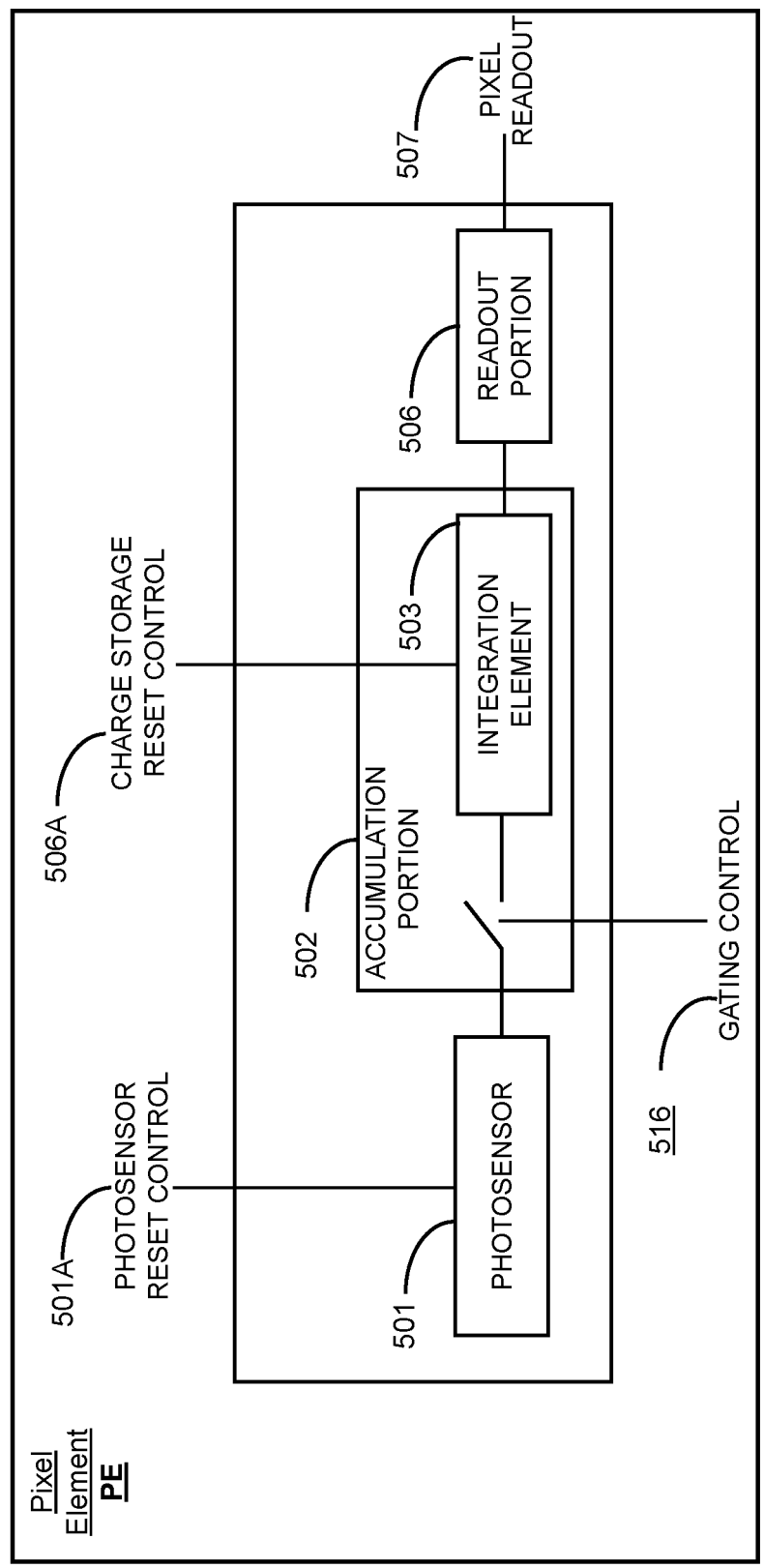
FIG. 18A is a schematic functional block diagram illustration of the components of a pixel element, according to some embodiments.
Figure 18B:
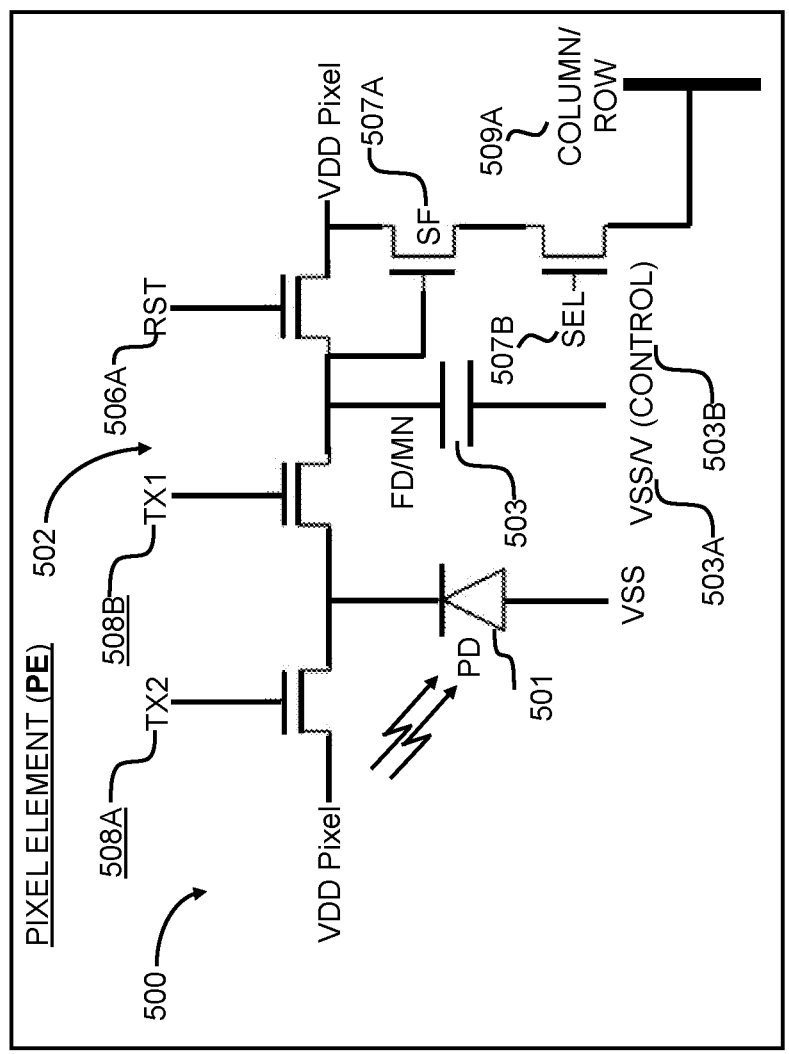
FIG. 18B is an illustration of a pixel circuit diagram of the pixel element, according to some embodiments.

Additional reference is made to FIG. 18A, which is a schematic functional block diagram illustration of the components of a pixel element 500, according to some embodiments; and to FIG. 18B, which schematically illustrates a pixel circuit diagram of a pixel element PE 500, according to some embodiments. The pixel circuit diagram shows an exemplary circuit architecture of a pixel element 500.

As schematically shown in FIG. 18A, pixel element 500 can comprise a photosensor 501 that is connected via a gating control 504 to an integration element 503 (also: memory storage). Gating control 504 and integration element 503 may be parts of an accumulation portion 502. Gating control 504 may comprise multiple gate arrays and/or transistors to control signal transfer from pixel photosensor 501 to integration element(s) 503. An accumulated signal is delivered to a readout portion 506 which provides pixel readout 507. Photosensor 501, accumulation portion 502 and integration element 503 may be reset by corresponding controls 501A and 506A. Integration element 503 may comprise multiple elements (not illustrated) within the pixel element 500 whereas a portion of the accumulated signal (e.g. ambient light as described in step 12052) is stored by at least one selected integration element of the multiple integration elements and another portion of the accumulated signal (e.g. ambient light and light source reflected light as described in steps 12100-12300) is stored by at least one other selected integration element of the multiple elements. Photosensor 501 outputs a signal indicative of an intensity of incident light. Photosensor 501 is reset by inputting the appropriate photo sensor reset control signal. Photosensor 501 may be any of the following types: photodiodes, photogates, metal-oxide semiconductor (MOS) capacitors, positive-intrinsic-negative (PIN) photodiodes, pinned photodiodes, avalanche photodiodes, visible range to short wave infrared range (SWIR) photodiodes (incorporating, e.g., any of silicon, germanium, indium gallium arsenide, indium aluminum arsenide, indium phosphide, lead sulfide, mercury cadmium telluride, etc.) or any other suitable photosensitive element. Some types of photosensors may require changes in the pixel structure and/or processing methods (for example for a hybrid structure using indium bumps). Accumulation portion 502 performs gated accumulation (i.e., accumulates intervals of sub-exposures prior to the signal readout) of the photo sensor output signal over a sequence of time intervals. The accumulated output level may be reset by inputting a pixel reset signal into accumulation portion 502 by reset transistor 506A. The timing of the accumulation time intervals may be controlled by a gating control signal, described below, that may be controlled externally (outside image sensor 114), internally (within image sensor 114) or partially externally and partially internally.

As schematically shown in FIG. 18B, first transistor (TX2) 508A, coupled between pixel voltage terminal (denoted VDD pixel for drain voltage), and photosensor 501 may be configured to control a resetting of photosensor 501 and second transistor (TX1) 508B, coupled between photosensor 501 and charge storage 503, may be configured to control a transfer of the accumulated signal to charge storage 503. For example, first transistor (TX2) 508A may be configured to reset photosensor 501 prior to each signal accumulation period and second transistor (TX1) 508B may be configured to transfer at least a portion of the accumulated signal from photosensor 501 to the charge storage 503. First transistor (TX2) 508A may be further configured to prevent blooming of photosensor 501 by resetting photosensor 501 and/or by setting the low voltage threshold of first transistor (TX2) 508A to a higher value upon detection of signal leakage from adjacent pixel elements 500. For example, in a nominal operation mode the voltages of first transistor (TX2) 508A may be 5V (high state) and 0V (low state) while in a blooming operation mode the voltages of first transistor (TX2) 508A may be 5V (high state) and 1V (low state). Reset transistor (RST) 506A coupled between charge storage 503 and the pixel voltage terminal (VDD pixel) is typically configured to reset charge pixel storage 503 at beginnings of signal accumulation periods. A individual pixel element 500 may further comprise a voltage controlling element 503B (denoted V control, providing an anti-blooming mechanism similar to TX2 transistor 508A as described above) connected to charge storage 503 and configured to determine a signal level in charge storage 503 and reduce overflow of charge storage 503 to reduce blooming of adjacent pixel elements 500, as explained below. Alternatively, charge storage 503 may be connected to the same voltage 503A (denoted VSS for source voltage) as photosensor 501. The accumulated output level may be reset by inputting a pixel reset signal into readout portion 506 (not illustrated).

Pixel circuit of a pixel element 500 may be implemented by complementary metal oxide semiconductor (CMOS) standard fabrication technology (e.g., with operating voltage: 1.8/3.3V and 1.8/5V on the 0.18 μm platform or 1.2/3.3V on the 65 nm platform) and/or any other manufacturing process. Each pulse of light is converted to a proportional electrical signal by photosensor 501, which may be a pinned PD. The generated electrical signal from photosensor 501 is transferred by an electric field to a charge storage integrator, denoted herein as memory node (MN) or as floating diffusion (FD) 503 which acts as an integrator 502 (e.g., a capacitor) accumulating each converted pulse of light (as an example for accumulation portion 503 in FIG. 18A). Two controllable pixel signals generate the pixel-gating manner (sub-exposure mechanism) the transfer gate transistor (first transistor TX1) 304 (as an example for gating control 516 in FIG. 18A) and the anti-blooming transistor (second transistor TX2) 501A (as an example for reset control 501A in FIG. 18A). Exemplarily, the anti-blooming transistor can be considered to have three main objectives; the first being part of the single light pulse gating mechanism when coupled to the first transistor TX1 (i.e., the second transistor TX2 is turned from ON to OFF or the second transistor TX2 is turned from OFF to ON), the second preventing undesired parasitic signal generated in the PD not to be accumulated in the PD during the time TX1 is OFF (i.e., PD Reset) and the third to channel excessive electrical signal originated in the PD when TX1 is ON, hence the role of anti-blooming. Anti-blooming TX2 controllable signal can act as an optical shutter which ends the single accumulated light pulse. Transfer gate transistor (TX1) 504 may be turned ON only in a desired time and only for a desired duration which is coupled to TX2 501A. Once all pulses of light were accumulated in the FD/MN 503, the signal is readout to provide a single image frame.

Multiple gated low noise pixel element 500 may have a standard electric signal chain after the "gate-able" configuration of photosensor 501, TX1 504, TX2 501A and FD/MN 503. Optionally, this standard electric signal chain may comprise of a Reset transistor (RST) 506A (as an example for FD/MN reset control 506A in FIG. 18A) with the role of charging FD/MN 503 with electrical charge using the pixel voltage (VDD) or other voltage span, may comprise of a Source Follower (SF) transistor 507A converting the accumulated signal (i.e., electrons) to voltage and may comprise a Select (SEL) transistor 507B connected to the column and/or row 509A for a pixel array.

This schematic circuit diagram depicts a circuit architecture of a pixel element 500 having a minimal number of five transistors ("5T") and at least one charge storage integrator 503. This configuration may operate in a multiple exposure mechanism per a single image readout as described above. In addition this pixel element may also operate in a standard 5T pixel element timing sequence (such as global shutter pixel or rolling shutter pixel or operate in a standard 4T pixel timing sequence. This versatile operating configuration (i.e., gating sequence or standard 5T or standard 4T) enables to operate the pixel element under different lighting conditions. For example, gating timing sequence during low light level in active gated mode (with pulsed illumination), 4T timing sequence during low light level during nighttime (without apparatus illumination, hence using ambient light sources) and 5T timing sequence during high light level during daytime. Pixel element 500 may also have additional circuits for internal Correlated Double Sampling (CDS) (not shown) and/or for High Dynamic Range (HDR) (not shown). Adding such additional circuits can reduce the photo-sensing fill factor (i.e., sensitivity of the pixel element). A pixel element may be fabricated with a standard epitaxial layer (e.g., 5 μm, 12 μm), higher epitaxial layer (e.g., larger than 12 μm) or a processed epitaxial layer that has been processed to extend the Quantum Efficiency (QE). In addition, epitaxial layer may have a standard resistivity (e.g., a few ohms) or high resistivity (e.g., a few kilo-ohms).

In active gated imaging eye and skin safety standards may limit the light source (e.g., laser, LED etc.) optical peak power, optical average power, etc. Noise in gate (second) transistor (TX1 504) resulting from the transistor's transfer efficiency that is related to the physical procedures and uncertainty level of the electrical charge transfer, may be a crucial parameter in such a case. At least three different methods may be implemented in the pixel element to provide a higher gate transfer (TX1) efficiency: (i) Setting a high potential voltage between photosensor 501 to charge storage 503 enabling an intense electrical field causing electrical charge carriers (i.e., at least a single electron) to have a higher probability to be "pulled" to charge storage 503 (FD), e.g., by setting an appropriate TX1 high level. For example, in a nominal operation mode the voltages of second transistor TX1 504 may be 3V (high state) and 0V (low state) while in high efficiency transfer (i.e. low signal transfer) operation mode the voltages of the first transistor TX2 501A may be 5V (high state) and 0V (low state). (ii) Adjusting the physical dimensions of the transfer gate, mainly on the TX1 504 and photosensor 501 side. The larger the transfer gate (TX1 504), the larger is the gate transfer efficiency to charge storage 503 (FD) and vice versa. (iii) Adjusting the physical structure of the transfer gate, mainly on the TX1 504 and photosensor 501 side. The fewer flaws (e.g., holes) are in the transfer gate (TX1 504), the larger is the gate transfer efficiency to charge storage 503 (FD) and vice versa.

During the period when a camera sensor is not exposed (i.e., while the light pulse may still be propagating through the atmosphere), the sensor ideally does not accumulate any photons. But in practice, a certain level of residual light may still enter the image sensor or be accumulated by the image sensor (i.e., signal charge can be stored in the memory node without being contaminated by parasitic light). This phenomenon of "leakage photons", which may be referred as Parasitic Light Sensitivity (PLS), is especially problematic in CMOS sensors, where it is difficult to mask the memory node (MN) and floating diffusion in the pixel level sensor (typical masking approaches include: micro-lens focusing light away from the MN, metal layers above the MN, potential attracting the photoelectrons to the photodiode, and potential barriers around the MN). PLS is a function of the overall pixel exposure time and readout time. The pixel element can exhibit a high PLS value of, for example, at least 1000. The above noted pixel architecture may be employed in association with an off-chip memory (not shown) in order to save data of a previous image frame.

The expression "off-chip" may refer to components, modules and/or blocks that are not integrally formed with image sensor 114, as opposed to "on-chip".

Moreover, the presented pixel architecture may employ "off-chip" subtraction of a background signal.

Figure 19:
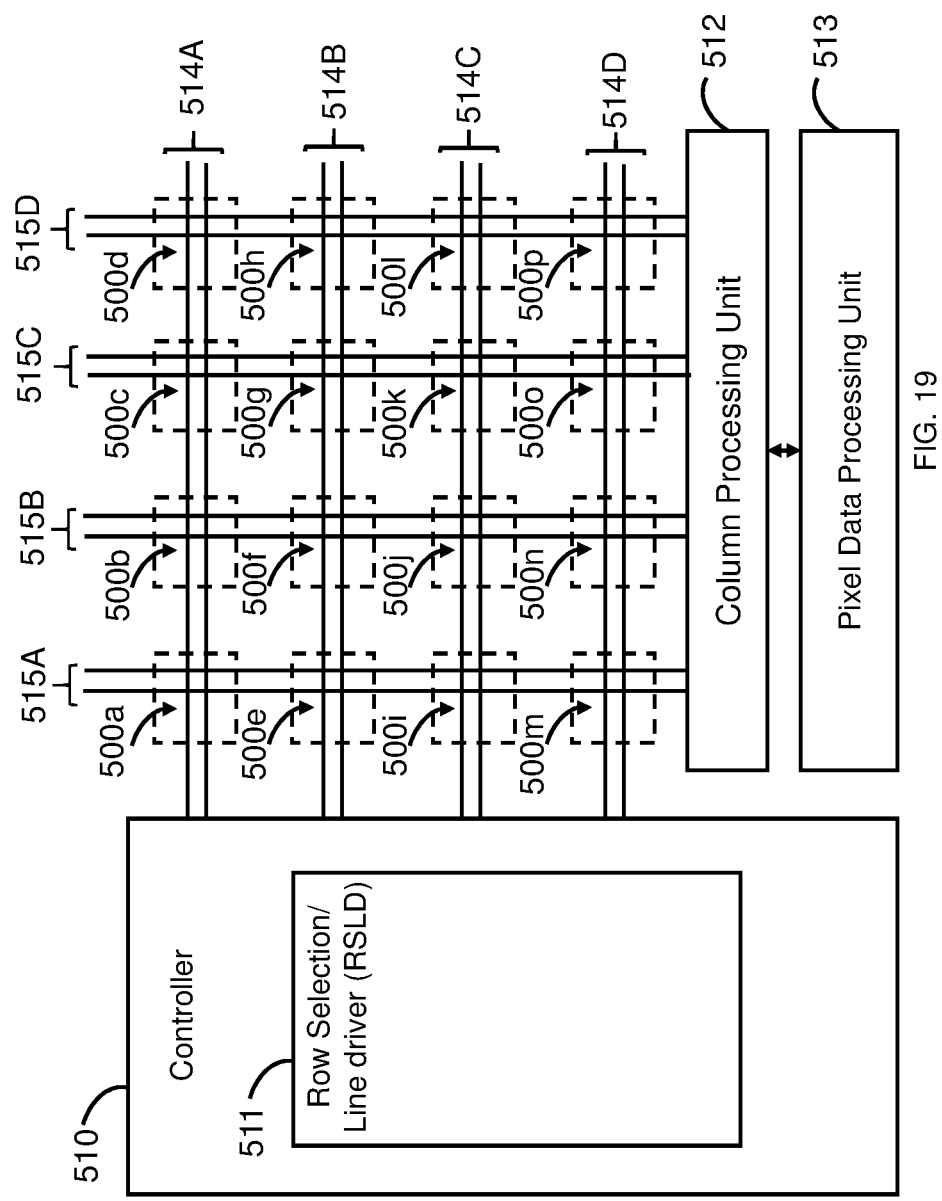
FIG. 19 is a schematic block diagram illustration of the architecture of an image sensor, according to some embodiments.

Further reference is made to FIG. 19. According to some embodiments, image sensor 114 comprises an m×n array of pixel elements 500 arranged in m rows and n columns. Optionally, image sensor 114 comprises m optically-black (OB) pixel rows and n optically-black (OB) pixel columns. Optionally, image sensor 114 comprises k special rows (not shown) such as, for example, a reference row (not shown) for generating a reference voltage and/or a test row (not shown) used for debugging purposes. Optionally, the pixel pitch (the distance between the geometric centres of adjacent pixels elements) may be 10 μm or less.

Image sensor 114 can comprise an on-chip controller 510 that includes a row selection/line driver (RSLD) 511 according to which pixel elements 500 (e.g., active pixels or pixel elements 500a-500p) are controllably selected. In an embodiment, functions of on-chip controller 510 are coordinated with controller 116 of ID engine 110 shown in FIG. 1. Optionally, controller 116 provides control signals to on-chip controller 510, which then controllably selects pixel elements 500 accordingly. Pixel control signals for the controlling of pixel elements 500 are provided from on-chip controller 510 to pixel elements 500 via control signal lines 514. A plurality of pixel elements (e.g., of a row) may communicate with on-chip controller 510 via the same control signal line 514. In other words, a plurality of pixel elements (e.g., of a row) may share the same control signal line, e.g., as schematically illustrated in FIG. 19. For example, four pixel elements (pixel elements 500a-500d) may communicate with controller 510 via the same control signal line 514 (e.g., control signal line 514A). Pixel signals produced by pixel elements 500 are provided to pixel data processing unit 513 via pixel signal readout channels 515 for further processing by a pixel data processing unit 513, e.g., as part of the readout channel.

Optionally, pixel signals may be provided and processed column-by-column or column-wise by a column processing unit 512. For instance, a column selection may be made by controller 510 and pixel signals of the selected column are provided to column processing unit 512 column-wise via readout channels 515. In other words, a column of pixel elements 500 provides pixel signals via the same readout channel. For instance, pixel signals produced by pixel elements 500a, 500e, 500i and 500m are readout by column processing unit 512 via readout channel 515A. Optionally, image sensor 114 may comprise m readout channels (not shown) for column-wise readout of signals of optically black pixel.

Column processing unit 512 processes (e.g., converts) the column-wise obtained signals to obtain pixel signals that are respectively associated with the individual pixel elements 500, and which are then further processed by pixel data processing unit 513.

In an embodiment, column-wise readout of pixel signals can be performed in parallel via readout channels 515, i.e., simultaneously. More specifically, the pixel signals of n sets of pixel elements of respective n columns may be read out in parallel. For example, pixel signals of readout channels 515A-515D may be read out in parallel, as opposed to a sequential read out procedure. In another embodiment, column-wise produced pixel signals may be readout sequentially via readout channels 515, e.g., readout channels 515A-515D may be sequentially selected for readout.

When operating or reading out the "column" pixel signals in parallel, the pixel signals of an entire row of pixel elements may be processed simultaneously, e.g., to perform row-by-row A/D conversion of the pixels signals. For example, pixel signals of pixel elements 500m, 500n, 500o and 500p are readout in parallel, and then simultaneously processed by column processing unit 512. The time period for reading out in parallel the pixel signals of a row of pixel elements and for digitizing the same readout pixel signals of the can be referred to as "row conversion time" or "row time".

According to some embodiments, image sensor 114 may comprise additional on-chip circuitry for implementing various functional modules, blocks and/or units, for example, for controlling on-chip components of image sensor 114, for controlling the interaction of off-chip components of image sensor 114, for controlling the generation of data frames for high-speed digital outputs (e.g., according to MIPI, LVDS and/or other standards, protocols, platforms, and/or techniques). For instance, image sensor 114 may include a sensor control module (not shown) the controlled generation of pixel signals. Such sensor control module may include controller 510 and RSLD 511.

Optionally, image sensor 114 includes a serialization module (not shown), for serializing out digitized pixel signals (also: pixel data) to a framing module (not shown). The framing module (not shown) receives the pixel data from the Serialization block (not shown), generates a digital frame, and transmits the digital frame out via digital ports (e.g., MIPI, LVDS etc.). The frame module (not shown) may also generate a clock recovery signal and synchronization codes.

Optionally, image sensor 114 includes communication interface modules (not shown) that relate to input/output signals communication interfaces such as, for example, serial peripheral interface (SPI) bus, external control signals and/or data output. The pixel data may for example be outputted through digital ports. A pixel data output interface may for example comprise at least 2 LVDS data ports plus 1 extra port for clock recovery. Optionally, synchronization data is interleaved with the pixel data.

Optionally, image sensor 114 includes auxiliary on-chip modules (not shown) that may be employed for reducing the number of external components required for the operation of image sensor 114. Such auxiliary on-chip modules (not shown) may for example implement Power-on-Reset, a Temperature Sensor (Optional), a Clock Generation Module with a low-jitter low-power Phase Locked Loop (PLL), and/or a Reference Voltage Generator with a high-accuracy band-gap.

It is noted that although some embodiments are disclosed herein in conjunction with the gated imaging of DOFs through the sub-exposure of pixel elements 500 of image sensor 114 (e.g., sequentially exposing the pixel subsets of a group of subsets), this should by no means be construed as limiting. For example, the procedure for reducing or minimizing multipath reflection artifacts may also be employed when all pixel elements of image sensor 114 are exposed, at the same time, to reflected light and the pixel values of each DOF are read out in separate frames. It is noted that the expressions "concurrently", "simultaneously", "in real-time", "constant" as used herein may also encompass, respectively, the meaning of the expression "substantially concurrently", "substantially simultaneously", "substantially in real-time" and substantially "constant".

Any digital computer system, module and/or engine exemplified herein can be configured or otherwise programmed to implement a method disclosed herein, and to the extent that the system, module and/or engine is configured to implement such a method, it is within the scope and spirit of the disclosure. Once the system, module and/or engine are programmed to perform particular functions pursuant to computer readable and executable instructions from program software that implements a method disclosed herein, it in effect becomes a special purpose computer particular to embodiments of the method disclosed herein. The methods and/or processes disclosed herein may be implemented as a computer program product that may be tangibly embodied in an information carrier including, for example, in a non-transitory tangible computer-readable and/or non-transitory tangible machine-readable storage device. The computer program product may directly loadable into an internal memory of a digital computer, comprising software code portions for performing the methods and/or processes as disclosed herein.

Additionally or alternatively, the methods and/or processes disclosed herein may be implemented as a computer program that may be intangibly embodied by a computer readable signal medium. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer or machine-readable storage device and that can communicate, propagate, or transport a program for use by or in connection with apparatuses, systems, platforms, methods, operations and/or processes discussed herein.

The terms "non-transitory computer-readable storage device" and "non-transitory machine-readable storage device" encompasses distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by one or more communication networks.

These computer readable and executable instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable and executable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable and executable instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

In the discussion, unless otherwise stated, adjectives such as "substantially" and "about" that modify a condition or relationship characteristic of a feature or features of an embodiment of the invention, are to be understood to mean that the condition or characteristic is defined to within tolerances that are acceptable for operation of the embodiment for an application for which it is intended.

"Coupled with" means indirectly or directly "coupled with".

It is important to note that the method may include is not limited to those diagrams or to the corresponding descriptions. For example, the method may include additional or even fewer processes or operations in comparison to what is described in the figures. In addition, embodiments of the method are not necessarily limited to the chronological order as illustrated and described herein.

Discussions herein utilizing terms such as, for example, "processing", "computing", "calculating", "determining", "establishing", "analyzing", "checking", "estimating", "deriving", "selecting", "inferring" or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes. The term determining may, where applicable, also refer to "heuristically determining".

It should be noted that where an embodiment refers to a condition of "above a threshold", this should not be construed as excluding an embodiment referring to a condition of "equal or above a threshold". Analogously, where an embodiment refers to a condition "below a threshold", this should not to be construed as excluding an embodiment referring to a condition "equal or below a threshold". It is clear that should a condition be interpreted as being fulfilled if the value of a given parameter is above a threshold, then the same condition is considered as not being fulfilled if the value of the given parameter is equal or below the given threshold. Conversely, should a condition be interpreted as being fulfilled if the value of a given parameter is equal or above a threshold, then the same condition is considered as not being fulfilled if the value of the given parameter is below (and only below) the given threshold.

It should be understood that where the claims or specification refer to "a" or "an" element and/or feature, such reference is not to be construed as there being only one of that element. Hence, reference to "an element" or "at least one element" for instance may also encompass "one or more elements".

Terms used in the singular shall also include the plural, except where expressly otherwise stated or where the context otherwise requires.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Unless otherwise stated, the use of the expression "and/or" between the last two members of a list of options for selection indicates that a selection of one or more of the listed options is appropriate and may be made.

It is appreciated that certain features of the invention, which are, for clarity, described in the context of separate embodiments or example, may also be provided in combination in a single embodiment. Conversely, various features of the invention, which are, for brevity, described in the context of a single embodiment, example and/or option, may also be provided separately or in any suitable sub-combination or as suitable in any other described embodiment, example or option of the invention. Certain features described in the context of various embodiments, examples and/or optional implementation are not to be considered essential features of those embodiments, unless the embodiment, example and/or optional implementation is inoperative without those elements.

It is noted that the term "exemplary" is used herein to refer to examples of embodiments and/or implementations, and is not meant to necessarily convey a more-desirable use-case.

The number of elements shown in the Figures should by no means be construed as limiting and is for illustrative purposes only.

Throughout this application, various embodiments may be presented in and/or relate to a range format. It should be understood that the description in range format is merely for convenience and brevity and should not be construed as an inflexible limitation on the scope of the embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Where applicable, whenever a numerical range is indicated herein, it is meant to include any cited numeral (fractional or integral) within the indicated range.

The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

While the invention has been described with respect to a limited number of embodiments, these should not be construed as limitations on the scope of the invention, but rather as exemplifications of some of the embodiments.

The invention claimed is:

1. A method for imaging objects in a depth-of-field (DOF) of a scene by an apparatus of a moving or movable platform, the method comprising:
   a. actively illuminating the scene:
      with pulsed light comprising a first train of light pulses according to a first illumination function, and
      with second pulsed light comprising a second train of light pulses according to a second illumination function;
      wherein the actively illuminating includes:
         controlling temporal width of at least one light pulse of the first train of light pulses, or controlling at least one light pulse of the second train of light pulses, or both;
   b. receiving, responsive to illuminating the scene with the train of first light pulses and with the train of second light pulses, respectively, a plurality of first reflections and a plurality of second reflections on at least one image sensor comprising at least one pixel element;
      selectively controlling the at least one pixel element;
         for imaging a first DOF by integrating first pixel values relating to the plurality of first reflections according to a first sensor function to obtain first integrated pixel values relating to a first DOF having a first gating profile;
         for imaging a second DOF by integrating first pixel values relating to the plurality of second reflections according to a second sensor function to obtain first integrated pixel values relating to a first DOF having a second gating profile;
      wherein the first gating profile is different from the second gating profile;
      wherein the first and the second gating profiles are spatially overlapping; wherein the first gating profile expresses convolution between the first illumination function and the first sensor function; and
      wherein the second gating profile expresses convolution between the second illumination function and the second sensor function.

2. The method of claim 1, wherein a first DOF range and a second DOF range of the plurality of DOF ranges are at least partially overlapping; and
   determining, based on at least one first pixel value of the first DOF range in the overlapping DOF region, and further based on at least one second pixel value of the second DOF range in the overlapping DOF region, depth information of an object located in an overlapping DOF region of the scene.

3. The method according of claim 1 comprising:
   reading out pixel data that is associated with at least two pixel subsets to obtain one or more image frames that are descriptive of at least two DOF ranges and their overlapping DOF range.

4. The method according to claim 3,
   wherein gating the at least two pixel subsets is performed a plurality of times to obtain at least two different overlapping DOF regions in which the object is located; and
   depth mapping the pixel data descriptive of the object based on values relating to the at least two different overlapping DOF regions.

5. The method according claim 3, wherein the at least two pixel subsets are associated with respective Regions-of-Interest (ROIs) of the scene being illuminated during an illumination period.

6. The method of claim 1, wherein, a plurality of pixel subsets are read out for a same frame.

7. A gated imaging apparatus that is employable by a moving or movable platform for imaging a scene of a geographic area in which the platform is located, the gated imaging apparatus comprising:
   at least one pulsed light illuminator configured to:
      actively illuminate, in accordance with a first illumination function, the scene with first pulsed light comprising a first train of light pulses;
      actively illuminate, in accordance with a second illumination function, the scene with second pulsed light comprising a second train of light pulses;
      wherein the imaging apparatus is configured to control:
         temporal width of at least one light pulse of the first train of light pulses, or
         temporal width of at least one light pulse of the second train of light pulses; or both;
      receiving, responsive to illuminating the scene with the train of first light pulses and with the train of second light pulses, respectively, a plurality of first reflections and a plurality of second reflections on at least one image sensor comprising at least one pixel element;
   at least one image sensor that comprises a plurality of pixel elements for receiving reflections responsive to illuminating the scene with the pulsed light;
   a controller configured to control the plurality of pixel elements for:
      imaging, by at least one first pixel, a first DOF by integrating first pixel values relating to the plurality of first reflections according to a first sensor function to obtain first integrated pixel values relating to a first DOF having a first gating profile;
      imaging, by at least one second pixel, a second DOF by integrating second pixel values relating to the plurality of second reflections according to a second sensor function to obtain second integrated pixel values relating to a second DOF having a second gating profile;
   wherein the first gating profile is different from the second gating profile;
   wherein the first and the second gating profiles are spatially overlapping;
   wherein the first gating profile expresses convolution between the first illumination function and the first sensor function; and
   wherein the second gating profile expresses convolution between the second illumination function and the second sensor function.

8. The gated imaging apparatus according to claim 7, wherein the controller is operative to selectively gate at least two pixel subsets of the plurality of pixels according to respective subset gating parameter values for imaging by at least two pixel subsets, respectively, at least two DOF ranges of the scene.

9. The gated imaging apparatus according to claim 8, wherein the gating parameters of one pixel subset are different from the gating parameters of another pixel subset.

10. The gated imaging apparatus of claim 8, wherein the at least two pixel subsets are associated with respective Regions-of-Interest (ROIs) of the scene being illuminated during an illumination period.

11. The gated imaging apparatus according to claim 8, wherein at least two of the plurality of DOF ranges are at least partially overlapping.

12. The gated imaging apparatus according to claim 11, wherein the controller is operative to gate the at least two pixel subsets a plurality of times to obtain at least two different overlapping DOF regions comprising the object;
wherein the controller is further operative to perform depth mapping of pixel data descriptive of an object based on values relating to the at least two different overlapping DOF regions.

13. The gated imaging apparatus of claim 11, wherein the controller is further configured to determine, based on at least one first pixel value of a first DOF in an overlapping DOF region and further based on at least one second pixel value of a second DOF in the overlapping DOF region, depth information of one or more objects located in the overlapping DOF region of the scene.

14. The gated imaging apparatus of claim 11, wherein a plurality of pixel subsets are read out for a same frame.

15. A computer program embodied in an information carrier comprising a tangible non-transitory computer-readable storage device to control the operation of and/or for executing the following steps:
   a. actively illuminating the scene:
      with first pulsed light comprising a first train of light pulses according to a first illumination function, and
      with second pulsed light comprising a second train of light pulses according to a second illumination function;
      wherein the actively illuminating includes:
      controlling temporal width of at least one light pulse of the first train of light pulses, or controlling at least one light pulse of the second train of light pulses, or both;
   b. receiving, responsive to illuminating the scene with the train of first light pulses and with the train of second light pulses, respectively, a plurality of first reflections and a plurality of second reflections on at least one image sensor comprising at least one pixel element;
   c. selectively controlling the at least one pixel element:
      for imaging a first DOF by integrating first pixel values relating to the plurality of first reflections according to a first sensor function to obtain first integrated pixel values relating to a first DOF having a first gating profile;
      for imaging a second DOF by integrating first pixel values relating to the plurality of second reflections according to a second sensor function to obtain first integrated pixel values relating to a first DOF having a second gating profile;
      wherein the second gating profile is different from the first gating profile; and
      wherein the first and the second gating profiles are spatially overlapping;
      wherein the first gating profile expresses convolution between the first illumination function and the first sensor function; and
      wherein the second gating profile expresses convolution between the second illumination function and the second sensor function.

16. The computer program of claim 15, wherein gating parameters of one pixel subset are different from the gating parameters of another pixel subset.

17. The computer program of claim 15, wherein the gating is performed to image at least two at least partially overlapping DOF ranges.

18. The computer program of claim 15, controlling the operation and/or executing the step of:
   depth mapping pixel data descriptive of the object based on values relating to at least two different at least partially overlapping DOF regions.

19. The computer program of claim 15, controlling the operation and/or executing the step of actively illuminating the scene and gating a plurality of pixels by illumination sources and sensors of a plurality of gated imaging apparatuses respective of a plurality of moving platforms in coordination with each other or randomly, so that depth mapping by the corresponding gated imaging apparatuses can be performed simultaneously without mutual interference between the plurality of gated imaging apparatuses.

* * * * *